Dec. 14, 1965 R. O. GUNDERSON ETAL 3,223,980

COMPUTER SYSTEM

Filed May 2, 1961 29 Sheets-Sheet 1

INVENTORS:
Robert O. Gunderson
Edmund F. Klein
William J. Campillo
Tom T. Tang

By Louis A. Kline
John J. Matlago
Richard J. Rogers

Their Attorneys

Dec. 14, 1965 R. O. GUNDERSON ET AL 3,223,980

COMPUTER SYSTEM

Filed May 2, 1961 29 Sheets-Sheet 2

INVENTORS:
Robert O. Gunderson
Edmund F. Klein
William J. Campillo
Tom T. Tang

By Louis A. Kline
John J. Matlago
Richard J. Rengel
Their Attorneys

INVENTORS:
Robert O. Gunderson
Edmund F. Klein
William J. Campillo
Tom T. Tang

By Louis A. Kline
John J. Matlago
Richard J. Rengel
Their Attorneys

Robert O. Gunderson
Edmund F. Klein
William J. Campillo
Tom T. Tang
By Louis A. Kline
John J. Matlago
Richard T. Runge
Their Attorneys

COMPUTER SYSTEM

INVENTORS:
Robert O. Gunderson
Edmund F. Klein
William J. Campillo
Tom T. Tang

Louis A Kline
John J. Matlago
By Richard J. Rengel
Their Attorneys

INVENTORS:
Robert O. Gunderson
Edmund F. Klein
William J. Campillo
Tom T. Tang
By Louis A. Kline
John J. Matlago
Richard J. Rugue
Their Attorneys INVENTORS:
Robert O. Gunderson
Edmund F. Klein
William J. Campillo
Tom T. Tang Louis A. Kline
By John J. Matlago
Richard T. Rogue
Their Attorneys INVENTORS:
Robert O. Gunderson
Edmund F. Klein
William J. Campilio
Tom T. Tang By Louis A. Kline
John J. Mattingly
Richard J. Rogers Their Attorneys

COMPUTER SYSTEM

Filed May 2, 1961 29 Sheets-Sheet 9

INVENTORS:
Robert O. Gunderson
Edmund F. Klein
William J. Campillo
Tom T. Tang

By Louis A. Kline
John J. Matlago
Richard J. Rengel
Their Attorneys

INVENTORS:
Robert O. Gunderson
Edmund F. Klein
William J. Campillo
Tom T. Tang

By Louis A. Kline
John J. Matlago
Richard J. Lengyel
Their Attorneys

Fig. 11

| | Column | Command | Instruction Register F/F N11 | N10 | N9 | N8 | N7 | Program Counter F/F N6 | N5 |
|---|---|---|---|---|---|---|---|---|---|
| Single Stage Commands | 13 | DIVIDE | 0 | 1 | 0 | 1 | 1 | 0 | 0 1 |
| | 01- | LOAD | 0 | 0 | 0 | 0 | 1 | 0 | 0 |
| | 02- | STORE | 0 | 0 | 0 | 1 | 0 | 0 | 0 |
| | 03- | ADD | 0 | 0 | 0 | 1 | 1 | 0 | 0 |
| | 04- | SUBTRACT | 0 | 0 | 1 | 0 | 0 | 0 | 0 |
| | 05- | MULTIPLY | 0 | 0 | 1 | 0 | 1 | 0 1 | 0 1 |
| Double Stage Commands | 21- | COUNT | 1 | 0 | 0 | 0 | 1 | 0 | 0 |
| | 22- | MODIFY | 1 | 0 | 0 | 1 | 0 | 0 | 0 1 |
| | 23- | MOVE | 1 | 0 | 0 | 1 | 1 | 0 | 0 |
| | 24- | SCAN | 1 | 0 | 1 | 0 | 0 | 0 | 0 1 |
| | 36- | INQUIRY | 1 | 1 | 1 | 1 | 0 | 0 1 | 0 1 |

Fig. 12

| Row | Program Counter F/F N6 | N5 | N4 | N3 | N2 | N1 | |
|---|---|---|---|---|---|---|---|
| -00- | 0 1 | 0 1 | 0 | 0 | 0 | 0 | Command Level (array 153) |
| -01- | 0 1 | 0 1 | 0 | 0 | 0 | 1 | |
| -02- | 0 1 | 0 1 | 0 | 0 | 1 | 0 | |
| -03- | 0 1 | 0 1 | 0 | 0 | 1 | 1 | |
| -04- | 0 1 | 0 1 | 0 | 1 | 0 | 0 | Individual Commands by Columns (array 152) |
| -05- | 0 1 | 0 1 | 0 | 1 | 0 | 1 | |
| -06- | 0 1 | 0 1 | 0 | 1 | 1 | 0 | |
| -07- | 0 1 | 0 1 | 0 | 1 | 1 | 1 | |
| -10- | 0 1 | 0 1 | 1 | 0 | 0 | 0 | |
| -11- | 0 1 | 0 1 | 1 | 0 | 0 | 1 | |
| -12- | 0 1 | 0 1 | 1 | 0 | 1 | 0 | |
| -13- | 0 1 | 0 1 | 1 | 0 | 1 | 1 | |
| -14- | 0 1 | 0 1 | 1 | 1 | 0 | 0 | |
| -15- | 0 1 | 0 1 | 1 | 1 | 0 | 1 | |
| -16- | 0 1 | 0 1 | 1 | 1 | 1 | 0 | |
| -17- | 0 1 | 0 1 | 1 | 1 | 1 | 1 | |

INVENTORS:
Robert O. Gunderson
Edmund F. Klein
William J. Campillo
Tom T. Tang

By Louis A. Kline
John J. Matlago
Richard J. Rengel

Their Attorneys

FIG. 13

| | Operation Block | N11 | N10 | N9 | N8 | N7 | N6 | N5 | N4 | N3 | N2 | N1 |
|---|---|---|---|---|---|---|---|---|---|---|---|---|
| | | Instruction Register F/F | | | | | Program Counter F/F | | | | | |
| Set up all Commands | XX-00-0 | 0 | 0 | 0 | 0 | 0 | 0 | 0 | 0 | 0 | 0 | 0 |
| | XX-01-0 | 0 | 0 | 0 | 0 | 1 | 0 | 0 | 0 | 0 | 0 | 1 |
| Set up Single Stage Commands | XX-02-0 | 0 | 0 | 0 | 0 | 1 | 0 | 0 | 0 | 0 | 1 | 0 |
| | XX-03-0 | 0 | 0 | 0 | 0 | 1 | 0 | 0 | 0 | 0 | 1 | 1 |
| "Load" Command | 01-04-0 | 0 | 0 | 0 | 0 | 1 | 0 | 0 | 0 | 1 | 0 | 0 |
| | 01-05-0 | 0 | 0 | 0 | 0 | 1 | 0 | 0 | 0 | 1 | 0 | 1 |
| | 01-06-0 | 0 | 0 | 0 | 0 | 1 | 0 | 0 | 0 | 1 | 1 | 1 |
| Skips | XX-00-3 | 0 | 0 | 0 | 0 | 0 | 1 | 1 | 0 | 0 | 0 | 0 |
| "Move" Command | XX-00-1 | 1 | 0 | 0 | 1 | 1 | 0 | 1 | 0 | 0 | 0 | 0 |

FIG. 14

| | Operation Block | N11 | N10 | N9 | N8 | N7 | N6 | N5 | N4 | N3 | N2 | N1 |
|---|---|---|---|---|---|---|---|---|---|---|---|---|
| | | Instruction Register F/F | | | | | Program Counter F/F | | | | | |
| Set up all Commands | XX-00-0 | 0 | 0 | 0 | 0 | 1 | 0 | 0 | 0 | 0 | 0 | 0 |
| | XX-01-0 | 1 | 0 | 0 | 1 | 1 | 0 | 1 | 0 | 0 | 0 | 1 |
| Set up Double Stage Commands | XX-00-1 | 1 | 0 | 0 | 1 | 1 | 0 | 1 | 0 | 0 | 0 | 0 |
| | XX-01-1 | 1 | 0 | 0 | 1 | 1 | 0 | 1 | 0 | 0 | 0 | 1 |
| | XX-02-1 | 1 | 0 | 0 | 1 | 1 | 0 | 1 | 0 | 0 | 1 | 0 |
| | XX-03-1 | 1 | 0 | 0 | 1 | 1 | 0 | 1 | 0 | 0 | 1 | 1 |
| "Move" Command | 23-04-0 | 1 | 0 | 0 | 1 | 1 | 0 | 0 | 0 | 1 | 0 | 0 |
| | 23-05-0 | 1 | 0 | 0 | 1 | 1 | 0 | 0 | 0 | 1 | 0 | 1 |
| | 23-06-0 | 1 | 0 | 0 | 1 | 1 | 0 | 0 | 0 | 1 | 1 | 0 |
| | 23-07-0 | 1 | 0 | 0 | 1 | 1 | 0 | 0 | 0 | 1 | 1 | 1 |
| | 23-10-0 | 1 | 0 | 0 | 1 | 1 | 0 | 0 | 1 | 0 | 0 | 0 |
| | 23-11-0 | 1 | 0 | 0 | 1 | 1 | 0 | 0 | 1 | 0 | 0 | 1 |
| | 23-12-0 | 1 | 0 | 0 | 1 | 1 | 0 | 0 | 1 | 0 | 1 | 0 |
| | 23-13-0 | 1 | 0 | 0 | 1 | 1 | 0 | 0 | 1 | 0 | 1 | 1 |
| | 23-14-0 | 1 | 0 | 0 | 1 | 1 | 0 | 0 | 1 | 1 | 0 | 0 |
| | 23-15-0 | 1 | 0 | 0 | 1 | 1 | 0 | 0 | 1 | 1 | 0 | 1 |
| | 23-16-0 | 1 | 0 | 0 | 1 | 1 | 0 | 0 | 1 | 1 | 1 | 0 |

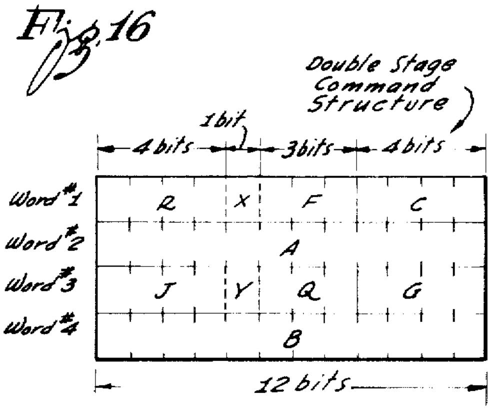

FIG. 16

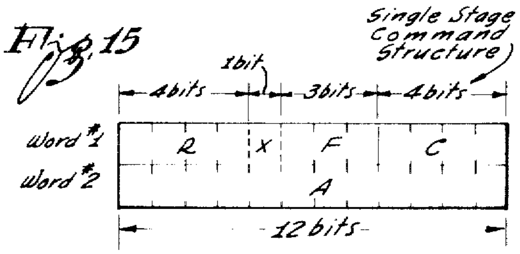

FIG. 15

INVENTORS:
Robert O. Gunderson
Edmund F. Klein
William J. Campillo
Tom T. Tang

By Louis A. Kline
John J. Mattago
Richard I. Ranpie
Their Attorneys

INVENTORS:
Robert O. Gunderson
Edmund F. Klein
William J. Campillo
Tom T. Tang

By Louis G. Kline
John J. Matlago
Richard J. Rengel
Their Attorneys

XX-00-0 LOOK UP CONTROL №

Fig. 18

Auxiliary memory cycle: Control № (address of first word of command) "read out" of auxiliary memory into S Reg. and "written back" in at same address.

Address of first word of command copied via the adder from S Reg. into L Reg.

Set Program counter to go to block XX-01-0.

If KRO flip-flop is set by rest button being depressed to provide $Ks_3$, go to "rest" block XX-00-3 to await next command.

ADDER:

$dGa1\text{-}4 = S_{1-4}\ XGa1$ $dGa5\text{-}12 = S_{5-12}\ XGa4$ $dJa13\text{-}18 = S_{13-18}$ (Carry Count Up) $XJa1$ $dFa1\text{-}12 = 0$

DECISION:

$dKs1 = 0$ $dKs2 = 0$ $dKs3 = KR_0$

L REGISTER:

$sL1\text{-}18 = Ja_{1-18}\ XL1$

M REGISTER:

$sM1\text{-}12 = 0$ $sF1 = Ks_3$ $sF2 = 0$

A REGISTER:

$sA1\text{-}3 = A_{1-3}\ XA3'$ $sA4\text{-}7 = A_{4-7}\ XA4'$

S REGISTER:

$sS1\text{-}12 = S_{1-12}\ XS2$ $sS13\text{-}16 = S_{13-16}\ XS6$ $sS17\text{-}18 = S_{17-18}\ XS7$ $sE1 = Ks_3$ $sE2 = 0$

N REGISTERS:

$sN1 = Ks_1'\ Ks_2'\ XN1$ $sN7\text{-}10 = N_{7-10}\ XN34'$ $sN2\text{-}4 = 0$ $sN5\text{-}6 = Ks_3$

T REGISTERS:

$sT1\text{-}4 = T_{1-4}\ XT4'$ $sT5\text{-}8 = T_{5-8}\ XT5'$ $sT9\text{-}12 = T_{9-12}\ XT6'$ $sTM1\text{-}3 = TM_{1-3}\ XTM1'$ $sT@1\text{-}3 = T@_{1-3}\ XT@1'$ $sTK1\text{-}3 = 0$ INVENTORS:
Robert O. Gunderson
Edmund F. Klein
William J. Campillo
Tom T. Tang Louis A Kline
By John J. Matlago
Richard Kenyon
Their Attorneys.

Fig. 19

XX-01-0 LOOK UP FIRST WORD OF COMMAND

Main Memory Cycle: first word of command "read out" of main memory into M Reg.

First word of command copied from M Reg. into T Reg.

First 5 bits (RX) portion of first word copied from M Reg. (M8-12) into A Reg.

Command code (C) for load command copied from M Reg. (M1-4) into instruction Reg. (N 7-10)

Add 1 to address in L Reg. for address of second word of command (count up)

Auxiliary Memory Cycle: add 2 to control No in S Reg., in adder, to provide the address of the next command.

Program counter set: (1) block XX-00-1 if ($Ks_1$ $Ks_2$) a double stage command; (2) block XX-03-0 if ($Ks_1'Ks_2$) first digit is (-), then second word of command (A) is operand address; (3) block XX-02-0 if ($Ks_1'Ks_2'$) single stage command.

ADDER:

$dFa2 = XFa1$
$dGa1\text{-}4 = S_{1-4}\, XGa1$
$dGa5\text{-}12 = S_{5-12}\, XGa4$
$dJa13\text{-}18 = S_{13-18}$ (Carry Count Up) $XJa1'$

L REGISTER:

$sL1\text{-}18 = L_{1-18}$ (Count Up) $XL2$

A REGISTER:

$sA1\text{-}3 = M_{9-11}\, XA10$
$sA4 = M_{12}\, XA18$
$sA5 = M_8\, XA18$

N REGISTERS:

$sN1 = Ks_1'Ks_2\, XN13$
$sN2 = (Ks_1'Ks_2'\, XN2$
$\quad + Ks_1'Ks_2\, XN14)$
$sN5 = Ks_1\, Ks_2\, XN23$
$sN7\text{-}10 = M_{1-4}\, XN32$

DECISION:

$dKs1 = (M_1M_2M_3M_4 + M_1'M_2'M_3'M_4')\, XKs1$
$dKs2 = (M_1M_2M_3M_4 + M_1'M_2'M_3'M_4')\, XKs1$
$\quad + M_9M_{10}M_{11}M_{12}\, XKs4$
$dKs3 = 0$

M REGISTER:

$sM1\text{-}6 = M_{1-6}\, XM2$
$sM7\text{-}12 = M_{7-12}\, XM10$
$sF1 = Ks_1'\, Ks_2\, XF5$
$sF2 = 0$

S REGISTER:

$sS1\text{-}4 = Ja_{1-4}\, XS8$
$sS5\text{-}12 = Ja_{5-12}\, XS3$
$sS13\text{-}18 = Ja_{13-18}\, XS4$
$sE1 = Ks_1'Ks_2\, XE7$
$sE2 = 0$

T REGISTERS:

$sT1\text{-}12 = M_{1-12}\, XT7$
$sTM1\text{-}3 = 0$
$sT@1\text{-}3 = T@_{1-3}\, XT@1'$
$sTK1\text{-}3 = 0$ INVENTORS:
Robert O. Gunderson
Edmund F. Klein
William J. Campillo
Tom T. Tang BY Louis A. Kline
John J. Matlago
Richard Kempel
Their Attorneys

XX-02-0 LOOK-UP SECOND WORD OF COMMAND

Fig. 20

Main Memory Cycle: "read out" of main memory into M Reg.

Auxiliary Memory Cycle: look up index register whose address in Auxiliary Memory is first 5 bits of first word of command (RX).

Add second word of command in M Reg. to contents of S Reg. in adder and put sum into L Reg.

Field length (F) of the operand copied from T Reg. (T5—7) into TM Reg. (TM1—3)

Program counter set to go to block XX-03-0.

ADDER:

dFa1-4 = $M_{1-4}$ XFa2
dFa5-8 = $M_{5-8}$ XFa5
dFa9-12 = $M_{9-12}$ $Km_0'$ XFa5
dGa1-4 = $S_{1-4}$ XGa1
dGa5-12 = $S_{5-12}$ XGa4
dJa13-18 = $S_{13-18}$ (Carry Count Up) XJa1'

L REGISTER:

sL1-18 = $Ja_{1-18}$ XL1

A REGISTER:

sA1-3 = $A_{1-3}$ XA3'
sA4-7 = $A_{4-7}$ XA4'

N REGISTERS:

sN1 = $Ks_1'$ $Ks_2'$ XN1
sN2 = $Ks_1'$ $Ks_2'$ XN2
sN3-6 = 0
sN7-10 = $N_{7-10}$ XN34'

DECISION:

dKs1 = 0
dKs2 = 0
dKs3 = 0

M REGISTER:

sM1-6 = $M_{1-6}$ XM2
sM7-12 = $M_{7-12}$ XM10
sF1 = $Ks_1'$ $Ks_2'$ XF1
sF2 = 0

S REGISTER:

sS1-12 = $S_{1-12}$ XS2
sS13-16 = $S_{13-16}$ XS6
sS17-18 = $S_{17-18}$ XS7
sE1 = $Ks_1'$ $Ks_2'$ XE1
sE2 = 0

T REGISTERS:

sT1-4 = $T_{1-4}$ XT4'
sT5-8 = $T_{5-8}$ XT5'
sT9-12 = $T_{9-12}$ XT6'
sTM1-3 = $T_{5-7}$ XTM2
sT@1-3 = $T@_{1-3}$ XT@1'
sTK1-3 = 0

INVENTORS:
Robert O. Gunderson
Edmund F. Klein
William J. Campillo
Tom T. Tang

Louis A. Kline
John J. Matlago
Richard [illegible]
By Their Attorneys

XX-03-0 PREPARE TO LOOK UP OPERAND

Fig. 21

Transfer field length (F) from TM Reg. (TM1-3) to TK Reg. (TK1-3).

Copy address in L Reg. into S Reg.

Program counter set to go to row-04-(if Load Command go to block 01-04-0).

ADDER:
- dFa1-12 = 0
- dGa1-12 = 0

DECISION:
- dKs1 = 0
- dKs2 = 0
- sKs3 = 0

L REGISTER:
- $sL1\text{-}18 = L_{1\text{-}18} X L4'$

M REGISTER:
- sM1-12 = 0
- sF1 = 0
- sF2 = 0

A REGISTER:
- sA1-3 = 0
- sA4-6 = 0
- sA7 = XA9

S REGISTER:
- $sS1\text{-}18 = L_{1\text{-}18} X S5$
- sE1 = 0
- $sE2 = Ks_1' Ks_2' X E2$ N REGISTERS:
- $sN3 = Ks_1' Ks_2' X N3$
- $sN7\text{-}10 = N_{7\text{-}10} X N34'$
- sN1-2 = 0
- sN4-6 = 0

T REGISTERS:
- $sT1\text{-}4 = T_{1\text{-}4} X T4'$
- $sT5\text{-}8 = T_{5\text{-}8} X T5'$
- $sT9\text{-}12 = T_{9\text{-}12} X T6'$
- $sTM1\text{-}3 = TM_{1\text{-}3} X TM1'$
- $sT@1\text{-}3 = T@_{1\text{-}3} X T@1'$
- $sTK1\text{-}3 = TM_{1\text{-}3} X TK1$ INVENTORS:
Robert O. Gunderson
Edmund F. Klein
William J. Campillo
Tom T. Tang
By Louis A. Kline
John J. Matlago
Richard T. Kenyon
Their Attorneys Robert O. Gunderson
Edmund F. Klein
William J. Campillo
Tom T. Tang
By Louis A. Kline
John J. Matlago
Richard V. Kempel
Their Attorneys

COMPUTER SYSTEM

Filed May 2, 1961

INVENTORS:
Robert O. Gunderson
Edmund F. Klein
William J. Campillo
Tom T. Tang

By Louis A. Kline
John J. Matlago
Richard ... Rangue
Their Attorneys

INVENTORS:
Robert O. Gunderson
Edmund F. Klein
William J. Campillo
Tom T. Tang
By
Their Attorneys INVENTORS:
Robert O. Gunderson
Edmund F. Klein
William J. Campillo
Tom T. Tang
By Louis A. Kline
John J. Matlago
Richard Kreyie
Their Attorneys INVENTORS:
Robert O. Gunderson
Edmund F. Klein
William J. Campillo
Tam T. Tang By Louis A. Kline
John T. Matlago
Richard ...
Their Attorneys INVENTORS
Robert O. Gunderson
Edmund F. Klein
William J. Campillo
Tom T. Tang
By Louis A. Kline
John J. Matlago
Richard S. Rungle
Their Attorneys $dKs3 = KR_0$ INVENTORS:
Robert O. Gunderson
Edmund F. Klein
William J. Campillo
Tom T. Tang
Louis A. Kline
By John J. Matlago
Richard J. Rengle
Their Attorneys $sF1 = (Ks_3 + Ks_1' Ks_2 XF5 + Ks_1' Ks_2' XF1)$
$sF2 = 0$ INVENTORS:
Robert O. Gunderson
Edmund F. Klein
William J. Campillo
Tom T. Tang
By Louis A. Kline
John J. Mathago
Richard J. Renquist
Their Attorneys INVENTORS:
Robert O. Gunderson
Edmund F. Klein
William J. Campillo
Tom T. Tang
By Louis A. Kline
John J. Matlago
Richard J. Riegel
Their Attorneys INVENTORS:
Robert O. Gunderson
Edmund F. Klein
William J. Campillo
Tom T. Tang
By Louis A. Kline
John J. Matlago
Richard J. Kunzel
Their Attorneys INVENTORS:
Robert O. Gunderson
Edmund F. Klein
William J. Campillo
Tom T. Tang
By Louis A. Kline
John J. Matlago
Richard J. Kurpel
Their Attorneys INVENTORS:
Robert O. Gunderson
Edmund F. Klein
William J. Campillo
Tom T. Tang
By Louis A. Kline
John T. Matlago
Richard J. Rengel
Their Attorneys United States Patent Office 3,223,980
Patented Dec. 14, 1965

3,223,980
COMPUTER SYSTEM

Robert O. Gunderson, Torrance, Edmund F. Klein, San Pedro, William J. Campillo, Torrance, and Tom T. Tang, Los Angeles, Calif., assignors to The National Cash Register Company, Dayton, Ohio, a corporation of Maryland Filed May 2, 1961, Ser. No. 107,109
43 Claims. (Cl. 340—172.5)

The present invention relates to electronic digital computers, and more particularly to an improved high capacity, versatile, general purpose computer system capable of handling and operating on digital information at high speed, while requiring a minimum of circuit complexity and associated hardware.

In general, the basis of operation of one type of known prior art computer system (such as disclosed in the copending patent application S.N. 720,384 filed March 10, 1958 and now U.S. Patent No. 3,042,305 issued July 3, 1962) involves dividing computer operations into a plurality of sequential operating cycles, also referred to as operation blocks, each operation block being commensurate with a fixed time duration and corresponding to a particular combination of logical circuits which are rendered operable throughout that operation cycle in order to perform predetermined computer operations unique to that operation block. In such prior art computer systems, a variable sequence program control apparatus is provided to selectively render operative the particular combination of logical circuits required for each operation block, the sequence of operation blocks to be performed being determined in accordance with one or more "commands." A command is composed of a series of related operation blocks usually performed in sequential order, self-sequencing of operation blocks during execution of a command being achieved by selecting the next operation block to be performed in accordance with decisions made in the previous operation block.

It is well recognized that by use of such an approach to computer system operation, as summarized above, it becomes necessary to mechanize each predetermined logical circuit required for a particular computer operation just once; then, whenever the logical operation represented by that predetermined logical circuit is required during an operation block, the predetermined logical circuit is conveniently rendered operative by means of a program control signal applied thereto from the program control apparatus.

In the above described type of prior art computer system, each operating cycle during which an operation block is performed is divided into discrete time periods of equal duration, for example, twenty-four equal time periods, as disclosed in the aforementioned copending patent application, a predetermined number of time periods being set aside for each of the operations required to be performed in an operation block. For example, if the time periods are numbered $P_0$ to $P_{23}$ with the first time interval beginning at $P_{16}$ (as in the aforementioned copending patent application, FIG. 2 thereof): periods $P_{16}$ to $P_{19}$ may be provided to set up the program control signal latches required to render operable the particular combination of logical circuits corresponding to the operation block to be performed during the operating cycle; periods $P_{20}$ to $P_{23}$ may be provided to "read out" of a magnetic core memory; periods $P_{23}$ to $P_{10}$ may be provided for the performance of logical operations; periods $P_{11}$ to $P_{13}$ may be provided to write back into the core memory; period $P_{13}$ may be provided for examining decision flip-flops to determine the next operation block to be performed; and periods $P_{14}$ and $P_{15}$ may be provided to reset the program control signal latches in order to permit them to be set in the next operation block. During each of the time periods $P_0$ to $P_{23}$, a clock pulse is applied to the clock input of each flip-flop in order to permit selected flip-flops to be triggered to store the results of operations which may be performed during each period of an operating cycle.

The operational approach of the prior art computer system briefly described above has many advantages, particularly where non-linear devices, such as magnetic core circuitry, are employed in generating the required program control signals, as disclosed in the aforementioned copending patent application. However, this prior art approach suffers from a number of limitations with respect to (1) the speed of operation of which the computer is capable (that is, the time required for the computer to perform typical general purpose computer operations, such as multiplication, division, etc.), (2) the versatility of operations performable by the computer, and (3) the flexibility of machine operation. These limitations result in part from the fact that, in the prior art approach, the length of the operating cycle during which the operation block is to be performed must provide sufficient time, in addition to the logic time, for setting up the program control latches, for reading and writing into the memory, for examining the decision flip-flops to determine the next operation block, and for resetting the program control latches in readiness for the next operation block. Thus, the duration required of the operating cycle is nearly equal to the total time required for these operations, and this complete operating cycle must take place for each operation block even though a relatively simple operation block is to be performed, involving only a small period in the operating cycle.

Also, in the above described prior art system, the use of discrete uniform time periods into which the operation interval is divided (i.e., $P_0$ to $P_{23}$) affects the required time duration of an operating cycle, since the rate at which pulses corresponding to these time periods can be generated is limited in view of transient considerations; in addition, the performance of a particular operation within the operating cycle must await the occurrence of a time period pulse, or a clock pulse (which occurs at each time period), even though the operation could be performed at an earlier time, such as between clock pulses.

Still further, since the program control signals remain constant throughout an entire operation block, means, such as latches, must be provided for storing each program control signal, as well as for resetting the latches at the end of an operating cycle; and, because the program control signals remain constant throughout each operating cycle, the particular combination of logical circuits rendered operable thereby also remain constant, even though the use of a different combination of logical circuits would be more expedient for one or more portions of the operation interval.

It will be appreciated, therefore, that the prior art computer system, such as disclosed in the aforementioned copending patent application, has decided limitations. Accordingly, it is an important object of the present invention to provide an improved computer system which substantially overcomes these limitations.

Another object of the invention is to provide an improved computer system employing a novel operating cycle by means of which versatile, high speed computer operation is achieved, while requiring a minimum of circuit complexity and associated hardware.

A further object of the invention is to provide a computer system which has the capability of performing program control, memory, logic, and decision operations in the interval between successive logical clock pulses, whereby one operating cycle and thus one operation block can be performed for every logical clock pulse.

Still another object of the invention is to provide a computer system in accordance with the previous object in which the program control signals are capable of being changed for every logical clock pulse, thereby providing increased flexibility of machine operation while at the same time eliminating the need for storage and resetting means therefor.

Yet another object of the invention is to provide a computer system in accordance with the previous objects in which logical decisions (such as the decision to "skip," "stick," or proceed to the next operation block) and other intermediate logical operations (such as adding and transferring), are available at each logical clock pulse along with the results of other logical operations to trigger the logical flip-flops in accordance therewith, thereby permitting one operating cycle and thus one operation block to be performed for each logical clock pulse.

Another object of the invention is to provide a computer system having a novel operating cycle which is commensurate with the logical clock pulse rate.

Another object of the invention is to provide an improved computer system which is capable of concurrently performing program control, memory, logic, and decision operations so that the smallest time interval required for an operating cycle is limited only by the maximum time required for one of these operations.

Another object of the invention is to provide an improved computer system having an auxiliary memory capable of operating concurrently with a main memory where, by means of relative addressing, an address may be derived for accessing a large plurality of addresses in the main memory.

Another object of the invention is to provide a computer system in accordance with the previous object, wherein the auxiliary memory is also capable of serving as a store for index registers, jump registers, temporary storage, and an accumulator.

Another object of the invention is to provide a computer system in accordance with any or all of the aforementioned objects in which delay line means are provided for initiating events at any predetermined time within an operating cycle as may be required for the most expeditious performance of required operations within the operating cycle.

An additional object of the invention is to provide a computer system in accordance with any or all of the aforementioned objects having an operating cycle repetition rate which is capable of conveniently being synchronized with the rate of operation of input-output equipment, while maintaining constant the initiating times and operating speeds of operations occurring within each operating cycle.

Another object of the invention is to provide an improved computer system in accordance with any or all of the aforementioned objects which includes a main memory, an auxiliary memory, and an address register for each, whereby provision is made in each memory for automatically writing back into the same address of the memory from which data was "read out" during a preceding reading interval, even though the address register of the memory is changed before the writing interval occurs; thus, a different address can be accessed in both the main and auxiliary memory during each operating cycle.

Another object of the invention is to provide an improved computer system in accordance with any or all of the aforementioned objects, wherein an operating cycle occurs for each logical clock pulse; wherein an operation block is performed each operation cycle; wherein a different combination of logical circuits are rendered operative by the program control means during each operating cycle; wherein both the main memory and the auxiliary memory may be concurrently accessed during an operating cycle at a different address for each operating cycle; wherein decision logic and other intermediate logic are dynamically performed by means of drivers instead of flip-flops so that the decisions are available to the logical flip-flops at the logical clock pulse; and wherein each logical clock pulse is applied to each logical flip-flop to trigger the flip-flop in accordance with the logical operations and decision logic performed during the operating cycle.

An additional object of the invention is to provide an improved computer system having a plurality of delay lines, one for a processor and one for each of a plurality of units of a main memory, whereby means are provided for selectively applying timing pulses to any one or a plurality of the delay lines.

Another object of the invention is to provide an improved computer system in accordance with any or all of the aforementioned objects which is capable of selectively operating in accordance with either a single address command or a double address command in performing computer operations.

Another object of the invention is to provide a computer system including means for the storage and handling of a unit of information by a variable length series of words comprising a field in which each word is a multiple of the number of binary digits in either a binary coded decimal digit or alpha-numeric character.

Another object of the invention is to provide means for operating on only the significant portion of a memory field.

Broadly, a typical embodiment for accomplishing the above objects may comprise a computer system whose data processing operations are controlled by program control apparatus which sequentially selects a predetermined combination of logical circuits to be rendered operable during each operating cycle during which an operation block is performed in accordance with the predetermined combination of logical circuits rendered operable during the operating cycle. Related operation blocks which are performed in a predetermined order to provide specific computer operations (such as "load," "divide," etc.) are grouped to form commands, each command being composed of as many operation blocks as may be required to allow performance of all the required operations corresponding to the particular command. Each operation block requires an interval of time for performance of the operations thereto assigned, and this interval of time which is the same for any and all of the operation blocks has been referred to in the present disclosure as the operating cycle of the computer, one operation block being performed for each operating cycle.

The operating cycle of the present computer system is defined by a clock source which provides a source of clock pulses whose repetition rate is chosen equal to the time interval of the operating cycle. Timing pulses for initiating operations within an operating cycle are then derived at any desired predetermined times within an operating interval by tapping off a delay line to which the clock pulses are fed. Generally, the present timing source is considered to provide analog timing, since timing pulses can be obtained from the delay line at any desired time within an operating cycle by varying the taps on the delay line from which the pulses are derived. This may be distinguished from digital timing as in the aforementioned copending patent application where timing pulses are provided only at discrete uniformly spaced positions.

In a preferred arrangement of the present invention individual delay lines are provided for the processor and each of the main memory units of the computer. The processor includes the auxiliary memory, program control system, and logical circuits. The clock source is coupled directly to the processor delay line and to the delay lines of the main memory through a decoder which determines which one, if any, of the delay lines of the main memory units is to receive the clock pulse.

The operating cycle of a typical computer system provides various times for the performance of specific computer operations within all operating cycles. In the exemplary apparaus to be described herein, the operating cycle includes various operations which occur concurrently or overlapping with respect to one another such as: clearing the memories at the beginning of each operating cycle; energizing a program control transformer to render operative the predetermined combination of logical circuits corresponding to the operation block to be performed; reading a predesignated cell in each of the memories into a respective register during approximately the first half of the operating cycle; writing into predesignated cells of the memory from the operating registers during the later half of the operating cycle; and performing logical and decision operations throughout the operating cycle as the data becomes available, the results of the logical operations being stored at the logical clock pulse which appears shortly after the middle of the operating cycle.

The portions of the operating cycle in which the reading and writing operations occur has been divided whereby the decoding of the address of the predesignated storage cell is timed to occur prior to the actual "reading out" of the cell. During the first half of the operating cycle, another operation, i.e., the generation of the program control signal, is timed to occur to provide for the performance of the logical operations. Each of the foregoing operations is performable within an operating cycle, during a predesignated time interval wherein the precise timing of concurrent operations depend on the time lag or delay in providing an output from the particular equipment. A predetermined order of operations and time intervals between operations is essential since the operations are interdependent. For example, the outputs of the address decoder in a memory should be present at the time the read current is applied to the cores in a selected cell and since the longer delay occurs in the decoder, the operation of the decoder is initiated prior to the supplying of current to the read drivers of the memory to assure the presence of a completely decoded output of the address decoder at the time read current is supplied to the read drivers.

In considering the timing control of the processor, the arrangement is such that a delay line provides a source of timing pulses which are available at any time over a six microsecond time interval. For example, the pulses are applied to timing flip-flops (as distinguished from logical flip-flops) for changing their state to provide timing signals in the flip-flop outputs having the desired predetermined time duration. Timing pulses are also obtained from the delay line for providing pulses, such as clearing pulses, strobe pulses, and logical clock pulses. The timing of these pulses can be controlled relative to one another and to other operations by the tap on the delay line from which the pulses are derived. For example, the memory strobe pulse is formed from a timing pulse which is derived at a time interval which precedes the logical clock by a time period sufficient to permit the results of the logic to become stabilized at the logical flip-flops, and at a time after the read current is applied to the cores in the predesignated cell in the memory, whereby the information from the predesignated cell is available for use in the logical operations occurring prior to the logical clock pulse. The timing of the program control signal also precedes the strobing to make the program control signal available for the performance of the logic while limiting the duration of the program control signal to the circuit limitations of the program control apparatus as well as allowing a time interval for the building up or generation of the program control signal prior to the logical operations which starts with the occurrence of the strobe pulse.

Similar requirements and limitations are associated with the write operations in which the writing into the memories is timed to occur after the logical clock, whereby the results of the logical operations stored in memory input-output registers are available for storage in the respective memories. The foregoing requirements lead to the primary objective of the analog timing control portion of the computer system, which is to minimize the duration of the operating cycle by permitting operations within an operating cycle to be initiated as soon as the data is made available and the apparatus is ready for operation. These and other exemplary assignments of portions of the exemplary basic operating cycle to specific operations requiring or utilizing the advantages of the present timing control system will hereinafter be considered in detail.

Thus, it is seen that in addition to providing time for performing the logical operations required during a basic operating cycle, the present timing control system also provides time for the processor to communicate with predesignated cells of the memories and to generate program control signals for selecting the logical circuits of the processor to be rendered operable during the logical operation portion of the basic operating cycle.

All the processes performable by a computer can be divided so as to be carried out by the performance of predetermined operation blocks during successive operating cycles, the logical circuits which are to be rendered operable during each operation block being controlled by the program control apparatus.

Each operating cycle thus provides sufficient time for performing the required operations in accordance with the operation block selected to be performed by the program control apparatus; and, at the logical clock pulse which occurs during each operating cycle, the computer is reset to provide for the operations to be performed during the subsequent operating cycle.

The program control system of the exemplary computer system of the present invention comprises two arrays of transformers. The first array includes two transformers which are common to all commands, two additional transformers which are common to a group of commands referred to as "single stage" commands, and another two additional transformers which are common to a group of commands referred to as "double stage" commands. The second array is provided for controlling the sequence of block operations corresponding to the particular command to be executed. Each transformer is assigned to generate the program control signals corresponding to a respective operation block by means of sense lines coupled thereto. The transformers in the respective arrays are arranged in columns and rows, such that signals applied to coordinate drive lines of a selected column and a selected row complete a circuit to enable a timed drive pulse to be supplied to a selected one of the transformers, whereby program control signals are induced on the sense lines coupled to the selected transformer. The sense lines are in turn connected to respective logical circuits for rendering operative these logical circuits whenever a pulse is induced on their respective sense lines, the sense line of each logical circuit being coupled to all program control transformers corresponding to operation blocks in which the logical circuit is to be rendered operable.

Although the transformers of the control arrays may be selected in a fixed sequence to perform data processing operations during successive operating cycles, provision is also made to permit the set of operations performed during a specific operation block to be succeeded by itself in a repeat or "sticking" procedure, or to permit one or more of the operation blocks to be "skipped" over by suitable selection of the next program control transformer.

In considering the operation of the present computer system in handling and operating on information, it will be shown that the computer system in accordance with the present invention is capable of handling both numeric and alphabetic data with variable length operands. The specific data structure is determined by considering the information to be handled and the most efficient manner in which the machine can handle the information. Information normally consists of numbers, each including digits and/or letters, in a variety of lengths. A number, for example, might have nine digits or letters or only two digits. It is common for computers to handle digits or letters as a basic group called a word. A prior computer system, for example, is so arranged to handle words, each of which is ten alpha-numeric characters in length wherein an alpha-numeric character, or more simply a character, is a configuration of six binary digits or bits, and a decimal digit is a configuration of four bits. Where the data or information is shorter than sixty bits, meaningless zeroes must be included, resulting in a waste of processing time and storage space. In other prior machines or systems where no basic grouping of digits, e.g., ten characters, is employed to avoid the foregoing disadvantages, the information is handled as multiples of single characters. The disadvantage of the latter technique is that it requires more time to handle information in varying multiples of characters.

In the present computer system to be described in detail hereinafter, the basic grouping of characters into a word consists of three numeric digits (decimal or hexadecimal coded binary digits) of four bits each, or two alpha-numeric binary coded characters of six bits each wherein one to eight words can be handled at one time with equal facility. Thus, it will become evident that the present system has the advantages of handling information by the use of grouping of digits into words, while being flexible to minimize waste of processing time and storage space as found in systems which, for example, group ten characters in a word.

The basic storage unit in the present system, therefore, is a word which consists in twelve bits. The twelve bits for storage of information provides complete flexibility in dealing with three numeric or two alpha-numeric characters. If more than three numeric or two alpha-numeric characters are required to represent a number, up to eight consecutive words may be used to represent a number, and the number of consecutive words is designated the field length, or simply, the field. When the data consists of digits only, with four bits sufficing for each digit, the word can be considered to be three digits long. The dual representation is important in a data processor because the majority of the data is numeric, since such a dual representation permits numeric digits to be processed 50% faster than alpha-numeric characters. In addition to the greater speed provided with the same equipment, the four bit representation for digits decreases the required internal and external memory space for the same data.

From the foregoing general description of an exemplary embodiment of a computer system in accordance with the invention, it will be understood that the aforementioned objects are accomplished by employing a novel operating cycle having a repetition rate commensurate with the logical clock pulse during which program control, main memory, auxiliary memory, logic, and decision operations are concurrently performed in response to timing pulses derived from analog timing means, each of these operations being capable of being changed during each operating cycle in accordance with the operation block which is to be performed during that operating cycle. Also, drivers, intsead of flip-flops, are used in performing decision and other intermediate logic in order to permit the results of all the logical operations performed in accordance with the predetermined combination of logical circuits rendered operable during each operating cycle to be propagated to the logic inputs of the logical flip-flops prior to the logical clock pulse occurring during that cycle, so that the logic can be advanced for each logical clock pulse and a different operation block can be performed in each operating cycle.

The specific nature of the invention as well as other features, advantages, uses, and objects thereof will become apparent from the following detailed description of an exemplary embodiment of a computer system in accordance with the invention and from the accompanying drawing for said embodiment in which.

Figure 1:
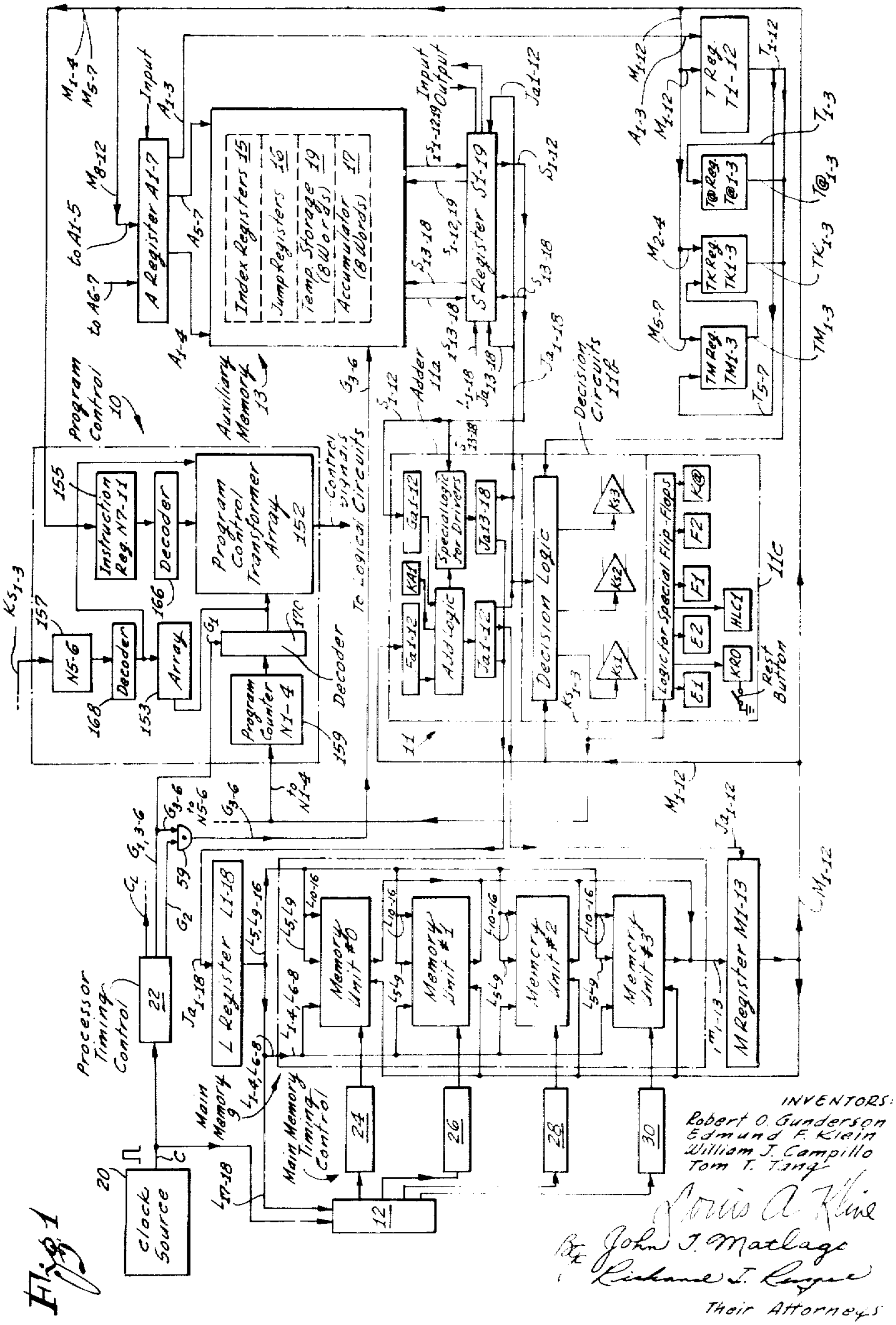
FIG. 1 is a schematic block diagram showing diagrammatically the general arrangement of the present computer system.
Figures 5, 5A:
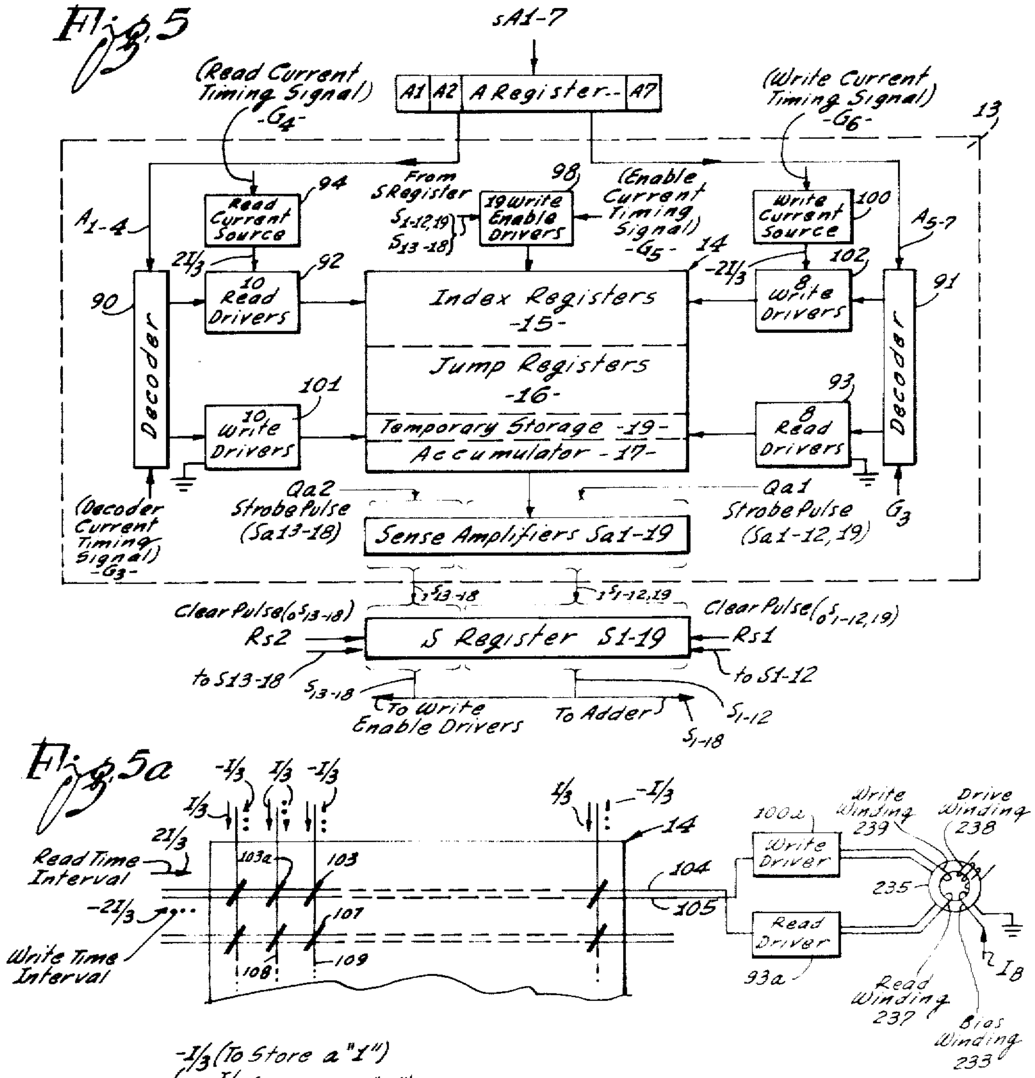
FIG. 5 is a schematic block diagram of the auxiliary memory illustrated more generally in FIG. 1.
Figure 6A:
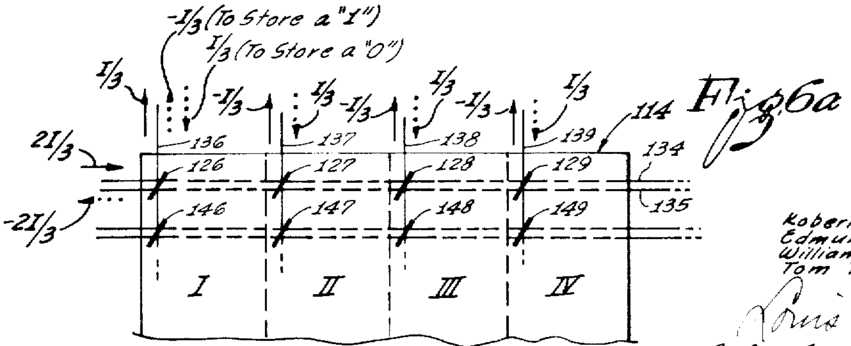
Figure 9:
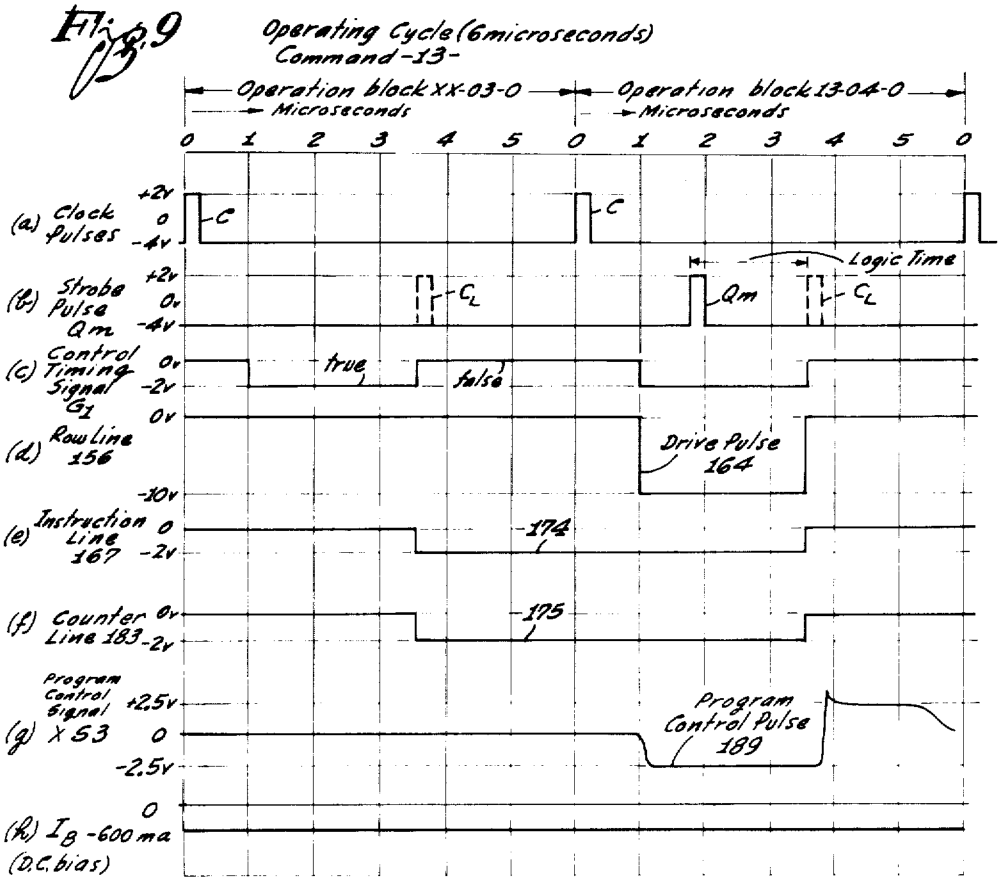
Figure 5B:
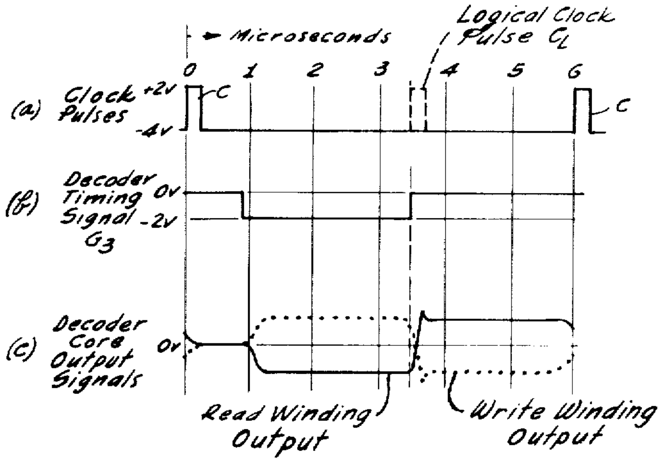
Figures 6, 8:
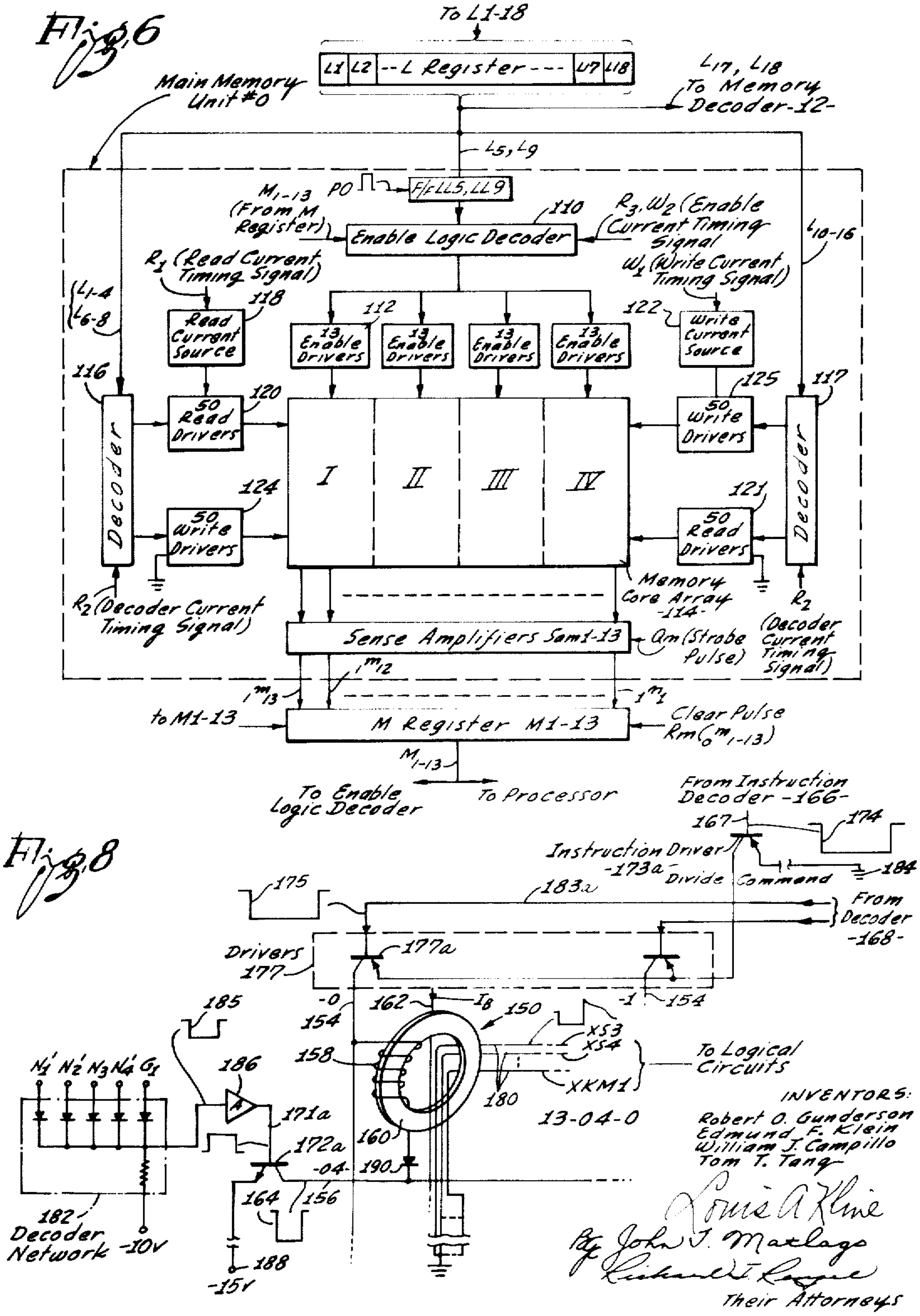
Figure 7A:
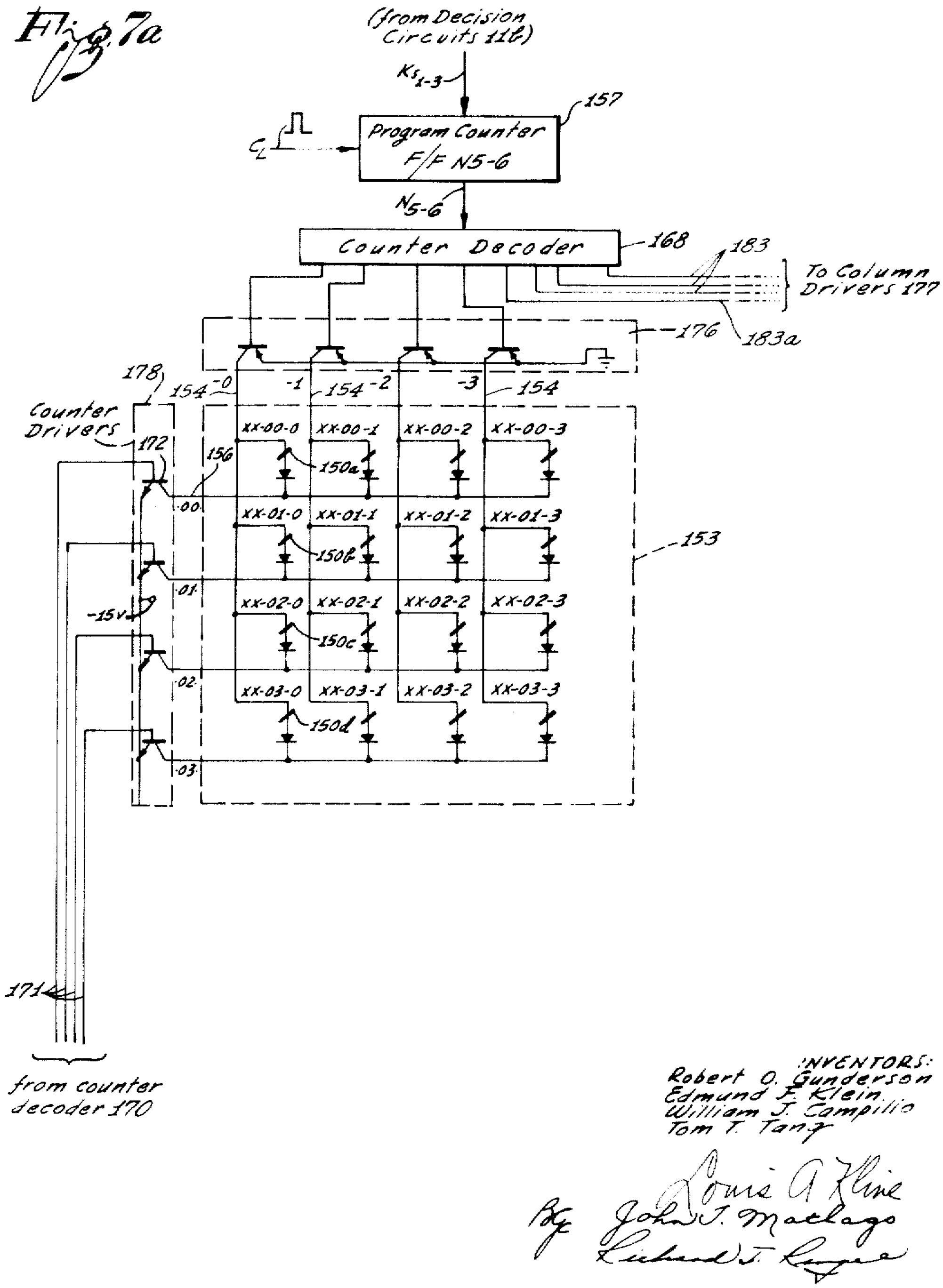
Figure 7F:
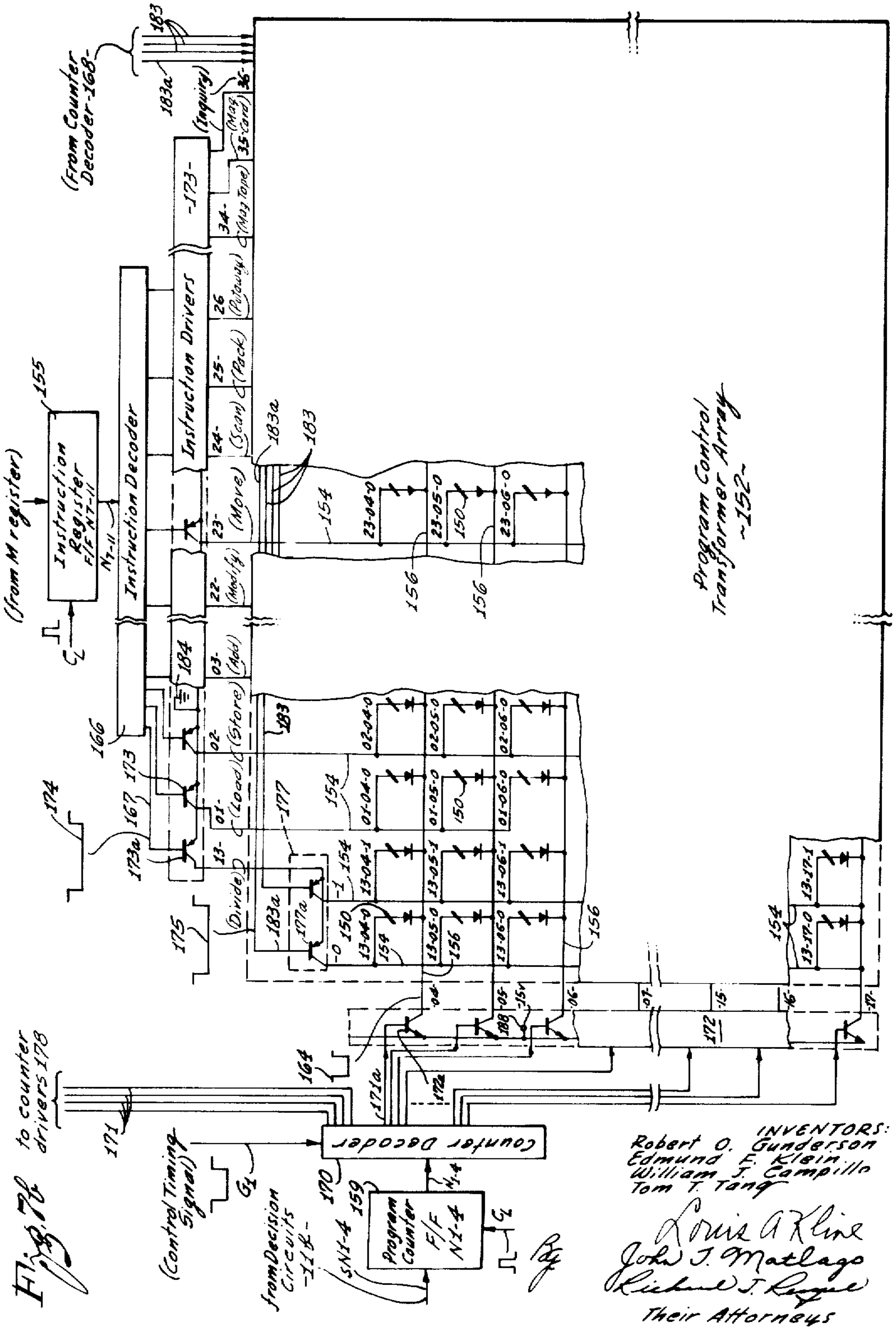
Figure 10:
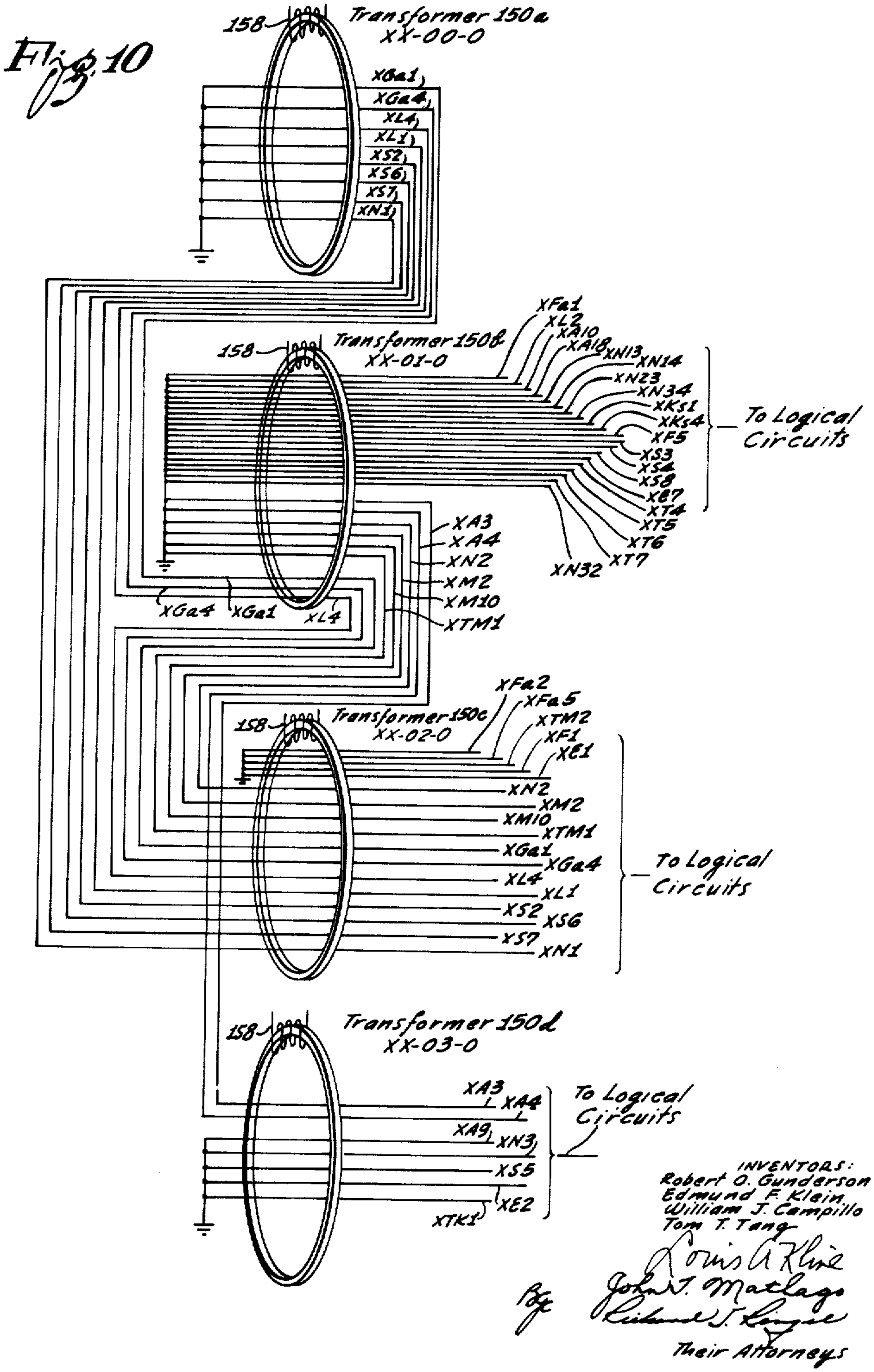
Figure 17:
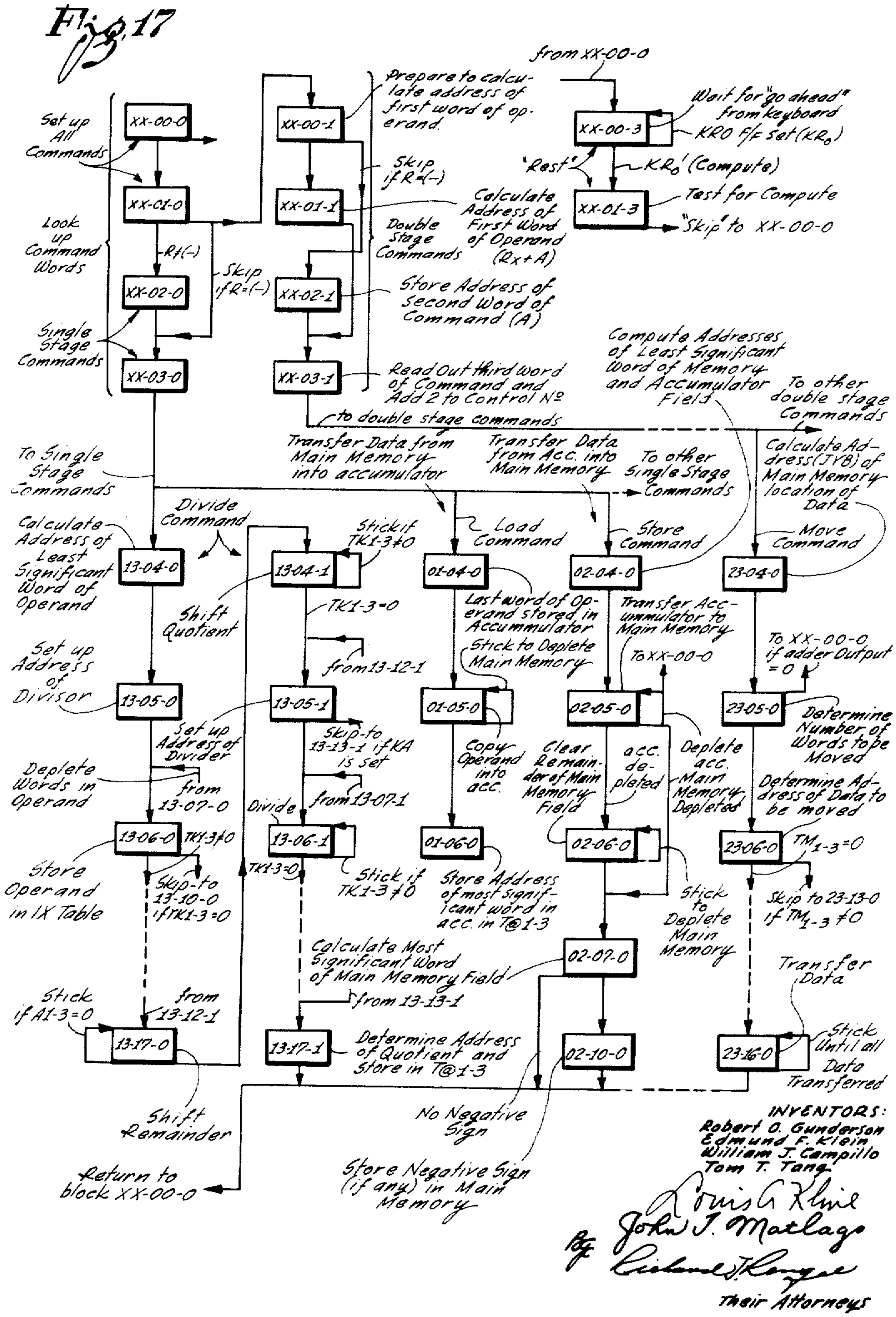
Figures 21A, 21B, 21C, 21D:
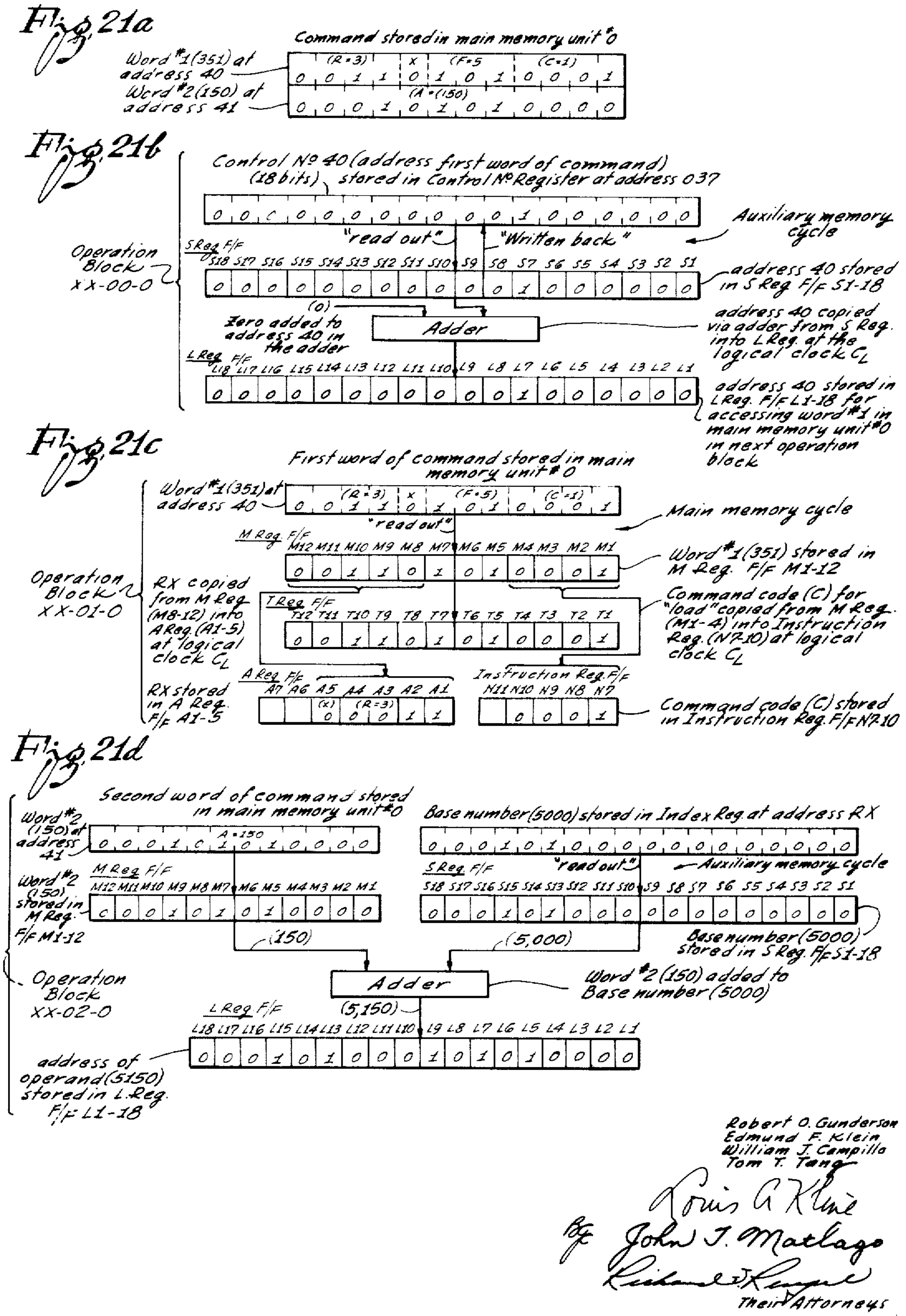
Figure 22:
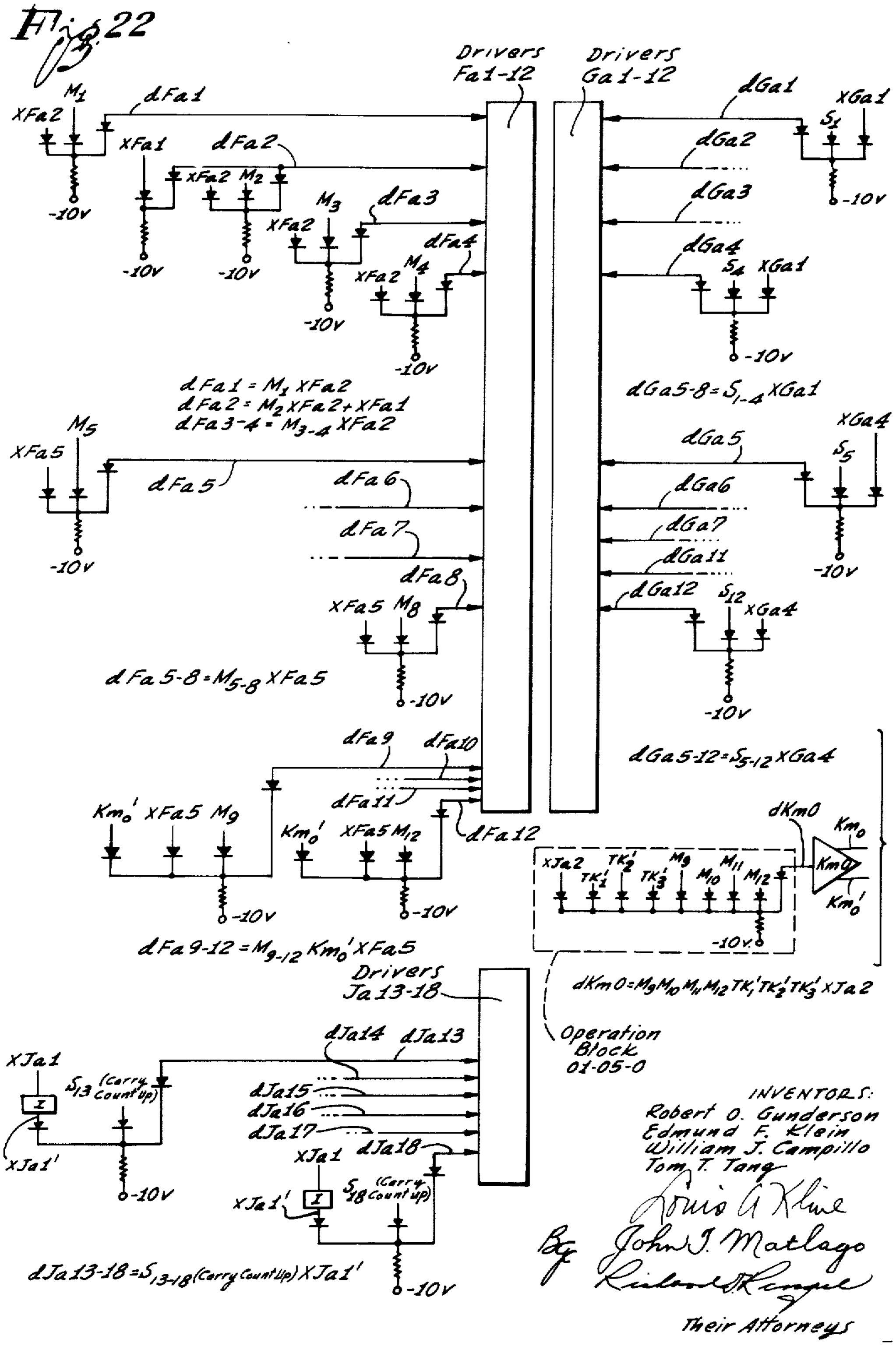
Figure 22A:
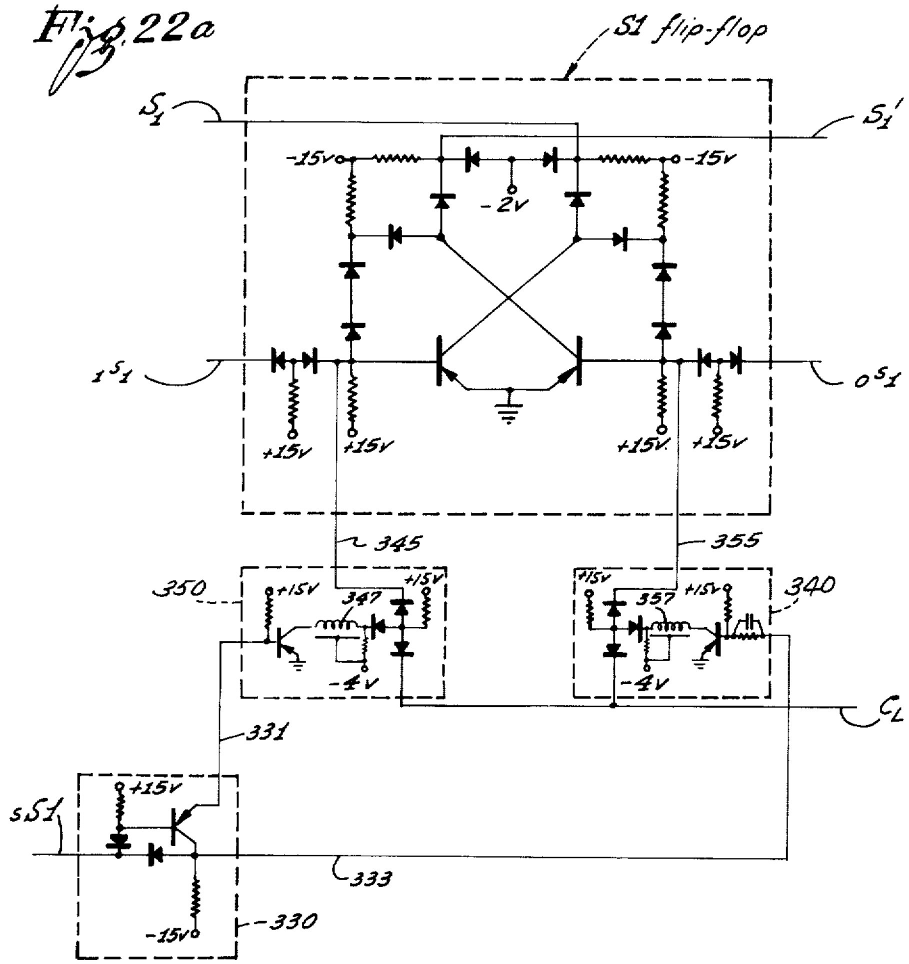
Figure 29A:
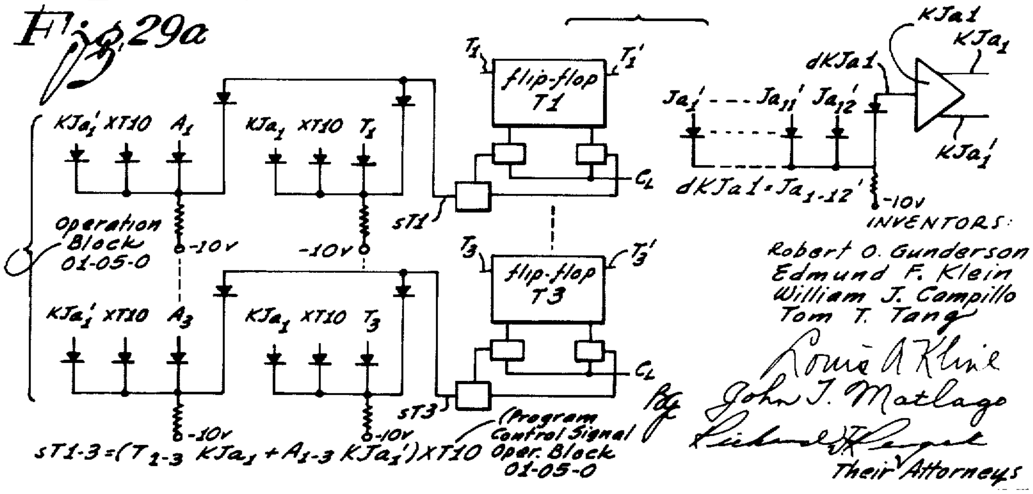
Figure 23:
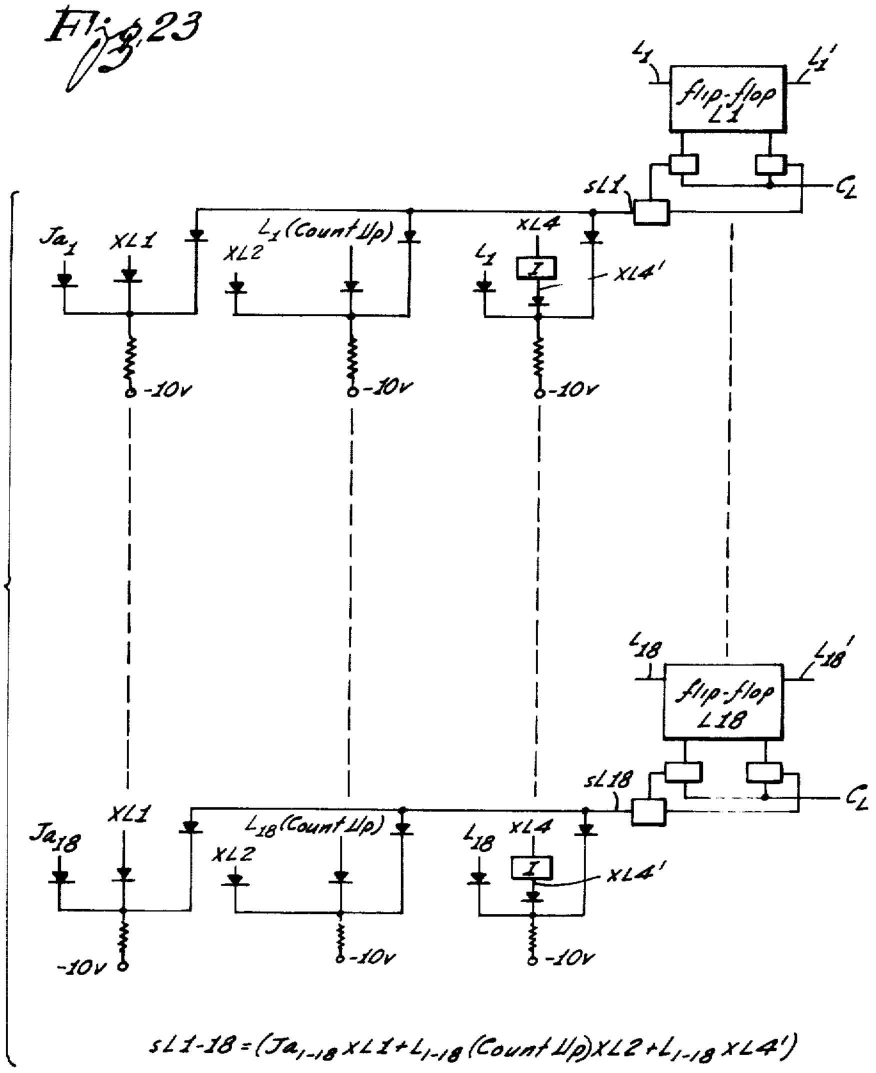
Figure 24:
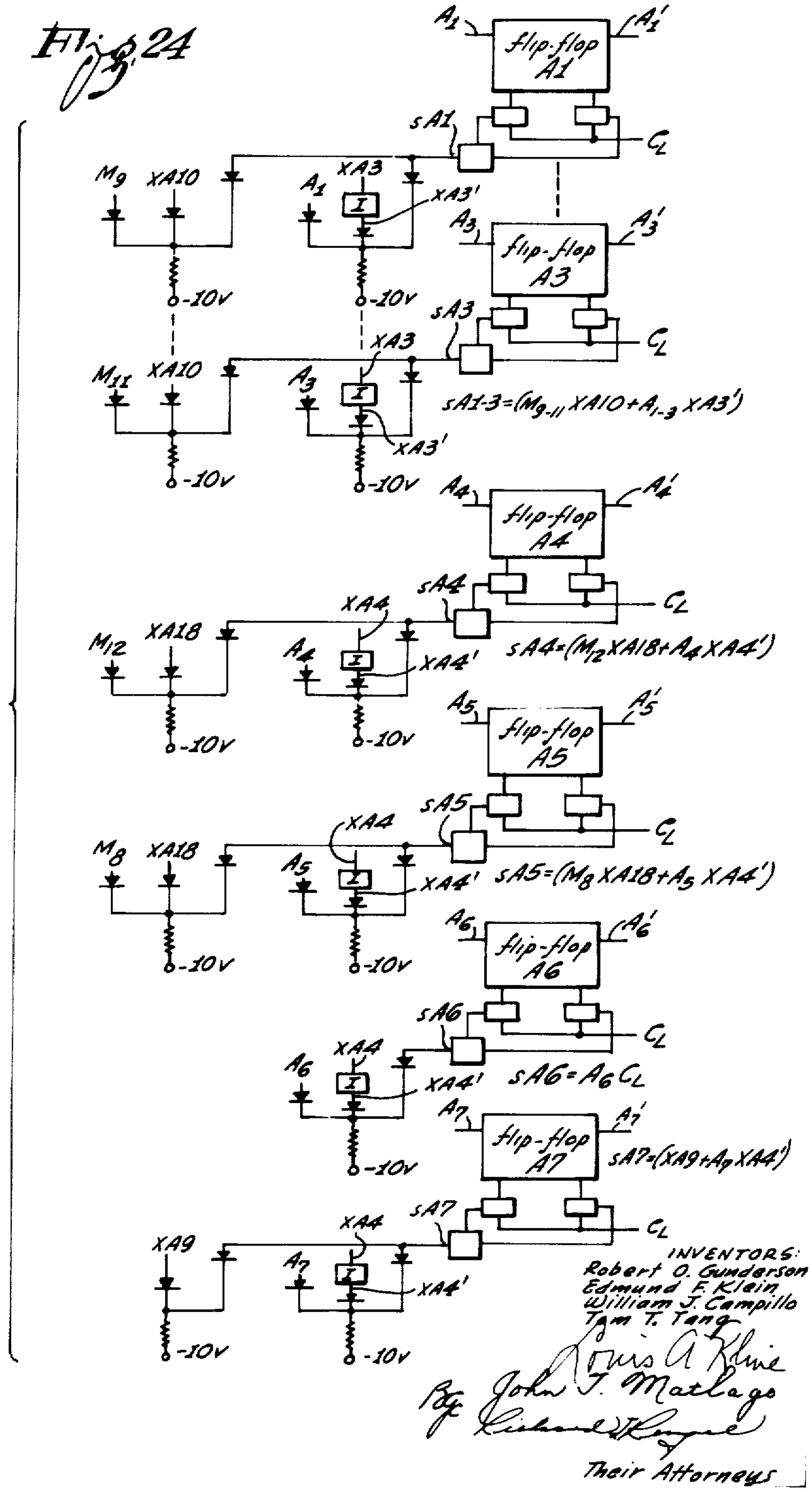
Figure 25:
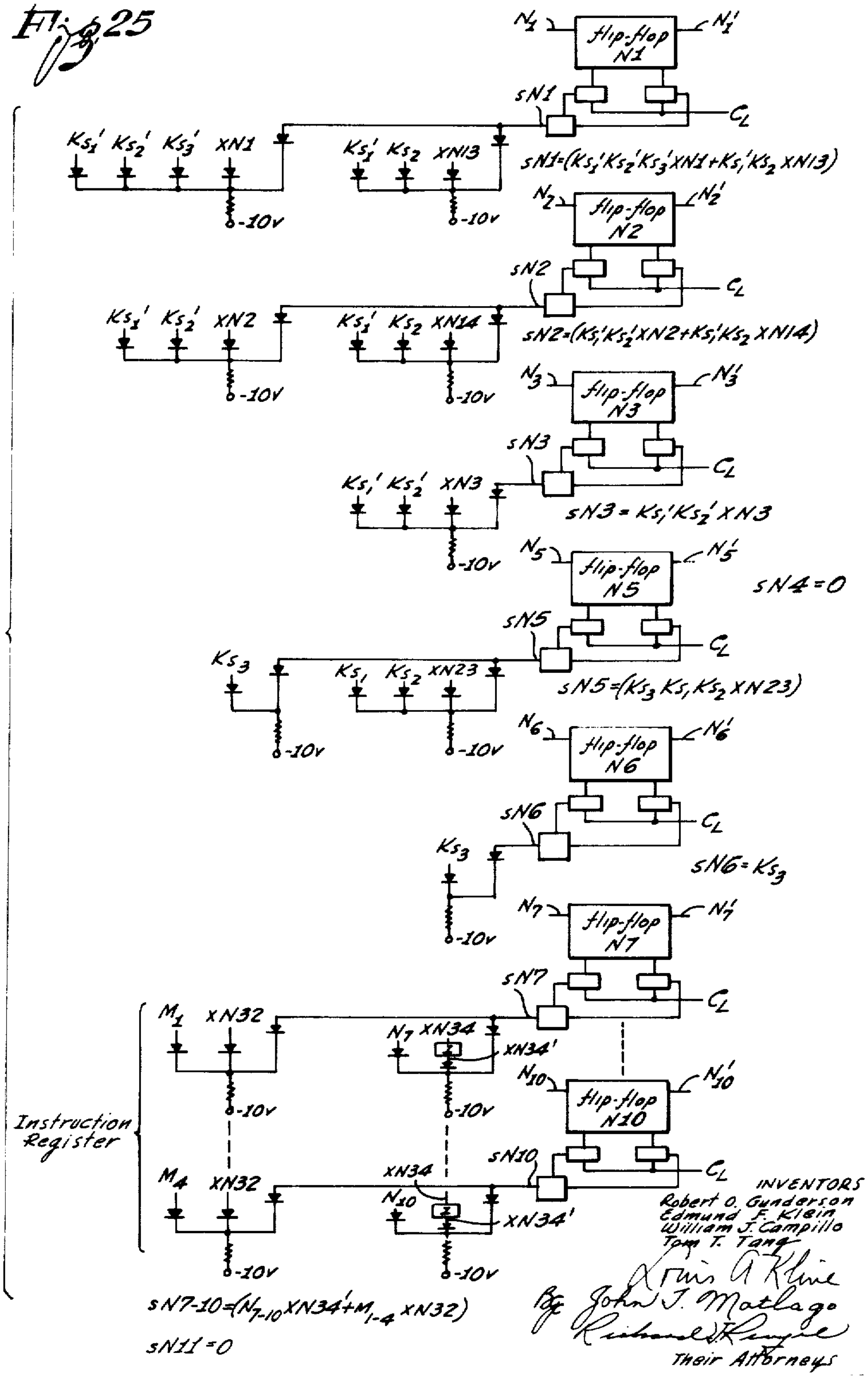
Figure 26:
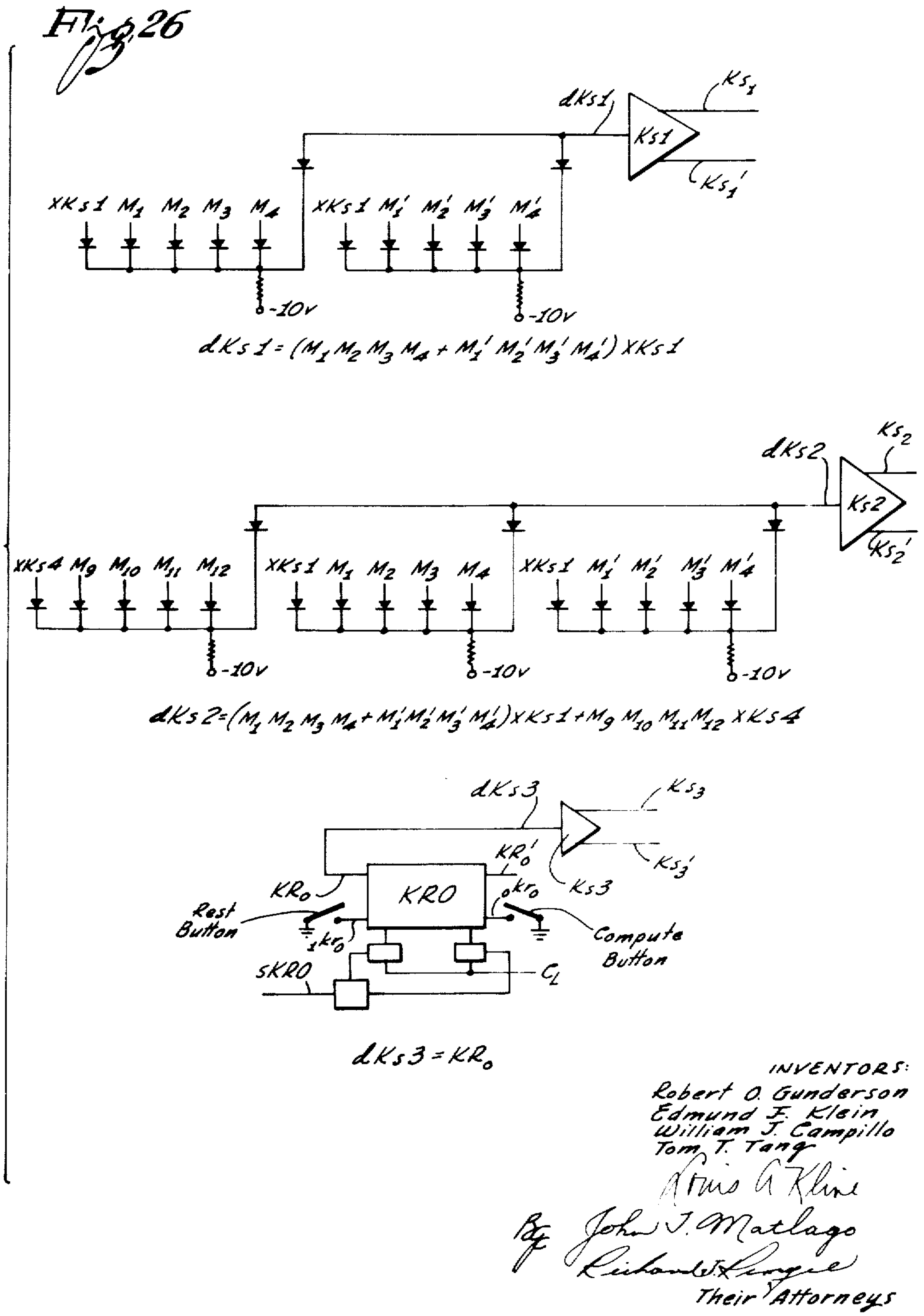
Figure 27:
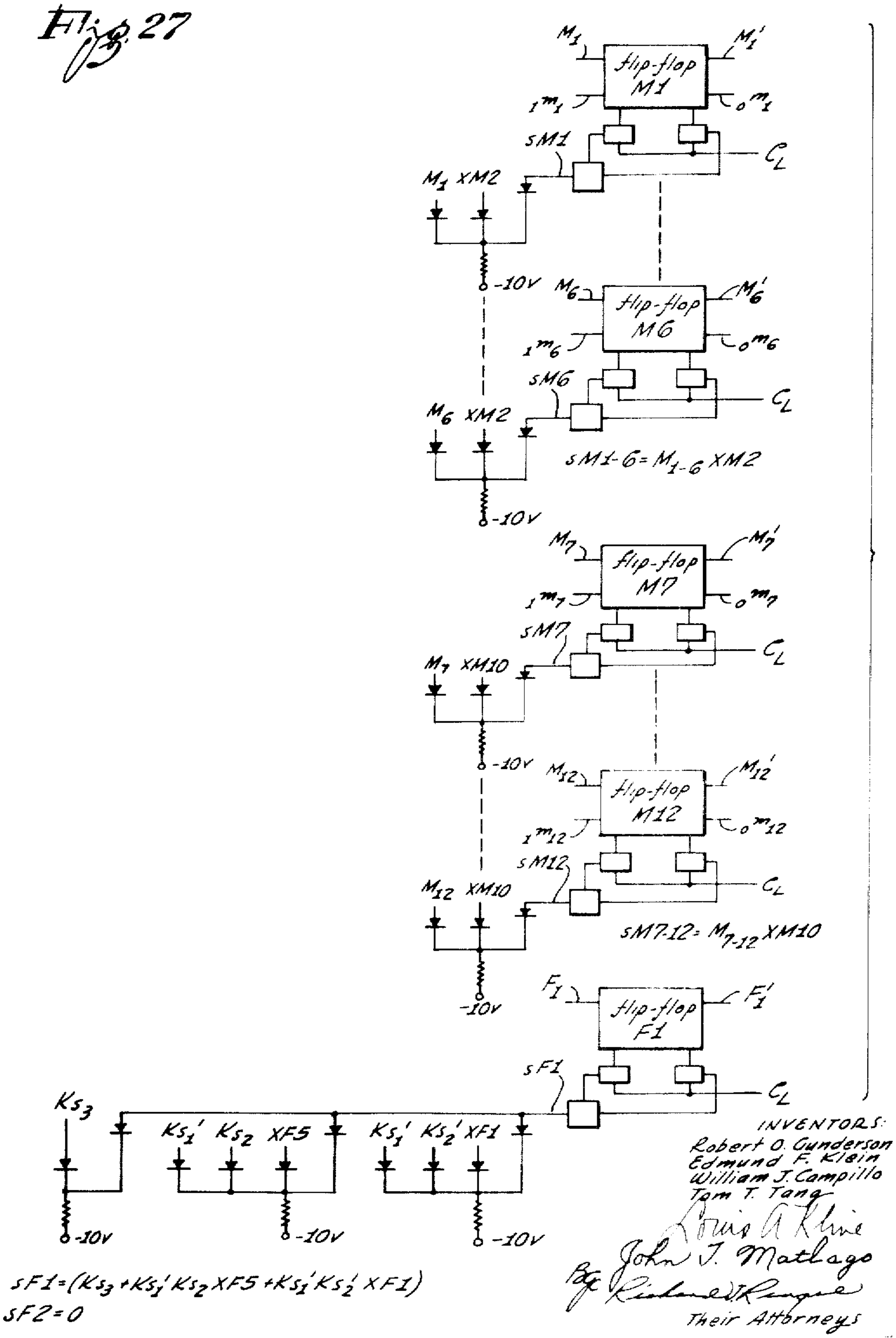
Figure 28A:
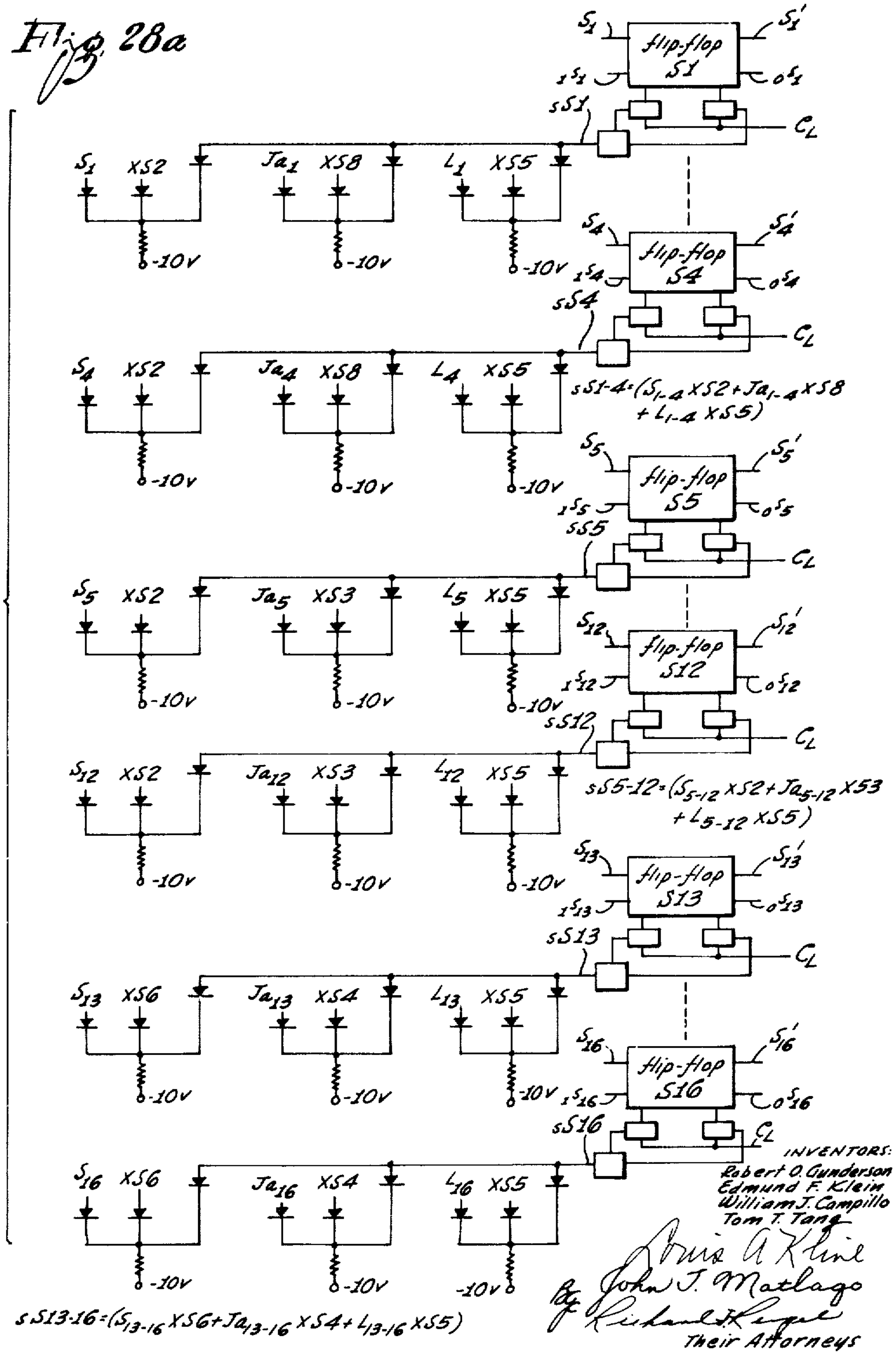
Figure 28B:
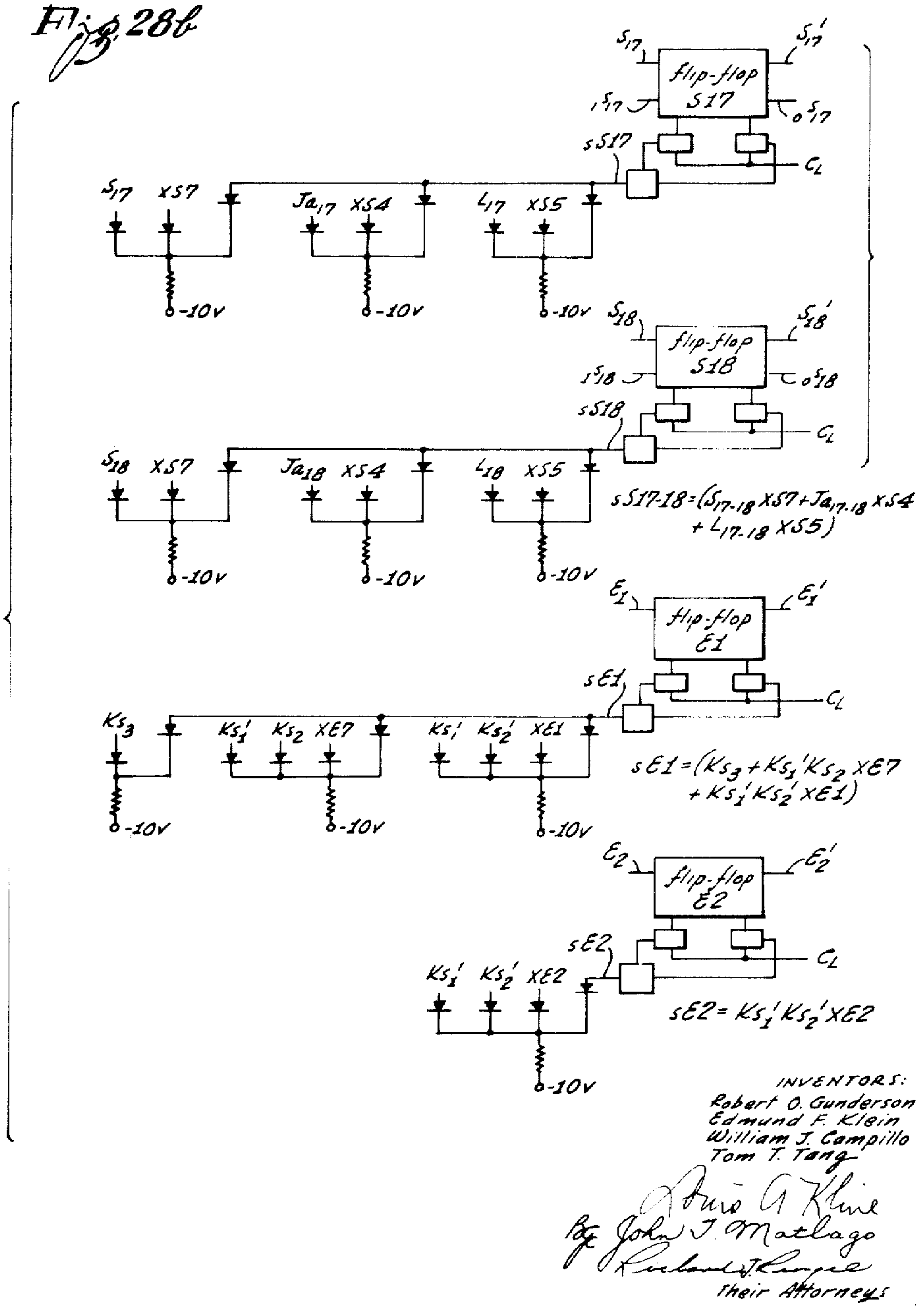
Figure 29:
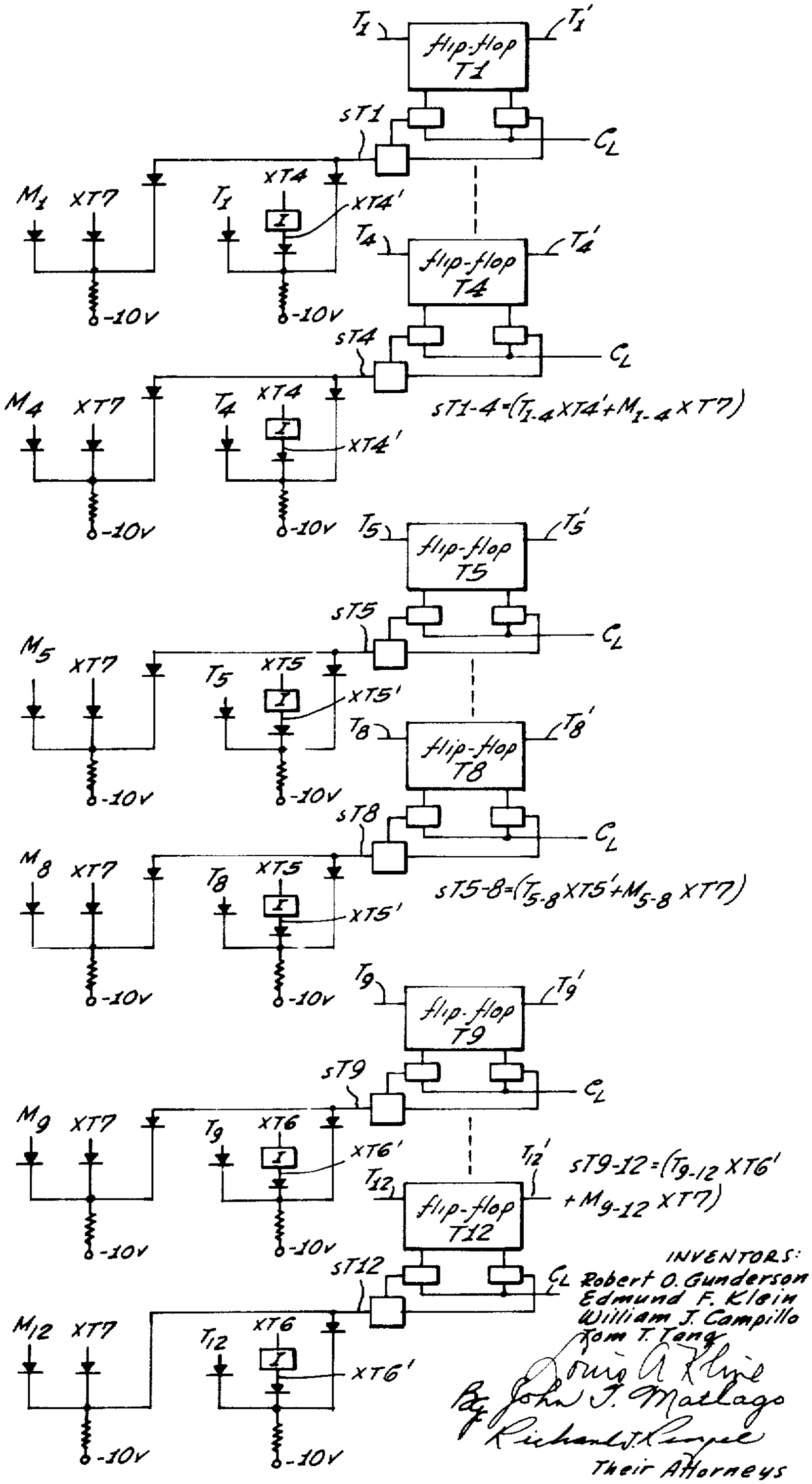
Figure 30:
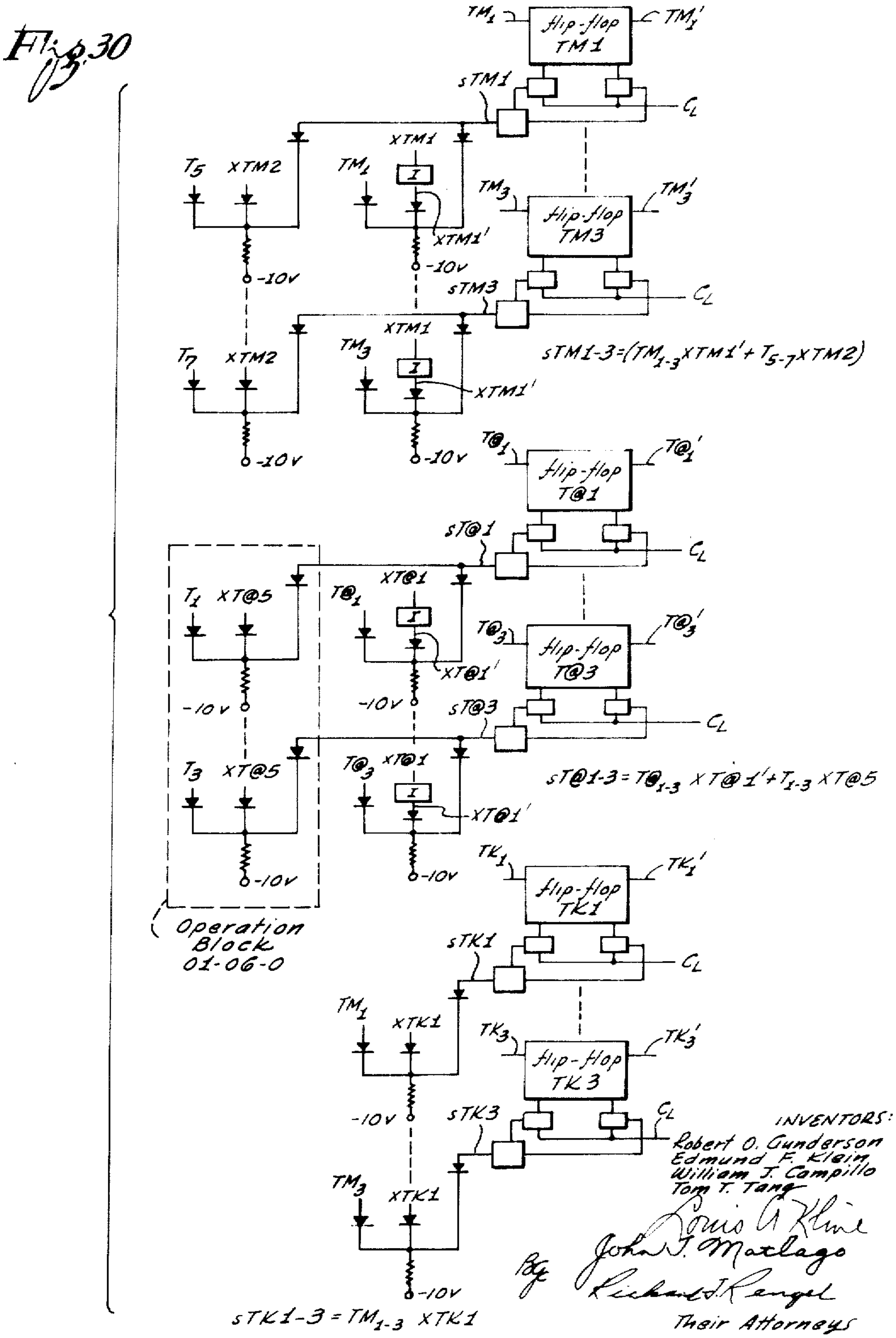

FIG. 5*a* is a detailed diagram of a portion of the auxiliary memory shown in FIG. 5;

FIG. 5*b* is a timing diagram for the auxiliary memory shown in FIG. 5;

FIG. 6 is a schematic block diagram of a typical main memory unit which is illustrated in FIG. 1;

FIG. 6*a* is a detailed diagram of a portion of the main memory unit shown in FIG. 6;

FIGS. 7*a* and 7*b* taken together, are a schematic diagram, partially in block form and broken away in parts, showing the program control system which is illustrated more generally in the block diagram in FIG. 1;

FIG. 8 is a detailed wiring diagram of a selected portion of the program control system shown in FIG. 7*b* for illustrating the operation of the program control system;

FIG. 9 is a timing diagram of selected signals which are produced in the operation of the program control system shown in FIGS. 7*b* and 8;

FIG. 10 is a detailed wiring diagram of selected transformers of the program control transformer arrays illustrated schematically in FIG. 7*a*;

FIG. 11 is a diagram showing portions of a table of the binary states of the flip-flops of the instruction register for the various processor commands;

FIG. 12 is a table showing the binary states of the flip-flops of the program counter;

FIG. 13 is a table showing the binary states of flip-flops of the instruction register and the program counter for a typical command, for illustrating typical operations of the processor;

FIG. 14 is a table showing the binary states of the flip-flops of the instruction register and the program counter for another typical command, for illustrating the operation of the processor;

FIG. 15 is a diagram illustrating the arrangement of data for a single stage command;

FIG. 16 is a diagram illustrating the arrangement of data for a double stage command;

FIG. 17 is a command flow diagram indicating exemplary commands controlled by corresponding groups of program control transformers of the program control transformer array shown in FIGS. 7*a* and 7*b*, for illustrating operation blocks common to all processor commands, single stage commands, and operation blocks specific to typical commands;

FIGS. 18 through 21 are amplified details of a portion of the command flow diagram of FIG. 17 and showing exemplary processing operations to be performed during a series of exemplary operation blocks, and the corresponding logical equations for providing the operations indicated;

FIGS. 21*a*, 21*b*, 21*c*, and 21*d* are flow diagrams illustrating processing operations on exemplary data in the series of operation blocks shown in FIGS. 18 to 21, respectively;

FIG. 22 shows a selected portion of the adder inputs, including a schematic circuit diagram of exemplary logical circuits, and corresponding logical equations therefor to illustrate the operations of the exemplary operation blocks illustrated in FIGS. 18 to 21, inclusive;

FIG. 22*a* is a detailed circuit diagram of a typical flip-flop including input gating and drive circuits therefor;

FIG. 23 shows the L register, including a schematic circuit diagram of logical input gating networks, and corresponding logical equations therefor, for exemplary operation blocks as illustrated in FIGS. 18 to 21, inclusive, and as illustrated in block form by the L register in FIG. 1;

FIG. 24 shows the A register schematically, including schematic circuit diagrams of logical networks for exemplary operation blocks as illustrated in FIGS. 18 to 21, inclusive;

FIG. 25 is a schematic diagram of the program counter and the instruction register for the program control system, including a schematic circuit diagram of logical networks for exemplary operation blocks illustrated in FIGS. 18 to 21;

FIG. 26 is a schematic diagram of a selected portion of the decision circuits and other circuits, shown in block form in FIG. 1, to illustrate the operations of the exemplary operation blocks illustrated in FIGS. 18 to 21;

FIG. 27 is a schematic diagram of the M register and special main memory cycle control flip-flops, shown in block form in FIG. 1, including a schematic circuit diagram of logical networks for exemplary operation blocks of FIGS. 18 to 21;

FIGS. 28*a* and 28*b* are schematic diagrams of the S register and special auxiliary memory cycle control flip-flops, shown in block form in FIG. 1, including a schematic circuit diagram of logical networks for exemplary operation blocks of FIGS. 18 to 21;

FIG. 29 shows the T register schematically illustrated in block form in FIG. 1, including a schematic circuit diagram of logical networks for the exemplary operation blocks of FIGS. 18 to 21;

FIG. 29*a* shows a portion of the T register to illustrate selected logical operations in an exemplary command;

FIG. 30 shows certain special registers schematically illustrated in block form in FIG. 1, including a schematic circuit diagram of logical networks for the exemplary operation blocks of FIGS. 18 to 21.

Referring now to the drawings, wherein like reference characters designate like or corresponding parts throughout the several views, there is illustrated in FIG. 1, a simplified schematic diagram of a preferred embodiment of the computer system of the present invention. The computer system includes: a main memory 9 having individual memory units #0, #1, #2, and #3 for storing information including programming data, working data and intermediate results in storage cells thereof, each storage cell having a one-word capacity; an auxiliary memory 13 containing various specially designated storage cells or registers; a program control system 10; and timing control apparatus including a clock source 20 which feeds clock signals to processor timing control circuit 22 and timing control circuits 24, 26, 28, and 30 for the respective memory units #0, #1, #2, and #3 of the main memory. As will be discussed, infra, in connection with FIG. 2, the timing control circuits are employed to define, during each basic operating cycle of the computer: (1) the timing of the operation of reading and writing data in the main memory 9 and the auxiliary memory 13, (2) the timing of the operation of the program control 10, and (3) the timing of the application of a logic clock pulse $C_L$ to the logical flip-flops in order to advance the logical sequencing of the computer.

In the preferred embodiment of the present invention, each of the main memory units #0, #1, #2, and #3 has a storage capacity of 10,000 words providing a total storage capacity of 40,000 words. The basic information unit in the computer system is a word which consists of 12 bits plus a parity check bit. Each memory unit of main memory 9 provides an assigned address for each storage cell or stored word and each word is individually addressable by a common address register, the L register. The main memory 9 stores the program information, i.e., the commands, as well as the working data and intermediate results, and there is no restriction on the assignment of memory cells for the program or data. Information is transferred to, from, and between the various memories in the form of parallel information bits comprising one or more words which are also in parallel, i.e., each of the twelve bits of a single word as well as the words themselves are transferred simultaneously in parallel rather than in sequence, as in a series transfer. Arithmetic operations in the adder 11*a* also process both complete words and their respective bits in parallel.

The auxiliary memory 13, which is included as a part of the processor, contains various special registers, including index registers 15, jump registers 16, temporary storage registers 19, and an accumulator 17. The registers in the auxiliary memory 13 are accessible via the input-output lines to the S register by means of special commands or by a keyboard (not shown). The auxiliary memory 13 comprises eighty memory cells, sixty-four of which comprise the index and jump registers 15 and 16, in which each memory cell stores eighteen bits plus a parity check bit. The accumulator 17 comprises eight memory cells for storing eight words, each word containing twelve bits plus parity. The register for temporary storage 19 consists of eight memory cells for temporary internal storage which are used by the processor during the execution of certain commands.

In order to provide access to the 40,000 words stored in the main memory 9, an eighteen bit address is required. This address consists of four decimal coded binary digits of four bits each and an additional two bits for the most significant digit for individually addressing a particular one of the memory units #0, #1, #2, and #3. The auxiliary memory 13, on the other hand, is accessed by an address consisting of seven bits. Detailed descriptions of the auxiliary memory 13 and main memory 9 are set forth infra in connection with FIGS. 5 and 5*a* for the auxiliary memory 13 and FIGS. 6 and 6*a* for the main memory 9.

The flip-flop registers shown in block form in FIG. 1 include not only the flip-flop circuits, e.g., as shown in FIG. 22*a*, but also the logical networks associated with the respective flip-flops as illustrated by the exemplary logical input networks for the registers shown in FIGS. 23 to 25 inclusive and 27 to 30 inclusive. In the adder 11*a*, blocks for input drivers F*a*1–12 and G*a*1–12 include their respective logical input networks as indicated by the exemplary logical input circuits shown in FIG. 22. The decision logic for drivers K*s*1–3 is illustrated by the typical logical input networks shown in FIG. 26. Similarly the logic for the special flip-flops 11*c* in FIG. 1 are indicated by typical logical input networks coupled to respective flip-flops F1 and E1, E2 in FIGS. 27 and 28*b*.

A brief discussion of each flip-flop register shown in FIG. 1 will now the presented in order to disclose the manner in which information is transferred or distributed in the computer system. Associated with the main memory 9 are the L register and the M register. The L register includes eighteen flip-flops, L1–18, and is used as the address register for the main memory 9. Flip-flops L1–16 are capable of designating an address ranging from 0000 to 9999 to provide access to each of 10,000 storage cells in any one of the four memory units #0–#3, and the particular memory unit is addressed by flip-flops L17–18. The M register, which comprises thirteen flip-flops, M1–13, and their associated logical networks, is employed as the input-output register for the main memory 9, including units #0, #1, #2, and #3, wherein flip-flops M1–12 store the word of information being transferred into or out of the particular unit of the main memory, and the flip-flop M13 stores the parity check bit.

The A register and the S register are provided for the auxiliary memory 13. The A register includes seven flip-flops A1–7 and is the address register for the auxiliary memory. The function of the A register is similar to the L register in that it determines which memory cell in the auxiliary memory 13 will be accessed during an auxiliary memory cycle. The S register includes nineteen flip-flops, S1–19, and their associated logical input networks and is employed as the input-output register for the auxiliary memory. The function of the S register is similar to the M register in that any information which is read from or written into the auxiliary memory 13 passes through the S register. In addition, information transferred to and from the computer system passes through the S register, as indicated by the input and output lines to the S register in FIG. 1. The information transfer is to and from peripheral input-output equipment (not shown) to either the auxiliary memory 13 directly from the S register or to the main memory 9 through the M register. Flip-flops S1–18 are used for storing information bits while flip-flop S19 stores the parity check bit during read out of either the index and jump registers. The eighteen bit storage capacity of the auxiliary memory and S register is required in order to handle the higher order addresses of cells in the main memory. During auxiliary memory cycles in which one of the cells for the accumulator 17 is accessed, only twelve bits of information, i.e., a word, is transferred from the accumulator cell and provision is made for utilizing only flip-flops S1–12 for storage of words being transferred during the memory cycle so that the remaining flip-flops S13–18 can then be conveniently utilized as a shift register. The operation of the auxiliary memory and the S register, in order to provide for variable length storage, will be discussed in detail later in the detailed descriptions of the timing control apparatus shown in FIG. 2 and the auxiliary memory 13 shown in FIG. 5.

The flip-flops N1–11 are used for individual selection of transformers in the program control transformer arrays 152 and 153 for controlling the operation of the computer system. Flip-flops N7–11 comprise the instruction register and are used for storing the command code or instruction while flip-flops N1–6, designated as the program counter flip-flops, complete the coordinate selection for the transformers in the program control transformer array 152. The T register including flip-flops T1–12 and the flip-flops of the remaining registers, TM, TK, and T@ provide temporary storage of certain information required and not otherwise immediately available for making decisions in the control of the sequence of operations of the computer system. The T, TM, T@, and TK registers are used internally by commands and some of their many functions will become more apparent in the detailed description, infra.

The adder 11*a*, in addition to its ordinary function of adding, provides for the transfer, without addition or subtraction, of information between the S and M registers and from the S register to the L register. The adder thus provides a convenient link between the S, L, and M registers and avoids the necessity of a direct link between these registers. It will be noted, from the description of FIGS. 18–21, that the transfer of information without change is made by adding a zero to the information being transferred.

The jump register 16 is used primarily for the storage of the starting addresses of subroutines which will automatically be entered if, during the execution of certain double stage commands, certain abnormal conditions are encountered. These conditions relate to peripheral equipment which have not been indicated in FIG. 1, but examples of these conditions comprise sensing a signal indicative of the end of the paper on a high speed printer, the end of the tape on a magnetic tape handler, read or write errors detected on the magnetic tape handler, or a parity error detected while reading a punched paper tape. Any one of these conditions may occur during access to peripheral equipment and will cause predetermined subroutines while the starting addresses are stored in the jump register to take appropriate action. The accumulator 17 is a register having a storage capacity of eight words of twelve bits each. Its primary function is to store intermediate and final results of arithmetic operations. The sign of a number is not stored in the accumulator itself, but is stored by the flip-flop K@ in the group of special flip-flops 11*c*. The effective length of the accumulator may vary from one to eight words, depending upon the length of the information, e.g., number, it contains. The T@ register stores the effective length of the accumlulator. If, for example, a four, five, or six digit number is in a memory field having a length of eight words, and the field is transferred from the main memory to the accumulator, the effective length of the accumulator will be two words corresponding to the number and the remaining words of the memory field which are zeroes will be ignored. Only information contained in the effective portion of the accumulator will be considered by the processor. In the above example, the six remaining words, i.e., the total length of eight words less the effective length of two words, are automatically ignored when the new sum in the accumulator is used for additional arithmetic operations, if the sum is to be stored in the main memory, or if it is to be used by a command to indicate quantity.

In transferring the number from the main memory 9 to the accumulator 17, the flip-flops A1–3 in the A register, and the flip-flops T1–4 in the T register are set to 7. The words in the main memory 9 are transferred to the accumulator 17 through the adder 11*a*. As each word is transferred to the accumulator through the adder 11*a*, flip-flops A1–3 are decremented by one. If the word being transferred contains a significant digit, the flip-flops T1–4 are set by flip-flops A1–3. After the last word is transferred from the main memory to the accumulator and in the following operating cycle, the flip-flops T@1–3 of the T@ are set by the flip-flops T1–4.

Any memory cell in the index registers 15, jump registers 16, or the accumulator 17 may be accessed by certain commands or manually from the input keyboard (not shown) in order to store or change the number in the addressed register. Access to the registers in the auxiliary memory 13 is provided through the S register at the address placed in the A register. The foregoing is provided by lines connected directly from the input keyboard to logical networks in the respective A and S registers.

Prior to considering the details of the computer system, the details of the basic data structure employed in the system will be considered. Hexadecimal and decimal digits and alpha-numeric characters are employed throughout the system and are represented by four bit and six bit configurations, respectively. Sixty-four alphanumeric characters, comprising the upper case letters of the alphabet, some lower case letters of the alphabet, and certain symbols, are represented by a six bit configuration. The hexadecimal digits, or more simply, digits, lend themselves to binary configurations since four bits can be arranged in sixteen ways wherein 0, 1, 2, 3, 4, 5, 6, 7, 8, 9, @, (,), space, (&), (.), and (—) represent the sixteen different configurations of four binary digits or bits. The term "digit" refers to any of the sixteen possible configurations obtainable with four bits, while the term "character" will refer to any six bit configuration.

The binary configuration of each word consisting of twelve bits may be considered as either representing characters or digits. The following illustrations are examples of a word of information wherein a six bit configuration is employed to represent the letters B and R.

| B | R |
|---|---|
| 010010 | 101001 |

In the next example, the same word is used, but in this instance its binary configuration is considered as representing hexadecimal digits in which a word is capable of storing three digits instead of two characters as illustrated above.

| 4 | @ | 9 |
|---|---|---|
| 0100 | 1010 | 1001 |

A unit of information commonly exceeds the capacity of one word; therefore, a main memory field consisting of as many as eight adjoining words may be used for storage of a unit of information, e.g., a command or operand. The main memory field is variable in length to accommodate units of information varying in length. The variable length utilizes the memory capacity more efficiently and provides for greater speed in the execution of commands in which shorter units of information or operands are being accessed. Since the maximum field length for a unit of information is eight words, the maximum length of a positive number is twenty-four digits. If the unit of information is a name or description employing characters (each word having a capacity of two characters) the eight words provide a maximum length of sixteen characters. In the storage of digits, the sign of a negative number is stored in the most significant digit position and the maximum length of a negative number, not including the minus sign, is twenty-three digits. The following is an illustration of a positive number 2398645 which is stored in a memory field of five words starting at the memory address 100.

MEMORY FIELD

| | | | | | |
|---|---|---|---|---|---|
| Cell address | 100 | 101 | 102 | 103 | 104 |
| Positive number | 000 | 000 | 002 | 398 | 645 |

A negative sign would be stored in the most left digit position at the most significant end of the main memory field (e.g. memory address 100 in the illustration), and the absence of a negative sign indicates a positive number. It will be noted that the least significant word is located at the highest order address of the memory field, as illustrated in memory address 104. The address of the most significant word depends on the length of the number wherein the most significant digit is in the highest order address of a word in the field containing a significant digit, as illustrated at address 102. The lower order addresses of words in the memory field which are not significant digits and are all zeroes are provided, for example, for the storage of a larger number resulting from addition, etc., to the number in the memory field, and is to be stored in the same memory field. In the foregoing example, the field could be limited to three words to store the significant digits of the number 2398645 with the sign stored in the most significant digit position of the word at address 102.

TIMING CONTROL SYSTEM

Figure 2:
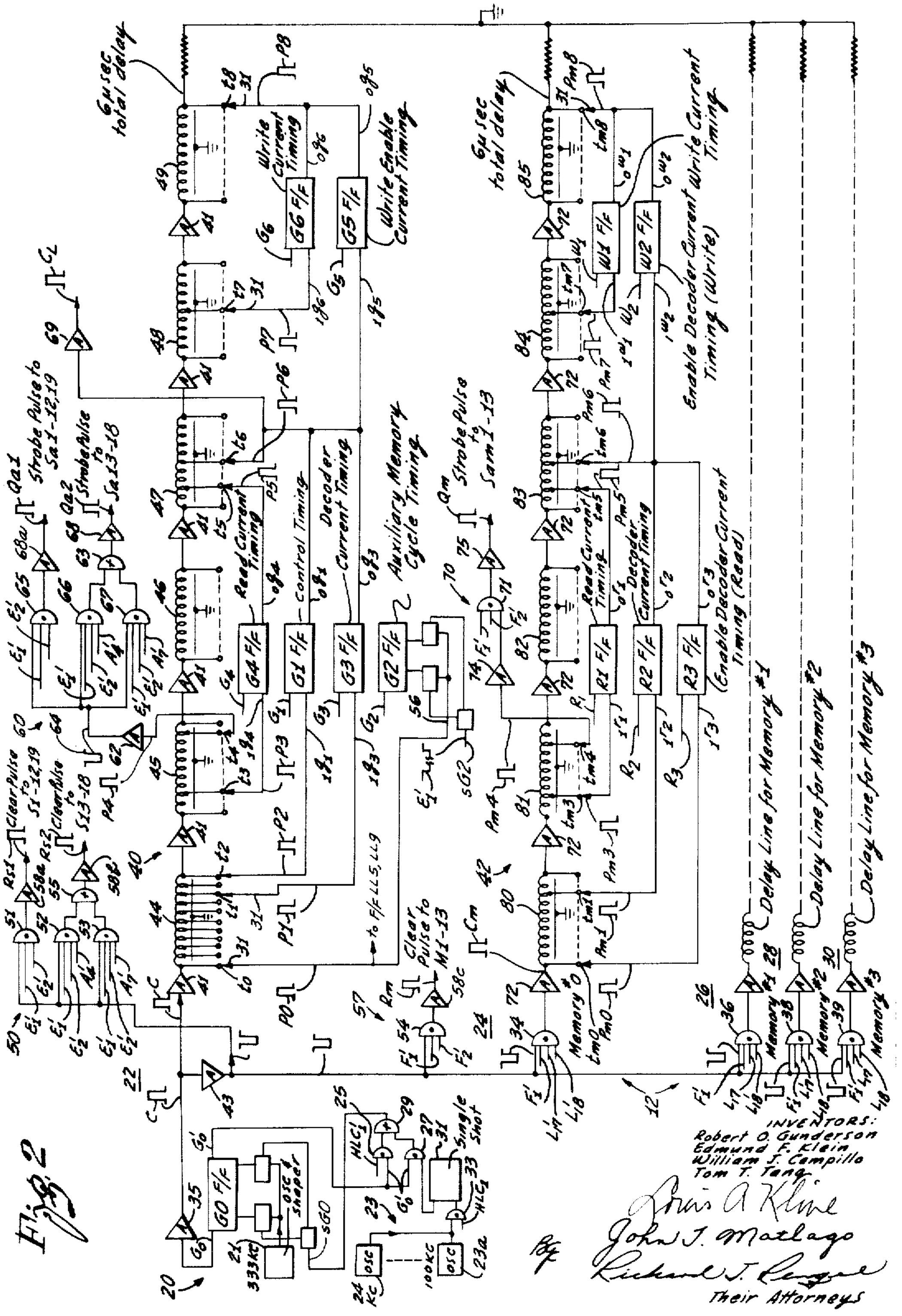
FIG. 2 is a schematic diagram illustrating the preferred timing control system providing a basic computer operating cycle for the computer system shown in FIG. 1.
Figure 3:
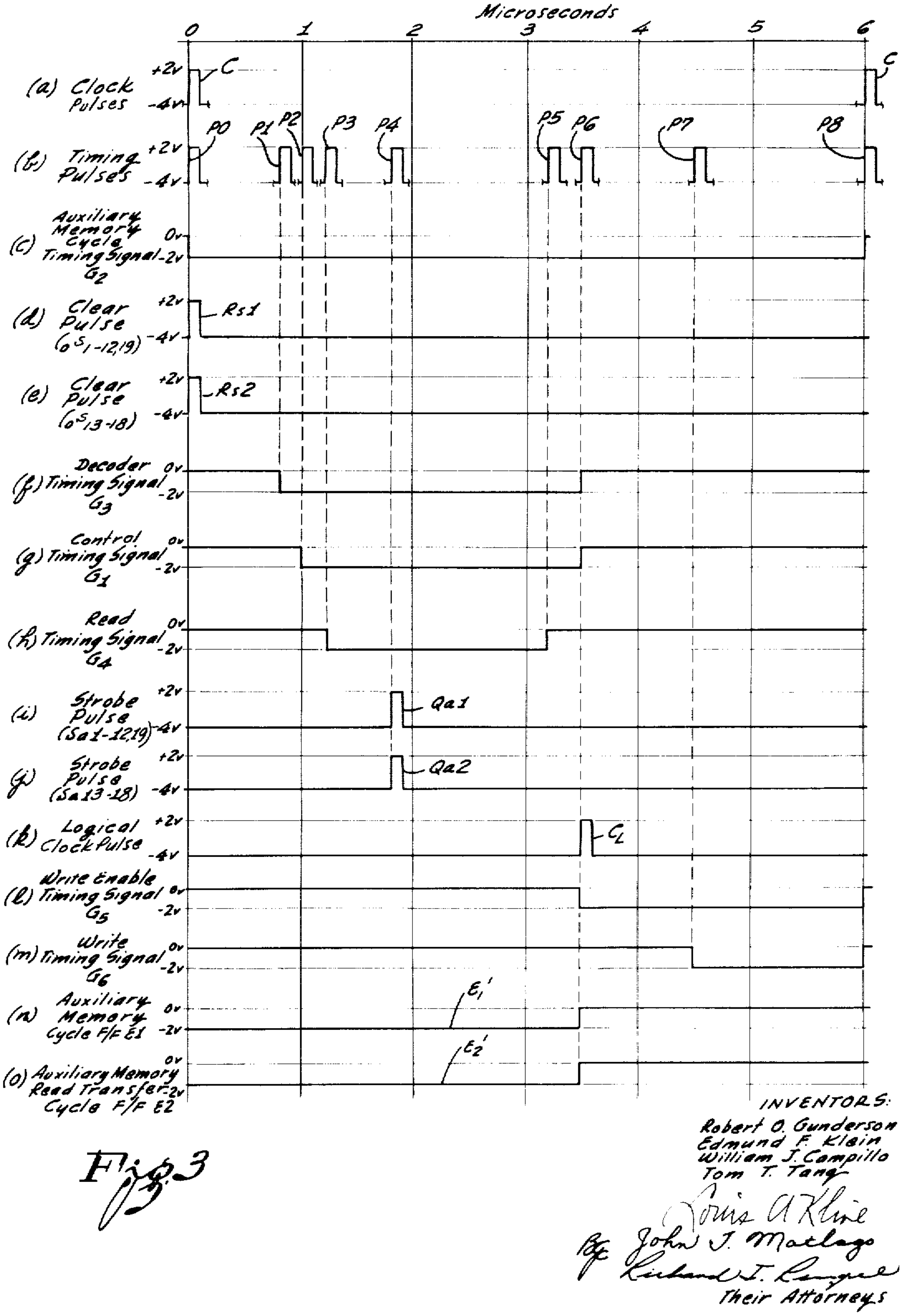
FIGS. 3 and 4 are timing diagrams for illustrating waveforms of the timing signals and other waveforms produced by or for the timing control system shown in FIG. 2 for controlling the timing of the basic operating cycle, wherein in FIG. 3, the waveforms are of timing signals for the processor, and in FIG. 4, the waveforms are of timing signals for the main memory.
Figure 4:
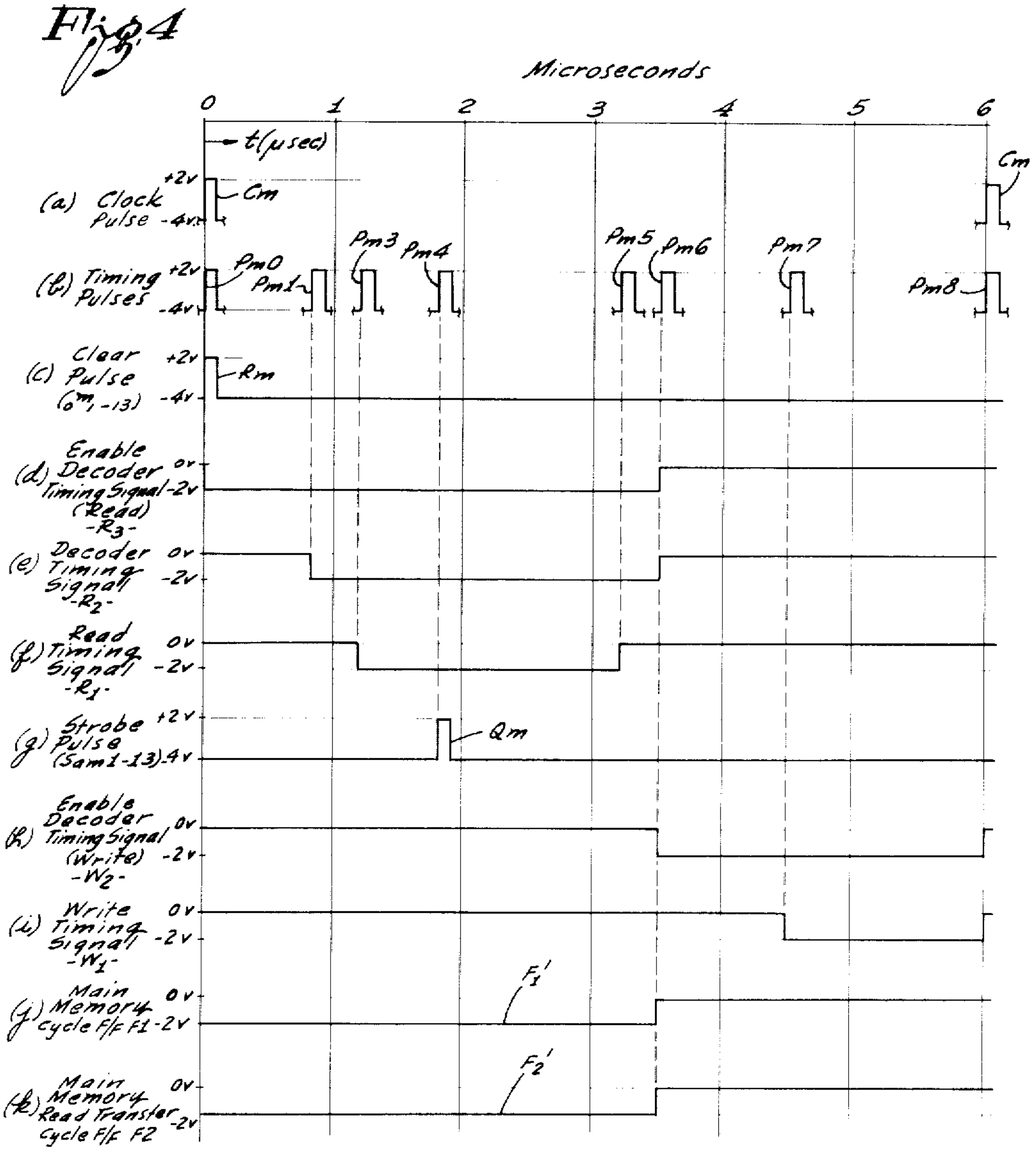

Referring now to FIG. 2 for a description of the timing of the computer system, a timing control system is shown diagrammatically which generates timing control signals for controlling the timing of the operations of the computer. The timing control system includes a clock source 20 for supplying clock pulses C to a group of timing control circuits including a timing control circuit 22 for the processor which includes the auxiliary memory; a timing control circuit 24 for the main memory unit #0; and timing control circuits 26, 28, and 30 for the respective main memory units #1, #2, and #3. The timing control circuits 26, 28, and 30 for main memory units #1, #2, and #3 have not been shown in detail since each of the circuits 26, 28, and 30 is the same as the timing control circuit 24. Clock pulses C and timing signals for a typical operating cycle including an auxiliary memory cycle and a main memory cycle are illustrated in FIGS. 3 and 4.

Each of the timing control circuits includes an electric delay line, e.g., low impedance lumped constant or distributed capacity delay lines 40 and 42, and each electric delay line has a total delay of six microseconds. The total time period of delay corresponds to the time interval of an operating cycle in order to derive timing pulses P from the delay line as required during the operating cycle. As shown, each of the delay lines is divided into six equal one microsecond delay line sections, for example the processor delay line 40 includes individual one microsecond delay line sections 44 to 49 inclusive. The first section 44 of the delay line 40 is connected to the clock source 20 through an amplifier-shaper circuit 41 for amplifying and shaping the clock pulses C. Adjacent sections of each delay line are also connected by respective amplifier-shaper circuits, e.g., amplifier-shaper circuits 41, which amplify and shape the clock pulses C after passing through a previous section of the delay line 40.

In the embodiment as shown in FIG. 2, each delay line section is capable of being tapped between ten .1 microsecond subsections. The taps *t*0 to *t*8, *tm*0, *tm*1, and *tm*3 to *tm*8, are selected taps for the present embodiment and are utilized for coupling timing pulses, such as P0, P1, etc. (FIG. 3 (b)), to gates and timing flip-flops in the respective timing control circuits. All of the taps between subsections have not been shown in detail but are indicated in the drawing as available between .1 microsecond time intervals over the time interval of delay of the respective delay line section whereby selected timing pulses, such as P0, P1, etc. can be made available for the timing of the oeprations in an operating cycle. The connections to the taps on the delay lines 40 and 42 to pulse and timing signal circuits, i.e., the gating circuits and timing flip-flops, are indicated diagrammatically for delay line section 44 as adjustable connections or sliders 31 for varying the position of the connection to the delay line of taps *t*0 to *t*8, *tm*0, *tm*1, and *tm*3 to *tm*8 for varying the time interval of the timing pulses derived from the delay lines 40 and 42. If desired, the connections from the pulse and timing circuits to respective taps *t*0 to *t*8, *tm*0, *tm*1, and *tm*3 to *tm*8 may be fixed, e.g. solder connections.

The output of the clock source 20 is coupled to the timing control circuits to supply a clock pulse C to the delay line 40 and to a main memory decoder 12 including input gates 34, 36, 38 and 39.

Each of the timing control circuits 22, 24, 26, 28, and 30 includes a group of timing signal generating circuits, i.e., timing flip-flops, and each of the timing flip-flops produces a low potential level (−2 v.) timing signal output when in the true state for controlling the time period in which circuits coupled to the respective timing flip-flops are made operative during an operating cycle of the data processor. A first timing pulse coupled to a flip-flop in an operating cycle is coupled to its set input to set it into its true state while a second timing pulse coupled to the same flip-flop is coupled to its reset input to reset the flip-flop to its false state. The true state outputs of the timing flip-flops are referred to as timing signals rather than timing pulses, to distinguish from the latter.

In addition, each of the timing control circuits includes at least one strobe pulse forming circuit which is coupled to respective delay lines for passing a timing pulse which is amplified and shaped to produce strobe pulses, e.g., Q*a*1, Q*a*2, and Q*m* shown in FIGS. 3(*i*), 3(*j*), and 4(*g*), for strobing or gating the output of respective groups of memory sense amplifiers during memory cycles including a "read transfer" memory cycle, i.e., "reading out" an addressed cell in the respective memory and storing the data in the respective groups of flip-flops comprising the respective memory register.

Also, the processor timing control circuit 22 includes a pulse shaping circuit 69 which is coupled to tap *t6* of the delay line 40 to provide a logical clock pulse $C_L$ (FIG. 3(*k*)).

In addition to the timing control circuits 22, 24, 26, 28, and 30, the timing control system includes clear pulse forming circuits 50 and 57 which provide clear pulses for the auxiliary and main memory respectively. The clear pulse circuits are coupled to the clock source 20 through an amplifier-shaper circuit 43 to provide clear pulses R*s*1 and R*s*2 (FIG. 3(*d*) and 3(*e*)) for clearing the S register (FIG. 5) prior to a "read transfer" memory cycle in the auxiliary memory; and clear pulse R*m* (FIG. 4(*c*)) for clearing the M register (FIG. 6) prior to a "read transfer" memory cycle in the main memory unit #0.

The nomenclature used for the present invention employs combinations of upper case letters and numbers for designating flip-flops (e.g. S1) and combinations of upper case letters followed by lower case letters and numbers for drivers (e.g. K*s*1). The outputs of the flip-flops are characterized by corresponding upper case letters with the associated numbers shown as a subscript (e.g. $S_1$) and the outputs of drivers by corresponding upper case letters and lower case letters with the associated numbers shown as subscripts (e.g. $Ks_1$). In order to characterize the true state output of a flip-flop circuit or driver circuit from the false, the latter is distinguished from the former by an affixed prime. A single logical input to a flip-flop is designated by corresponding upper case letters and numbers preceded by the lower case letter *s* (e.g. *s*S1). The inputs for setting and resetting a flip-flop are distinguished by lower case letters corresponding to the flip-flops and from one another by subscripts 1 and 0, respectively, prefixing the lower case letters (see FIG. 22*a*), for example, ${}_0s_1$ and ${}_1s_1$.

In designating the timing pulses, the upper case letter P has been reserved which is followed by corresponding numbers (e.g. P0, P1, etc.). The main memory timing pulses are distinguished from corresponding timing pulses P in the processor by the lower case letter *m* which follows (e.g. P*m*0, P*m*1, etc.). The upper case letter C is reserved for designation of clock pulses. The main clock pulses are designated by C, the logical clock pulses $C_L$, and the clock coupled to the main memory unit #0 to #3 is C*m* Strobe and clear pulses have been designated by reserved upper case letters Q and R, respectively, follower by lower case letters *s* and *m* designating the registers S and M, effected by the pulses (e.g. Q*m*). Where necessary, numbers follow the lower case letters to distinguish the pulses. A single upper case letter X preceding other letters, designates program control signals (e.g. XL1). Successive upper case letters XX designate certain operation blocks. Throughout the specification, the upper case letter I has retained its conventional connotation referring to currents except when referring to inverter circuits for input logical networks which have been illustrated in block diagram having the upper case letter I notation. The combination of upper case letters KC retains its conventional connotation designating kilocycles.

CLOCK SOURCE

Referring again to FIG. 2, a detailed description of the timing control system and the operating cycle of the computer will now be given. Considering the clock source 20 first, it will be remembered that clock pulses C for the timing and operating cycle of the computer are normally provided at six microsecond intervals, that is, at a repetition rate of 166.7 kilocycles. However, it will be appreciated that this 166.7 kilocycle clock rate may not be appropriate for use with peripheral equipment for the computer system, i.e., various input-output devices which operate at different rates. In such a situation, therefore, it becomes necessary to synchronize the clock rate of the clock pulses C with the rate of operation or speed of the particular input-output device being employed. The clock source 20, schematically indicated in block form in FIG. 2, is thus constructed and arranged to provide clock pulses C both at the normal 166.7 kilocycle rate, and also, at a rate in synchronism with input-output devices having different operating rates.

This dual type of operation for the clock source 20 is made possible by feeding the false output $G_0'$ of flip-flop G0 to the logical input thereof by way of either "and" gate 25 or "and" gate 27, and then through "or" gate 29 to the logical input. For normal operation of the clock source 20 at a 166.7 kilocycle repetition rate, a flip-flop HLC1 (FIG. 1) is in a false state and the signal $HLC_1'$ is thereby caused to be at the low potential, permitting the false output $G_0'$ of flip-flop G0 to pass through "and" gate 25 and "or" gate 29 to the logical input of flip-flop G0. Then, by feeding output pulses from a 333.3 kilocycle oscillator 21 to the clock input of flip-flop G0, it will be understood that this flip-flop will switch at a 333.3 kilocycle rate; and upon amplifying and shaping the trailing edge of the square wave signal at the true output $G_0$ of flip-flop G0 by means of amplifier and shaper 35, clock signals C will be obtained at the desired 166.7 kilocycle repetition rate, that is, at intervals of six microseconds.

When peripheral equipment is coupled to the computer, the clock signals C generated by the clock source 20 must be synchronized with the operating rate of the equipment. This is accomplished by providing oscillators, such as the 100 kilocycle oscillator 23*a*, having frequencies which correspond to input-output devices which may be employed with the computer. Means are provided (not shown) for activating a selected one of these oscillators, such as the 100 kilocycle oscillator 23*a*, when it is desired that an input-output device be operated in conjunction with the computer, the particular oscillator being chosen in accordance with the operating rate of the input-output device. At such time, the output $HLC_1'$ becomes high to disenable "and" gate 25 and output $HLC_1$ becomes low to enable "and" gate 33. As a result, the false output $G_0'$ of flip-flop G0 is no longer fed to the logical input of flip-flop G0 by way of "and" gate 25. Instead, the false output $G_0'$ of flip-flop G0 is now fed by way of "and" gate 27 which is enabled by a single shot 31 for a predetermined period in response to each cycle of the selected oscillator which triggers the single shot 31 by way of "and" gate 33.

By choosing the "on" time of the single shot 31 to be of the order of 3.5 microseconds (slightly more than one-half of the normal six microsecond interval between clock pulses C) it will be understood that the false output $G_0'$ will be applied to the logical input of flip-flop G0 by way of gate 27 for only a 3.5 microsecond period during each cycle of the selected oscillator regardless of the repetition rate thereof, permitting only one clock pulse C to be generated for each cycle of the selected oscillator, thereby achieving the desired synchronization.

CLEARING CIRCUITS

The clear pulse forming circuits 50 have been provided for generating clear pulses R*s*1 and R*s*2 (FIGS. 3(*d*) and 3(*e*)) for the auxiliary memory 13 at the beginning of each operating cycle, including a "read transfer" auxiliary memory cycle. The clear pulse forming circuit 57 likewise generates a clear pulse R*m* (FIG. 4(*c*)) for the main memory at the beginning of each operating cycle including a "read transfer" main memory cycle, i.e., "reading out" and transferring words from an addressed cell in main memory unit #0 to the flip-flops M1–13 of the M register.

The clearing circuits 50 and 57 are connected to the output of the amplifier 43 to couple a clock pulse C, which has been inverted in the amplifier 43, to "and" gates 51 to 54. The "and" gate 51 has enabling inputs $E_1'$, $E_2'$ coupled from the respective false state outputs of flip-flops E1 and E2 shown in FIG. 1. The flip-flop outputs $E_1'$ and $E_2'$, shown in FIGS. 3(*n*) and 3(*o*), provide enabling inputs to the gate 51 when the respective flip-flops are reset, at the logical clock $C_L$ during the previous operating cycle, for the present operating cycle which includes a "read transfer" auxiliary memory cycle. The output of the "and" gate 51 is shaped, amplified, and inverted in amplifier 58*a* to produce the clear pulse R*s*1 (FIG. 3(*d*)) which is coupled to the S register (FIG. 5) for resetting flip-flops S1–12 and S19. In order to clear all of the flip-flops S1–19 in the S register, an additional clear pulse R*s*2 (FIG. 3(*e*)) is produced along with clear pulse R*s*1 to clear flip-flops S13–18 in the S register prior to "reading out" the auxiliary memory. Flip-flops S13–18 are required to store words "read out" at an address in the index registers 15 or the jump registers 16 in the auxiliary memory 13 (FIG. 5) in which registers the word length storage capacity of a cell is eighteen bits plus a parity check bit as distinguished from the accumulator 17 in which the word length capacity of a cell is twelve bits plus a parity check bit. An address of a word in the index registers 15 or jump registers 16, which requires clearing of the flip-flops S13–18, is indicated by the "false" state of flip-flops A4 and/or A7 in the A address register providing inputs $A_4'$ and/or $A_7'$ to the "and" gates 52 and 53, respectively. The outputs of the "and" gates 52 and 53 are coupled to an "or" gate 55 having an output which is inverted, amplified, and shaped in amplifier 58*b* to produce the clear pulse R*s*2. The clear pulses R*s*1 and R*s*2 are coupled to reset inputs of groups of flip-flops S1–12 and S19 and S13–18 respectively, of the S register prior to "reading out" a cell in the auxiliary memory and storing the output in the S register.

The "and" gate 54, in the clear pulse forming circuit 57, produces a clear pulse R*m* (FIG. 4(*c*)) for clearing the M register by resetting flip-flops M1 to M13 at the beginning of the operating cycle including a "read transfer" main memory cycle. The enabling inputs for producing the clear pulse R*m* are the inputs $F_1'$ and $F_2'$ (FIGS. 4 (*j*) and 4(*k*)) coupled from the corresponding false state outputs of flip-flops F1 and F2 shown in FIG. 1. Flip-flops F1 and F2 are reset to the false state at the logical clock pulse $C_L$ in the preceding operating cycle to provide the enabling inputs $F_1'$ and $F_2'$ to the "and" gate 54 during the present operating cycle including a "read transfer" main memory cycle. The output of the gate 54 is amplified, inverted, and shaped in amplifier 58*c* to produce clear pulses R*m* which are coupled to the reset inputs of flip-flops M1–13 of the M register to reset the flip-flops prior to "reading out" a cell in a main memory unit and storing the output in the M register.

PROCESSOR TIMING CONTROL CIRCUIT

The timing control circuit 22 for the processor generates timing pulses P0 to P8 for timing flip-flops G1 to G6, as indicated in FIG. 2, for producing timing signals $G_1$ to $G_6$ which are coupled to the processor including the auxiliary memory 13, and the program control 10. In FIG. 3(*b*), a timing diagram for timing control circuit 22 illustrates timing pulses P0 to P8 produced during a typical operating cycle, which pulses are available sequentially in time in the operating cycle at taps *t*0 to *t*8 as the clock pulse C (FIG. 3(*a*)) passes through the delay line 40 during a six microsecond time period. At the first tap on the delay line 40, tap *t*0 on the delay line section 44, the timing pulse P0 is coupled to the clock input 56 of the flip-flop G2 for placing the flip-flop into its true state to produce a timing signal $G_2$ indicating an operating cycle including an auxiliary memory cycle. The logical input to the flip-flop G2 is the false state output signal $E_1'$ of the flip-flop E1, which is set during the operating cycle, immediately preceding the typical operating cycle presently being considered, at the logical clock $C_L$. The signal $E_1'$ is coupled to the input *s*G2 to place the flip-flop G2 in its true state at the beginning of an operating cycle which indicates an auxiliary memory cycle is included in the present operating cycle. A true output (low potential level −2 v.) at $G_2$ provides an enabling input to output gates, shown schematically in FIG. 1 by a single "and" gate 59, passing the timing signals $G_3$ to $G_6$ to respective auxiliary memory circuits. The outputs of the flip-flops G2 and E1 are indicated in FIGS. 3(*c*) and 3(*n*) by typical waveforms $G_2$ and $E_1'$, respectively.

The first operation in an operating cycle which includes an auxiliary memory cycle is the decoding of the address in the A register shown in FIG. 5. This operation is initiated by supplying the timing signal $G_3$ to address decoders 90 and 91 in the auxiliary memory 13 shown in FIG. 5. The timing of this operation is controlled by the flip-flop G3, having an output $G_3$ which is gated to the address decoders 90 and 91 for the auxiliary memory every auxiliary memory cycle. The timing signal $G_3$ controls the current supplied to the decoders for decoding the outputs of the flip-flops A1–7 in the A register. The flip-flop G3 is set into its true state by the timing pulse P1 which is coupled to the set input $_1g_3$. The pulse P1 is obtained from the delay line section 44 at the tap *t*1. The tap *t*1 is located on section 44 to produce the pulse P1, .8 microsecond after the initiation of the operating cycle. The timing signal $G_3$ provided by flip-flop G3 is indicated in FIG. 3(*f*).

In considering the timing of the address decoders 90 and 91 (FIG. 5) controlled by timing signal $G_3$ from the flip-flop G3, it is noted that this operation precedes "reading" of the auxiliary memory by .4 microsecond which "reading" is initiated by a timing signal $G_4$, 1.2 microseconds after the beginning of the operating cycle. The .4 microsecond time interval between the timing signals $G_3$ and $G_4$ is an adequate time interval to provide a complete address of a cell in the auxiliary memory from the output of the decoders 90 and 91 and prior to initiation of read current in the auxiliary memory. The output of the decoders 90 and 91 are coupled to selected read drivers, one in each of the groups 92 and 93, to supply read current to the addressed cell in the auxiliary memory 13. A predetermined pair of read drivers are selected in accordance with the address in the A register whereby one read driver in each of the groups 92 and 93, selected by the output of decoders 90 and 91, respectively, will supply read current to the cores in the addressed cell of the auxiliary memory 13, during the read current time interval or read time interval, from a read current source 94 controlled by the timing signal $G_4$ supplied from a timing flip-flop G4.

Timing of the read current supplied from the read current source 94 to the selected drivers in groups of read drivers 92 and 93 is controlled by the flip-flop G4. The true state output of the flip-flop G4 providing the timing signal $G_4$, illustrated in FIG. 3(*h*), is coupled to the read current source 94 to supply read current to the read current drivers in the groups 92 and 93. The flip-flop G4 is set into its true state at its set input $_1g_4$ by the timing pulse P3, which is derived from delay line section 45 at the tap *t*3. The tap *t*3 is located on the delay line section 45 to provide the timing pulse P3, 1.2 microseconds after the beginning of an operating cycle.

The logical and arithmetic circuits of the computer including those circuits in the arithmetic unit 11, are controlled by a program control system (FIGS. 7*a* and 7*b*) providing program control signals for gating selected logical and arithmetic circuits to perform logical operations during a period in an operating cycle which begins with a strobe pulse Q*a*1 and Q*a*2 and ends at the logical clock $C_L$. The program control circuit, shown in FIGS. 7*a* and 7*b*, and more particularly, a program counter decoder 170 coupled to program counter flip-flops N1–4, is supplied a timing signal $G_1$ from the true output of flip-flop G1, illustrated in FIG. 3(*g*). The set input $_1g_1$, for setting the flip-flop G1 into its true state, is coupled to the tap *t*2 on the delay line section 44, which tap is located thereon to supply a timing pulse P2 to the set input ${}_1g_1$, one microsecond after the initiation of the operating cycle. The timing signal $G_1$ precedes the start of the performance of the logic which begins with the strobe pulses *Qa*1 and *Qa*2 at a time 1.8 microseconds after the initiation of the operating cycle. The time interval of .8 microsecond between the beginning of the timing signal $G_1$ and the strobe pulses *Qa*1 and *Qa*2 provides an adequate time interval for a program control signal to be induced on sense lines 180 coupled to a selected transformer 150 in either one of the transformer arrays 152 and 153 of the program control system, whereby the presence of the program control signal is assured at the start of the performance of the logic. The details of the program control system are set forth, infra in connection with the description of FIGS. 7*a* and 7*b*.

The next timing function of the timing control circuit 22, in the operating cycle including an auxiliary memory cycle, is to supply strobe pulses *Qa*1 to *Qa*2 to sense amplifiers *Sa*1–12 and *Sa*13–18 respectively, illustrated in block form in FIG. 5. The strobe pulses are timed to pass the desired portion of the amplified output "read out" of the addressed cell in the auxiliary memory which portion begins .6 microsecond after read current is supplied to the cores forming the addressed cell. Generating strobe pulses at 1.8 microseconds in the operating cycle, .6 microsecond after the read current applied to the cores at 1.2 microseconds, passes the desired amplified output from the cores of the addressed cell to the respective flip-flops in the S register.

Strobe pulse forming circuits 60 have been provided to produce the strobe pulses *Qa*1 and *Qa*2, shown in FIGS. 3(*i*) and 3(*j*), 1.8 microseconds after the beginning of the operating cycle. The circuits 60 are connected to the delay line section 45 at a tap *t*4 by an amplifier 62 to supply an inverted timing pulse P4, a pulse 64, to the circuits 60. The timing pulse P4 is inverted by the amplifier-shaper circuit 62 to provide the pulse 64 which is passed by "and" gates 65, 66, and 67 in the presence of proper enabling inputs to the respective gates. The proper enabling inputs to the "and" gate 65, for passing the pulse 64 to produce a strobe pulse *Qa*1, are the low potential logical inputs $E_1'$ and $E_2'$, shown in FIGS. 3(*n*) and 3(*o*). As stated previously, the output $E_1'$ is at the low logical potential level during an auxiliary memory cycle when the flip-flop E1 is reset to its false state. The low potential level input $E_2'$ to "and" gate 65 is provided by flip-flop E2 while the latter is residing in its false state. The flip-flop E2 is in its false state during an operating cycle including a "read transfer" auxiliary memory cycle wherein the word "read out" from the auxiliary memory is stored in the S register as distinguished from an auxiliary memory cycle in which the "read out" is a "destructive read out," i.e., not stored in the S register. The output of the "and" gate 65 is shaped, amplified, and inverted by an amplifier 68*a* to produce the strobe pulse *Qa*1 which is coupled to the sense amplifiers *Sa*1–12 and *Sa*19 to gate their output. Additional "and" gates 66 and 67 in the gating circuits 60 pass the pulse 64 to produce the strobe pulse *Qa*2 when the index registers 15, or the jump registers 16, or a temporary storage 19 are being addressed, requiring additional flip-flops S13–18 to store the output.

The enabling inputs required to pass the pulse 64 through "and" gates 66 and 67 are inputs $A_4'$ and $A_7'$, respectively. Inputs $A_4'$ and $A_7'$ are the low potential level logical outputs of the respective flip-flops A4 and A7 which indicate that a cell in the index registers 15 or the jump registers 16 is being addressed. Since the word length of a cell in the index or jump registers 15, 16 is eighteen bits plus a parity check bit, nineteen flip-flops in the S register are required to store the nineteen bits "read out" of the auxiliary memory and the outputs of sense amplifiers *Sa*13–18 are strobed by strobe pulse *Qa*2 to store the latter six bit portion of the word in flip-flops S13–18 of the S register.

The flip-flop G4, controlling the read current source 94, shown in FIG. 5 terminates the timing signal $G_4$ to interrupt the current supplied to a selected pair of read current drivers for the addressed cell in the respective groups 92 and 93, 3.2 microseconds after the beginning of the operating cycle which is .3 microsecond prior to the logical clock $C_L$ (FIG. 3(*k*)). The timing pulse P5 is coupled from tap *t*5 to the reset input ${}_0g_4$ to reset flip-flop G4, terminating the timing signal $G_4$ (FIG. 3(*h*)).

After the performance of the logic, all flip-flops effected thereby are set by the logical clock pulse $C_L$. An adequate time interval in the operating cycle, beginning with the strobe pulses *Qa*2 and *Qa*1 occurring 1.8 microseconds after the initiation of the operating cycle and ending at the logical clock pulse $C_L$ which is a total time duration of 1.7 microseconds, is allowed for the performance of the logical and arithmetic operations in the arithmetic unit 11. The logical clock pulse $C_L$ is produced in response to the timing pulse P6 which is derived from the delay line at the tap *t*6. The timing pulse P6 is coupled to an amplifier-shaper circuit 69 where it is amplified and shaped to produce the logical clock pulse $C_L$, shown in FIG. 3(*k*).

The timing pulse P6 is also coupled to reset inputs ${}_0g_1$ and ${}_0g_3$ of the flip-flops G1 and G3, respectively. Resetting of the flip-flop G1 terminates the timing signal $G_1$ coupled to the program counter decoder 170 (FIG. 7*b*). Resetting of the flip-flop G3 terminates the timing signal G3 supplied to the address decoders 90 and 91.

It will be noted that the duration of the timing signal $G_1$ extends to the logical clock pulse $C_L$ to provide a program control signal X-- on selected sense lines 180 (FIG. 8) connected to the logical networks. In the program control system shown in FIGS. 7*a*, 7*b*, and 8, the inherent time delay of approximately .2 microsecond of program control signals produced on sense lines 180 assures an overlap of program control signals and the leading edge of the logical clock pulse $C_L$. As a result, the output of the logical networks, which are dependent upon the presence of the control signal, will be present at logical inputs of flip-flops coupled to the selected networks when the leading edge of the logical clock pulse $C_L$ appears at the clock inputs of the flip-flops. As will be apparent from the description of the flip-flop circuits in FIG. 10, flip-flops are set according to the respective logical inputs at the leading edge of the logical clock pulse $C_L$ applied to the clock inputs of the flip-flops. The delay of the program control signals is illustrated in the timing diagram shown in FIGS. 9(*c*), 9(*d*), and 9(*f*) wherein the time delay, approximately .2 microsecond, of a typical program control signal produced in response to the drive pulse 164 and the timing signal $G_1$, is clearly indicated. It will be noted that as a result of the time delay the low potential portion of the program control signal, control pulse 189 remains low during the occurrence of the leading edge of logical clock pulse $C_L$. A detailed discussion of the operation of the program control system is presented in the description of FIGS. 7*a*, 7*b*, 8, and 9, infra.

The decoders 90 and 91 of the auxiliary memory 13 (FIG. 5) are constructed and arranged to provide output signals in response to the timing signal $G_3$ applied thereto, which enable a predetermined pair of read drivers, one in each of the groups 92 and 93, to select the addressed cell in the auxiliary memory. At the logical clock pulse $C_L$, the timing signal $G_3$ is removed and decoders 90 and 91 automatically, and without the need of retaining the settings of the A register, enable a predetermined pair of write drivers, one in each of the groups 101 and 102 coupled to the memory cores, in order to permit writing into the cell at the same address during the write time interval.

After all flip-flops affected by the logical clock $C_L$ have been set in accordance with the logical and arithmetic operations performed in the operating cycle, e.g., addition, subtraction, etc., the information, if any, in the S register is written into an addressed cell in the auxiliary memory which address is the same as the address of the word "read out" because of the action of decoders 90 and 91 described in the previous paragraph. The operations associated with the "writing" into an addressed cell in the auxiliary memory 13 comprise supplying of write enable current and write current to cores in the addressed cell of the auxiliary memory 13. The write enable current is initiated prior to the write current and a one microsecond time interval has been provided between the start of timing signals $G_5$ and $G_6$ to permit the write enable current to build up to the proper current level before the write current is initiated. Consequently, the write enable current timing signal $G_5$ is initiated by the timing pulse P6. The timing pulse P6 is coupled to the set input $_1g_5$ to set the flip-flop G5 to produce the timing signal $G_5$ shown in FIG. 3(*l*) which is coupled to the write enable drivers 98 (FIG. 5) to initiate write enable current in the auxiliary memory 13.

The timing flip-flop G6 controlling the write current timing is set by the timing pulse P7 which is derived from the delay line section 48, 4.5 microseconds after the start of the operating cycle, at the tap *t7*. The timing pulse P7 which is coupled to the set input $_1g_6$ sets the flip-flop G6 in its true state to provide a timing signal $G_6$ (FIG. 3(*m*)). The timing signal $G_6$ is coupled to a write current source 100 (FIG. 5) to control the supply of current write drivers in groups 101 and 102 whereby write drivers selected by the output of decoders 90 and 91 supply write current during the write current time interval or the write time interval to the cores in addressed cell in the auxiliary memory array for "writing" the word stored in the S register into the cell during the write time interval.

Both timing flip-flops G5 and G6 are reset by the timing pulse P8. The reset inputs $_0g_5$ and $_0g_6$ are connected to a tap *t8* located at the end of the delay line section 49 which is the end of the six microsecond operating cycle. Upon resetting the timing flip-flops G5 and G6 at the end of the operating cycle, the write enable drivers 98 and the write current source 100 are turned off to terminate the write enable and write currents supplied to the addressed cell in the auxiliary memory 13.

The foregoing describes the timing control of a complete operating cycle in the processor. In the event an operating cycle does not include an auxiliary memory cycle, the outputs of flip-flops G3, G4, G5, and G6 would not be gated to the respective control points by respective "and" gates shown schematically in FIG. 1 by a single "and" gate 59 requiring a true signal output $G_2$ from the flip-flop G2. Further, the strobe pulses Q*a*1 and Q*a*2 would not be generated since both of the required enabling signal inputs $E_1'$, $E_2'$ to the "and" gates 65 to 67, would not be present to gate the pulse 64. Therefore, the only timing flip-flop effective during an operating cycle, which does not include an auxiliary memory cycle, is flip-flop G1 which supplies the timing signal $G_1$ to the program counter decoder 170 (FIGS. 7*a* and 7*b*). Each and every operating cycle irrespective of the inclusion of an auxiliary memory cycle also provides a logical clock pulse $C_L$ for setting the flip-flops in accordance with the logic performed during the operating cycle.

MAIN MEMORY TIMING CONTROL CIRCUITS

In considering the timing control circuits 24, 26, 28, and 30 for the main memory units #0 to #3 during a typical operating cycle, it will be assumed that unit #0 of the main memory is selected by the address in the L register wherein the state of the flip-flops L17 and L18 provides inputs $L_{17}'$ and $L_{18}'$ to the "and" gate 34 of the main memory decoder 12, and a main memory cycle is included in the operating cycle under consideration, as indicated by the false state of flip-flop F1 providing an input $F_1'$ to the "and" gate 34. Since timing control circuits 24, 26, 28, and 30 are identical, a description of the operation of control circuit 24 for unit #0, as shown in FIG. 2, will provide a complete understanding of the other timing control circuits for units #1, #2, and #3. In the presence of the low level logical potential inputs $F_1'$, $L_{17}'$, $L_{18}'$ to gate 34, a clock pulse C which has been inverted, shaped, and amplified in amplifier 43 is passed through the "and" gate 34 and the output of the "and" gate 34 is coupled to an amplifier-shaper 72 to produce a clock pulse C*m* (FIG. 4(*a*)) which is supplied to the main memory delay line 42. The clock pulse C*m* produces timing pulses P*m*0, P*m*1, P*m*3, P*m*4, P*m*5, P*m*6, P*m*7, and P*m*8 shown in FIG. 4(*b*) as the clock pulse C*m* passes through delay line 42. It should be noted that reference to the signal waveforms in FIG. 4 will be made throughout the following description of the timing control circuit 24.

Prior to considering the detailed operation of the timing control circuit 24, a comparison of its operation with the timing control circuit 22 would be helpful in providing a more complete understanding of the overall operation of the timing control system and the operation of control circuit 24. The timing of the "read" and "write" operations in the main memory are the same as the timing of the "read" and "write " operations in the auxiliary memory, therefore the timing signals produced by the timing flip-flops R1, R2, W1, and W2 will be the same as the timing signals produced by the flip-flops G4, G3, G6, and G5, respectively.

It will be noted further that the strobe pulse Q*m* is formed at the same time in an operating cycle as the strobe pulses Q*a*1 and Q*a*2 are formed. In considering the differences in the timing control circuits 22 and 24, it will be noted that the gating of the clock C to the delay line 42 for the main memory unit #0 eliminates the need of a flip-flop such as flip-flop G2 required in the timing control circuit 22 to indicate an auxiliary memory cycle. The timing control circuit 24 and identical timing control circuits 26, 28, and 30 do not require a timing flip-flop for controlling the generation of timing signals in the program control system since only one such program control timing signal, i.e., flip-flop output $G_1$ is required during each operating cycle and this timing signal $G_1$ is provided by the flip-flop G1. Also, there is no need for generating a logical clock pulse $C_L$ in the timing control circuits 24, 26, 28, and 30 as this pulse is generated by the timing control circuit 22.

A portion of an address for the main memory is directed to the enable circuitry individual to each of the main memory units #0–#3 and a timing flip-flop, e.g., flip-flop R3 for main memory unit #0, is required in each main memory timing control circuit 24, 26, 28, and 30 for controlling the timing of enable logic decoders, e.g., an enable logic decoder 110 which decodes the output of flip-flops L5 and L9 in the L register, shown in FIG. 6.

Referring to the timing control circuit 24, the timing flip-flop R3, supplying a timing signal $R_3$ (FIG. 4(*d*)) to the decoder 110, is set by the timing pulse P*m*0. The timing pulse P*m*0 is derived from delay line section 80 at tap *tm*0 and is coupled to the set input $_1r_3$. The output R3 provides a low logical potential level timing signal which is coupled to the enable logic decoder 110 shown in FIG. 6. The output of the decoder 110 is fed to enable drivers 112 to selectively produce enable currents in an addressed cell in the memory core array 114 as described more fully, infra, in a detailed description of FIG. 6.

The next operation in an operating cycle including a main memory cycle is the decoding of the output from flip-flops L1–4 and L6–8 and L10–16, the portion of the address coupled to decoders 116 and 117 in the main memory unit #0 illustrated in FIG. 6. The timing flip-flop R2 produces a timing signal $R_2$ (FIG. 4(*e*)) which controls the timing of the decoders 116 and 117. A tap *tm*1 is coupled to the set input $_1r_2$ to supply a timing pulse P*m*1 to the flip-flop R2, .8 microsecond after the beginning of an operating cycle. The time interval of 1.2 microseconds between timing signals $R_3$ and $R_1$ and the time interval of .4 microsecond between the timing signals $R_2$ and $R_1$ are adequate time periods for the decoders 110 and 116 and 117, respectively, to provide a completely decoded address of the selected storage cell in the main memory unit #0 before read current is applied to the cores in the memory core array 114.

In the next operation of an operating cycle, read current is supplied to the cores in the memory array 114 at the addressed main memory cell in unit #0 and the control of the timing of the read current source 118 (FIG. 6) is provided by the timing signal $R_1$ (FIG. 4(*f*)) produced by the flip-flop R1 having a set input $_1r_1$ connected to the tap *tm*3. The tap *tm*3 is located on section 81 of the delay line 42 to produce a timing pulse P*m*3 occurring 1.2 microseconds after the beginning of an operating cycle. The timing pulse P*m*3 is coupled to the set input $_1r_1$ to set timing flip-flop R1 into its true state initiating the timing signal $R_1$.

The next timing pulse derived from the delay line 42, timing pulse P*m*4, is coupled to the strobe pulse forming circuit 70. The timing pulse P*m*4 occurs 1.8 microseconds after the beginning of the operating cycle. The circuit 70 is coupled to the tap *tm*4 and the timing pulse P*m*4 is inverted, amplified, and shaped in amplifier 74 and coupled to "and" gate 71 having an enabling signal input $F_2'$. During a "read transfer" main memory cycle, the enabling signal from the output $F_2'$ is coupled to the "and" gate 71 to pass the inverted timing pulse P*m*4. The output of the gate 71 is inverted and shaped during amplification in amplifier 75 to produce the strobe pulse Q*m*. The strobe pulse Q*m* (FIG. 4(*g*)) is coupled to sense amplifiers S*am*1–13 (FIG. 6) for the main memory unit #0 to pass the output of the sense amplifiers to the set inputs of flip-flops M1–13 in the M register.

The timing flip-flop R1 is reset by a timing pulse P*m*5 derived from the delay line section 83 at tap *tm*5. The timing pulse P*m*5 resets flip-flop R1 to terminate the read current timing signal $R_1$, 3.2 microseconds after the beginning of the operating cycle, whereby a two microsecond time interval is provided for supplying read current to an addressed cell in the core array 114 of main memory unit #0. The timing of signal $R_1$ which is coupled to the read current source 118, terminates the supply of read current to a pair of read drivers in groups 120 and 121 and read current to the cores in the addressed cell in memory unit #0.

The reset inputs $_0r_2$ and $_0r_3$ of the flip-flops R2 and R3, respectively, are coupled to the delay line section 83 at the tap *tm*6 to be reset by the timing pulse P*m*6 to terminate timing signals $R_2$ and $R_3$, 3.5 microseconds after the beginning of an operating cycle as shown in FIGS. 4(*e*) and 4(*d*), respectively.

The tap *tm*6 is also connected to a set input $_1w_2$ of the flip-flop W2 to initiate a timing signal $W_2$ (FIG. 4(*h*)) which is coupled to the enable logic decoder 110. The timing signal $W_2$ precedes the write current timing signal $W_1$ shown in FIG. 4(*i*) to provide an adequate time interval for the output of decoder 110 to reach the proper level before write current is supplied to cores of the addressed cell in the main memory unit #0.

The flip-flop W1 for timing the write currents is set by the timing pulse P*m*7 derived from delay line section 84 at the tap *tm*7. The tap *tm*7 is located on delay line section 84 to obtain a timing pulse P*m*7, 4.5 microseconds after the beginning of the operating cycle. The timing pulse P*m*7 is coupled to the set input $_1w_1$ to set the flip-flop W1 in its true state initiating the low potential level timing signal $W_1$ for controlling a write current source 122 (FIG. 6) supplying current to a pair of write drivers in groups 124 and 125 controlling the write current to main memory cores in an addressed cell.

Both flip-flops W1 and W2 controlling the write current source 122 and enable decoder 110, respectively, in the main memory unit #0 are reset by the timing pulse P*m*8. The timing pulse P*m*8 is coupled to the reset inputs $_0w_1$ and $_0w_2$ from the delay line tap *tm*8, which tap is located on the end of delay line section 85. Resetting of flip-flops W1 and W2 terminates the timing signals $W_1$ and $W_2$ to discontinue write current and write enable current supplied to cores in the addressed cell in the main memory unit #0, thereby completing the operations in an operating cycle. The timing pulse P*m*8 occurs at the end of the typical operating cycle selected for description which is six microseconds after the beginning of the typical operating cycle.

The circuits and operation of timing control circuits 26, 28, and 30 is identical to the circuit and operation of timing control circuit 24 described supra. Detailed descriptions and showings have not been set forth therefor and reference is made to timing control circuit 24 for the description of timing control circuits 26, 28, and 30 and control of the timing of units #1, #2, and #3 of the main memory.

From the foregoing description, it is obvious the various .1 microsecond positions on the delay lines are capable of being tapped as required for providing the desired timing signals. It should now be readily apparent that adjustment of the timing of operations or functions in the operating cycle is easily facilitated and the timing control system is made flexible by the availability of timing signals at .1 microsecond time intervals. Thus, the timing of operations in the operating cycle may be adjusted, if necessary, e.g., to vary the timing of the "read" or "write" operations in the operating cycle, to accommodate circuits having higher or lower speeds or introducing additional circuits having an inherent delay, such as the amplifier-shaper circuits 41.

The delay line provides a dynamic timing source and obviates the need for pulse, digit, or other counters for providing timing signals since the timing signals can be derived directly from the delay line to which a clock pulse is supplied at the beginning of every operating cycle, e.g., every six microseconds for the computer at its own operating rate.

It should be further understood now that the individual delay lines are provided for each unit #0, #1, #2 and #3 of the main memory in order to avoid the need for individual gates for gating timing signals to each of the circuits (decoders, etc.) of respective memory units as would be required if a single timing control circuit was provided for all main memory units #0 to #3 inclusive. Individual delay lines for each memory unit provide for simultaneity in which up to four clock pulses can be supplied to the respective timing control circuits 24, 26, 28, and 30 for the main memory units by four separate clock sources concurrently and at the same or different repetition rates whereby equipment, other than the data processor, could interrogate respective main memory units whose operating cycle may or may not coincide with the operating cycle of the processor. Also, an additional data processor (not shown) may be incorporated in a system, in which event the main memory would be available for interrogation by each of the data processors.

AUXILIARY MEMORY

In the foregoing description of FIG. 1, the operation of the auxiliary memory 13 in the overall system was generally described. From this description it will be apparent that the auxiliary memory 13 of FIG. 1 could be provided in a variety of forms in accordance with present knowledge in the art. A preferred form of such an auxiliary memory is illustrated in FIG. 5 and will be described in some detail.

Referring to FIG. 5, the storage means of the auxiliary memory 13 is a magnetic memory core array 14 having a plurality of bistable ferrite cores arranged in rows and columns, as illustrated by the detailed portion of the array 14 schematically shown in FIG. 5*a*, typical cores being indicated by the numerals 103, 103*a*, and 107. The specific memory array 14 illustrated in FIGS. 5 and *5a* may have eighty rows of cores, each row containing nineteen cores representing the nineteen bits in a register, one of each of these nineteen bits being conveniently employed as a parity check bit. Since each row comprises a register capable of storing nineteen bits, the array 14 has a total capacity of eighty, nineteen bit capacity registers corresponding to the eighty rows in the array 14.

As indicated in FIG. 5, the eighty rows in the array 14 may conveniently be divided into various functional sections designating the functions of the registers comprising the particular rows in the array 14. For example, thirty-two rows may serve as index registers 15, another thirty-two rows may serve as jump registers 16, eight rows may serve as temporary storage registers 19, and the remaining eight rows may serve as an accumulator 17. The functional separation of these rows in the array 14 into sections 15, 16, 17, and 19 may be disregarded for the purposes of the present description of the operation of the auxiliary memory 13, since without considering the setting of the flip-flops in the A register, the selection of a particular register in the array is not dependent upon which section is involved, and will be essentially the same for all rows, regardless of section.

Briefly, the operation of the auxiliary memory 13 of FIG. 5 is such that only one of the eighty rows is accessed at any one time. During the read time interval, the register corresponding to a selected row is "read out" and the information or data is stored in the S register having nineteen flip-flops S1–19 corresponding to the nineteen bits in the selected register. Then, during the write time interval which occurs after the read time interval, either the same data, or new data, is "written back" into the same row in the array 14, in accordance with the settings of the S register flip-flops S1–19. As described in connection with FIG. 2, flip-flops S1–19 are cleared at the beginning of the memory cycle by clear pulses **R*s*1 and R*s*2**, and may be changed at the logical clock $C_L$ by logical signals coupled to logical inputs *s*S1–12 and *s*S13–18 to correspond to any new data to be stored in the particular row of cores in array 14. The specific manner in which the data in a register corresponding to a selected row in the array is "read out" and "written back" into during respective read and write time intervals is described below.

Referring to FIG. *5a*, a typical read line 104 and a typical write line 105 passes through the row containing cores 103 and **103*a*, the cores in every other row in the array 14 having similar read and write drive lines passing therethrough. Also, each of the nineteen columns of cores in the array 14 has an enable line passing therethrough, such as typically illustrated by enable lines 108 and 109, each column representing a particular bit of the data on each row. Each of the nineteen enable lines is fed by a bias current of $I/3$ from a respective one of nineteen enable drivers 98** (FIG. 5), as illustrated by the solid line arrows adjacent the enable lines in FIG. *5a*, the current I representing full select read current required to "read out" from a core (the current −I thereby representing full select write current). Thus, the enable drivers 98 provide a bias current of $I/3$, or ⅓ read select current, to all the cores in the array 14.

"Reading out" and "writing into" the cores of a selected row of the array, corresponding to the desired nineteen bit register to be accessed, will now be understood with reference to FIGS. 5 and *5a*. The silid line arrows in FIG. *5a* designate the current flowing in the enable lines and the selected read line 104 during the read time interval, and the dotted line arrows designate the current flowing in the enable lines and the selected write line 105 during the write time interval, it being assumed that the nineteen cores in the row containing cores 101 and 103 correspond to the nineteen bits of data which is to be "read out" and "written into" during a memory cycle.

Considering the read time interval first, "read out" is accomplished by causing a current of $2I/3$, or ⅔ read select current, to flow in the read line of the row corresponding to the desired register, as indicated by the solid arrow adjacent read line 104 in FIG. *5a*, the read lines of all other rows receiving no current. Since each of the cores in the selected row already have a bias current of $I/3$ flowing therein (as do all the other cores in the array as described previously and indicated by the solid line arrows adjacent each enable line) the nineteen cores in the selected row will thereby receive full read select current, or I, to permit "read out" therefrom ($2I/3$ row current plus $I/3$ column current). All other cores in unselected rows of the array 14 are affected only by the bias of $I/3$, or ⅓ read select current, and will thereby remain relatively undisturbed. Thus, it will be seen that "read out" is obtained from the cores of the selected register while achieving the desirable high selection ratio of 3 to 1 between currents applied to selected and unselected cores in the array.

The row containing the desired nineteen bits of data which is to be "read out" is selected by means of decoders 90 and 91 (FIG. 5), operating in response to the decoder timing signal $G_3$ and in accordance with the outputs $A_{1-4}$ and $A_{5-7}$ of A (address) register flip-flops A1–7, respectively applied thereto, to activate a respective one of a first group often read drivers 92 and a respective one of a second group of eight read drivers 93. These two groups of read drivers 92 and 93 are constructed and arranged for linear selection of a particular one of the eighty read lines in the array 14. The group of read drivers 93 may, for example, select one of eight groups, each group comprising ten rows of cores; and the group of read drivers 92 selects one of the rows in the group selected by the read drivers 93 to complete the linear selection. Thus, during the read time interval, when a read current source 94 is energized by the timing signal $G_4$ applied thereto as shown in FIG. 5, a current of $2I/3$, or ⅔ read select current is caused to flow from the read current source 94 to the read line 104 of the selected row by way of a selected pair of read drivers which were activated by decoders 90 and 91, in accordance with the outputs of A register flip-flops A1–7. The timing signal $G_4$ applied to the read current source 94 is delayed with respect to the decoder timing pulse $G_3$ in order to permit sufficient time for the selected pair of read drivers to be activated by decoders 90 and 91, since as mentioned previously, decoders 90 and 91 each include a decoder core matrix for decoding which requires a finite time to complete the decoding operation.

The bit stored in each of the cores of the selected row (corresponding to the selected word) is sensed by one of nineteen sense lines respectively provided for each column in the array, an induced pulse in a sense line indicating the storage of a "1" in the core of the selected row through which that sense line passes, and the absence of an induced pulse indicating the storage of a "0" therein. The sense lines are not shown in FIG. *5a* in order to avoid confusion in the drawings, but may be provided in any of a number of well-known ways.

As shown in FIG. 5, the nineteen sense lines are coupled to respective ones of nineteen sense amplifiers **S*a*1–19, which are in turn fed to respective ones of nineteen S register flip-flops S1–19. The amplified pulses on the sense lines represent the bits which were previously stored in selected (accessed) registers and "read out" of the array 14** and are to be stored in corresponding flip-flops of the S register.

Strobe pulses **Q*a*1 and Q*a*2, fed to sense amplifiers S*a*1–12, 19 and S*a*13–18, respectively, are provided so that the sense amplifiers become operable only during the portion of the read time interval when the pulses induced in the sense lines are expected, thereby preventing unwanted pulses (which may occur on the sense lines at other times) from interfering with the operation of the sense amplifiers or the S register flip-flops coupled thereto. Two strobe pulses $Qa1$ and $Qa2$ are provided to permit either all the sense amplifiers to be operated, or only just sense amplifiers $Sa1$–12, 19. This choice is provided because the accumulator section 17 of the array 14 may typically comprise only thirteen bits on each of the thirty-two rows corresponding thereto, instead of nineteen bits. In such a case, the outputs of sense amplifiers $Sa13$–18 are unnecessary, and consequently are conveniently prevented from operating by omitting strobe pulse $Qa2$ when one of the accumulator rows in the array 14** is selected and "read out" into the S register.

Since a magnetic core memory array, such as array 14 in FIG. 5 is inherently of the destructive type, the cores of the selected register will all be in the same state after a "read out" therefrom (which in accordance with conventional practice would be the "0" state). Thus, if the data read out of the selected row of cores in the array 14 is not to be lost, it must be "written back" into the cores of the selected row, or alternatively, new data may be desired to be "written back" into the selected row in response to some operation of the computer.

In the auxiliary memory 13 of FIG. 5, the settings of the S register flip-flops, S1–19, are employed to determine the data which is to be "written back" into the selected row during the write time interval. Upon the appearance of the logical clock $C_L$, the settings of these S register flip-flops are retained if the same data is to be "written back" into the cores of the selected row or, alternatively, are changed by logical signals coupled to the logical inputs *s*S1–12 and *s*S13–18 to correspond to any other data which is to be "written back" into the selected row during the write time interval. S register flip-flop S19 corresponds to the parity check bit and its setting is controlled by well-known parity bit generator circuitry in a conventional manner.

As generally indicated in FIG. 5, the outputs $S_{1-19}$ of S register flip-flops S1–19 are fed to respective ones of the nineteen enable drivers 98 which, as described previously, are constructed and arranged to provide a bias of $I/3$, or ⅓ read select current, to the cores in each of the nineteen columns of the array 14, as illustrated by the solid arrows adjacent the enable lines (such as 108 and 109) in FIG. 5*a*. The nineteen enable drivers 98 are further constructed and arranged so that, at the appearance of the timing signal $G_5$, a short time after the appearance of the logical clock $C_L$, each enable driver which has a "1" applied thereto from its respective S register flip-flop is caused to provide a current of $-I/3$, or ⅓ write select current, to its respective enable line (as illustrated by the dotted arrow adjacent enable line 109 in FIG. 5*a*); on the other hand, each enable driver which has a "0" applied thereto from its respective S register flip-flop remains unchanged and continues to provide the bias current of $I/3$, or ⅓ read select current, to its respective enable line (as illustrated by the dotted arrow adjacent enable line 108 in FIG. 5*a*). Thus, at the appearance of the timing signal $G_5$, those cores in columns corresponding to the bit of the selected register in which a "1" is to be "written" (such as core 103 and the first and last cores of the same row illustrated in FIG. 5*a*) will have a current of $-I/3$, or ⅓ write select current, applied thereto, while those cores in which a "0" is to be "written" (such as core 101 in FIG. 5*a*) will remain with a bias current of $I/3$, or ⅓ read select bias current applied thereto, as illustrated by the dotted arrows in FIG. 5.

Then, at the appearance of a timing signal $G_6$, occurring after the timing signal $G_5$, the bits are "written" into the cores of the same row which was "read out" during the read time interval by causing a current of $-2I/3$, or ⅔ write select current, to flow in the selected row as indicated by the dotted arrow adjacent write line 104 in FIG. 5*a*, the write lines of all other rows in the array 14 receiving no current.

As a result of the application of the current of $-2I/3$ to write line 104, each core in the selected row having a current of $-I/3$, or ⅓ write select current, flowing in its enable line (such as core 103) will receive a current of $-I$, or full write select current ($-2I/3$ row current plus $-I/3$ column current) to switch the core from the "0" state, in which it remained after "read out" to the "1" state, thereby storing a "1" therein. On the other hand, each core in the selected row having a current of $I/3$, or ⅓ read select current, flowing in its enable line (such as core 103*a*) will receive a net current of only $-I/3$, or ⅓ write select current ($-2I/3$ row current plus $I/3$ column current), which causes the core to remain in the "0" state in which it was left after "read out," thereby "storing" a "0" therein. All other cores in the array on unselected rows receive no other current except the current of $I/3$ or $-I/3$ flowing in their respective enable lines. Thus, unselected cores again remain essentially undisturbed during the write time interval as they did during the read time interval, and again the high ratio of three-to-one is achieved between the currents applied to selected and unselected cores in the array.

In a manner similar to that occurring during the read time interval, the desired row is selected during the write time interval by decoders 90 and 91 activating a respective one of a first group of ten write drivers 101 and a respective one of a second group of eight write drivers 102. Like the two groups of read drivers 92 and 93, these two groups of write drivers 101 and 102 are constructed and arranged for linear selection of a particular one of the eighty write lines in the array 14. Thus, during the write time interval, when a write current source 100 is energized by the timing signals $G_6$ applied thereto as shown in FIG. 5, a current of $-2I/3$, or ⅔ write select current, is caused to flow from the write current source 100 to the write line 105 of the selected row by way of the write drivers activated by decoders 90 and 91.

As was pointed out in connection with the above description of the auxiliary memory 13 of FIG. 5, the mode of operation employed is such that a ratio of three-to-one is achieved between currents applied to selected and unselected cores during both reading and writing operations, as compared to a ratio of only two-to-one in the well-known coincident-current mode. This three-to-one ratio is highly desirable and makes it possible to greatly reduce the tolerances on the cores used in the array as well as the criticality of operation of the external drive circuitry. In addition, greater reliability of operation is obtained in varying temperature environments, since changes in core characteristics with temperature will have much less of an effect on operational reliability.

With regard to decoders 90 and 91, it will be remembered that each includes a decoding matrix for activating the read and write drivers so that, despite any A register changes occurring after the read time interval, the row selected by decoders 90 and 91 during the write time interval will be the same row as selected during the read time interval, thereby permitting the A register to be set to a new address at the logical clock pulse. The manner in which this is accomplished will now be explained for decoder 91, and it is to be understood that decoder 90 may be similarly constructed and arranged, as may main memory decoders 116 and 117 of FIG. 6, these latter decoders being discussed in the main memory description following this description of the auxiliary memory.

FIG. 5*a* shows a typical decoder core 235 of the eight decoder cores making up the decoding matrix of decoder 91. As is the case for all of the eight decoder cores in the decoding matrix of decoder 91, the typical decoder core 235 in FIG. 5*a* has a square loop hysteresis characteristic and is caused to rest in one of its two saturated magnetic states by means of a bias current $I_B$ applied to a bias winding 233 provided on the core 235. Decoder 235 is also provided with oppositely poled read and write windings 237 and 239 which are fed to those read and write drivers 93*a* and 100*a* which are coupled to read and write lines 104 and 105 of the same row. It will be evident, therefore, that each decoder core controls the activation of one read driver and one write driver, both of which drivers are in turn coupled to read and write drive lines of the same row.

Thus, referring to the timing diagram of FIG. 5*b* (located on the same sheet of drawing as FIG. 9) along with FIG. 5*a*, it will be understood that if the row containing read and write lines 104 and 105 is to be selected as previously assumed then, when the decoder timing signal $G_3$ (graph (*b*) of FIG. 5*b*) applied to decoders 90 and 91 falls to −2 volts at about 0.9 microsecond, A register outputs $A_{5-7}$ (by means of conventional circuitry employed in decoder 91) will cause a drive pulse to be applied to drive winding 238 of decoder core 235 to partially switch the core by the time the logical clock pulse $C_L$ appears. All other decoder cores in decoder 235 corresponding to other rows in the array will remain unenergized. As a result of this partial switching of decoder core 235, a voltage of negative polarity is induced in the read winding 237, as shown by the solid line curve in graph (*c*) of FIG. 5*b*, and a voltage of positive polarity is induced in the oppositely poled write winding 239, as shown by the dotted line curve in graph (*c*) of FIG. 5*b*. Read and write drivers 93*a* and 100*a*, like all other read and write drivers, are constructed and arranged to be activated only by a voltage of negative polarity. Thus, during the read time interval, only read driver 93*a* will be activated by the negative voltage induced in read winding 237 to complete selection of read line 104, while write driver 100*a* will remain unactivated because of the positive voltage in write winding 239.

When the decoder timing pulse $G_3$ returns to zero volts at the logical clock pulse $C_L$, as shown in FIG.5*b*, the drive current applied to drive winding 238 will be removed and the decoder core 238 will automatically be returned by bias current $I_B$ to its initial state, causing voltages of opposite polarity to be induced in read and write windings 237 and 239 during the read time interval, as shown in graph (*c*) of FIG. 5*b*. Thus, write driver 100*a* is now activated during the write time interval to complete selection of write drive line 105, while read driver 93*a* remains unactivated.

It should now be evident that the only decoder core which can induce voltage signals in its read and write windings during the write time interval is the decoder core 235 which is partially switched during the read time interval and which is returned to its initial state during the write time interval, all other decoder cores in decoder 91 remaining in their biased state throughout both read and write intervals. Thus, the A register settings are not needed to write back into the same address of the auxiliary memory 13 and may be changed to a new address at the logical clock pulse $C_L$.

MAIN MEMORY UNIT #0

As was the case for the auxiliary memory 13 just described various types of data storage arrangements may be employed for the main memory units #0–#3 illustrated in FIG. 1. A particularly desirable embodiment of such a main memory unit is illustrated in FIGS. 6 and 6*a*. While FIGS. 6 and 6*a* are specifically directed to an embodiment of the main memory unit #0 of FIG. 1, it will be understood that the other three main memory units may be similarly constructed.

Referring to FIGS. 6 and 6*a* it will be seen that main memory unit #0 appears similar to the auxiliary memory 13 of FIGS. 5 and 5*a* in many respects. However, an important difference exists with regard to the operation of the memory core array 114 of main memory unit #0 as distinguished from the operation of the memory core array 14 of the auxiliary memory 13. Specifically, because there is a very much greater amount of data to be stored in each main memory unit as compared to the auxiliary memory 13, it has become of very considerable importance, if not absolutely necessary, to keep the decoding and drive circuitry within practical limits. To accomplish this, an improved data storage system is preferably employed in each main memory unit by means of which it becomes possible to reduce the row decoding and drive circuitry by 75% over the system employed for the auxiliary memory 13 of FIGS. 5 and 5*a*, with only a relatively small increase in enable column drive circuitry, while at the same time maintaining the desired high ratio of three-to-one between the currents applied to selected and unselected cores during both reading and writing operations. This improved data storage system is described in considerable detail in the commonly assigned copending patent application Serial No. 91,123 filed February 23, 1961, in the names of Robert O. Gunderson, Edmund F. Klein, and Paul Higashi for DATA-STORAGE SYSTEM. The specific use of this improved system for the purposes of the present invention is described below.

Referring to FIGS. 6 and 6*a*, the storage means of the main memory unit #0 is a magnetic memory core array 114 having a plurality of bistable ferrite cores arranged in rows and columns. Typically, the array 114 may have 130,000 cores arranged in 2,500 rows and fifty-two columns, each row having fifty-two cores representing four groups of thirteen bits in which twelve bits of a group is a word and one bit serving as a parity check digit. Since each of the 2,500 rows is capable of storing four words, the array 114 has a total capacity of 10,000 words.

The array 114 may conveniently be considered as being divided into four sections, I, II, III, and IV representing the four words on each row, each section including correspondingly positioned cores representing the same word on each row. For example, section I includes those cores representing the first word of each row in the array, section II includes those cores representing the second word of each row, section III includes those cores representing the third word of each row, and section IV includes those cores representing the fourth word of each row. In the two typical rows shown in FIG. 6*a*, only the core corresponding to the first bit of each word as shown. Thus, cores 126 and 146 in FIG. 6*a* each correspond to the first bit of the first word of its respective row, cores 127 and 147 each correspond to the first bit of the second word of its respective row, cores 128 and 148 each correspond to the first bit of the third word of its respective row, and cores 129 and 149 each correspond to the first bit of the fourth word of its respective row.

Similar to the array 14 of the auxiliary memory 13 illustrated in FIGS. 5 and 5*a*, each of the 2,500 rows in the array 114 has a read line and a write line passing through all the cores in the row, such as read line 134 and write line 135 shown in FIG. 6*a* for the row including cores 126 to 129 inclusive. Also similar to the array 14 of the auxiliary memory 13 of FIGS. 5 and 5*a*, each of the fifty two columns in the array 144 has an enable line passing through all the cores in the column, such as illustrated by enable lines 136 to 139 inclusive in FIG. 6*a*, the columns being arranged so that the same enable line passes through cores corresponding to the same bit of its respective word. For example, enable line 136 passes through all the cores in the array corresponding to the first bit of the first word of each row.

The operation of the array 114 may now be understood with reference to FIG. 6*a*, the solid line arrows in FIG. 6*a* representing current flowing during the reading operation while the dotted line arrows represent current flowing during the writing operation. For purposes of this description it will be assumed that the word to be accessed in the array 114 is the first word of the row, which includes cores 126 to 129 in FIG. 6*a*. Thus, core 126 which stores the first bit of the first word on this row will be accessed, while cores 127, 128, and 129 which store the first bit of the second, third, and fourth words on the row, as well as the cores on unselected rows. such as cores 146 to 149, will remain relatively undisturbed.

First, considering the read time interval and the solid line arrows in FIG. 6*a*, a current of *I*/3, or ⅓ read select current, is caused to flow in the thirteen enable lines passing through the thirteen cores of the selected first word plus its parity check bit (such as enable line 136), while a current of —*I*/3, or ⅓ write select current, is caused to flow in the remaining thirty-nine enable lines passing through the thirty-nine cores of the unselected second, third, and fourth words and parity check bits (such as enable lines 137, 138, and 139). To read out a particular one of the 10,000 words in the array, a current of 2*I*/3, or ⅔ read select current, is then caused to flow in the read line of the selected row, as indicated by the solid line arrow adjacent read line 134 in FIG. 6*a*, the read lines of all other rows receiving no current. Since each of the cores of the first word in the selected row (such as core 126) has a current of *I*/3 flowing in its enable line, the additional current of 2*I*/3 in the read line 134 will provide a resultant current of I, or full select current, in each of the thirteen cores corresponding to the selected word (twelve bit word plus one parity check bit), thereby permitting "read out" therefrom.

However, since each of the cores of the second, third and fourth words on the selected row (such as cores 127, 128, and 129) has a current of —*I*/3 in its enable line, the current of 2*I*/3 flowing in read line 134 causes a resultant current of only *I*/3 in each such core, thereby leaving the cores of the unselected second, third, and fourth words on the selected row relatively undisturbed. All other cores on unselected rows in the array (such as cores 146 to 149) receive only the enable current of *I*/3 (cores 147, 148, and 149) or —*I*/3 (core 146) and will, therefore, also remain relatively undisturbed. Thus, it will be seen that "read out" is obtained only from the cores representing the selected first word on the selected row, while at the same time achieving the desired high selection ratio of three-to-one between currents applied to selected and unselected cores.

In the write time interval, operation of the array 114 is as indicated by the dotted line arrows in FIG. 6*a*. From FIG. 6*a* it will be understood that a current of —*I*/3 is caused to flow only in the enable lines passing through those cores of the selected first word in which a "1" is to be stored, a current of *I*/3 being caused to flow in all other enable lines, which include the enable lines passing through cores of the selected first word in which a "0" is to be stored in addition to the enable lines passing through the thirty-nine cores of the unselected second, third, and fourth words on the row, such as cores 127, 128, and 129.

Consequently, when a current of —2*I*/3, or ⅔ write select current, is passed through the write line of the selected row, as indicated by the dotted line arrow adjacent write line 135 in FIG. 6*a*, only those cares of the selected first word on the selected row in which a "1" is to be stored will receive a resultant current of —I, or full select write current, to switch the core from the "0" state in which it was left after "read out" to the "1" state, and thereby store a "1" therein. The other cores of the selected first word of the selected row in which a "0" is to be written receive a resultant current of only —*I*/3 and thus remain in the "0" state in which they were left after "read out" to thereby store a "0" therein. The remaining thirty-nine cores of the unselected second, third, and fourth words on the selected row (such as cores 127, 128, and 129) also receive a resultant current of only —*I*/3 which leaves these cores again relatively undisturbed as they remained after the read time interval. Also, all other cores on unselected rows in the array (such as cores 146 to 149) receive only the enable current of *I*/3 or —*I*/3 flowing in their respective enable lines and, therefore, like the thirty-nine cores of the unselected second, third, and fourth words of the selected row, again remain relatively undisturbed as they did after the read time interval.

It will thus be evident from the above description that by employing the improved mode of operation of the aforementioned commonly assigned patent application Serial No. 91,123, for DATA-STORAGE SYSTEM, the desirable high ratio of three-to-one is achieved between the currents applied to selected and unselected cores, even though four words are provided on each row instead of only one word as in the mode of operation employed by the auxiliary memory 13 of FIGS. 5 and 5*a*. And, because four words are provided on each row instead of only one word as in the auxiliary memory 13 of FIGS. 5 and 5*a*, only one of 2,500 rows need be selected, instead of one of 10,000 as would be required if the system of the auxiliary memory 13 were employed, which is a saving of 75% in row decoder and drive circuitry.

Selection of the desired one of the 2,500 rows in the array 114 of the main memory unit #0 of FIGS. 6 and 6*a* during read and write time intervals is accomplished in the same manner as was described for selection of a particular one of the eighty rows in the array 14 of the auxiliary memory 13 of FIGS. 5*a* and 5*b*. That is, referring to FIG. 6, during the read time interval, decoders 116 and 117 operate in response to the decoder timing signal $R_2$ and in accordance with the outputs $L_{1-4}$, $L_{6-8}$, and $L_{10-16}$ of corresponding L register flip-flops respectively applied thereto, to activate a respective one of a first group of fity read drivers 120 and a second group of fifty read drivers 121. These two groups of read drivers 120 and 121, in a manner similar to the two groups of read drivers 92 and 93 of the auxiliary memory 13 of FIG. 5, are constructed and arranged for linear selection of a particular one of the 2,500 lines in the array 114. Thus, when a read current source 118 is energized by the read current timing signal $R_1$ applied thereto, as shown in FIG. 6, a current of 2*I*/3, or ⅔ read select current, is caused to flow from the read current source 118 to the read line of the selected row (read line 134 in FIG. 6*a*) by way of the read drivers which were activated by decoders 116 and 117 in accordance with the outputs $L_{1-4}$, $L_{6-8}$, and $L_{10-16}$ of the L register.

Likewise, during the write time interval, the desired row is selected by decoders 116 and 117 activating a respective one of a first group of fifty write drivers 124 and a respective one of a second group of fifty write drivers 125, which by linear selection causes a current of —2*I*/3, or ⅔ write select current to flow from a write current source 122, energized by the write current timing signal $W_1$, to the write line of the selected row (write line 135 in FIG. 6*a*) by way of the activated write drivers. Similar to decoders 90 and 91 of the auxiliary memory 13, decoders 116 and 117 of the main memory unit #0 include decoder core decoding matrices constructed and arranged to operate upon removal of the decoder timing signal $R_2$ (which removal occurs at the logical clock pulse $C_L$) to activate a write driver in each group which will select the same row as did the read drivers activated during the read time interval. Specific embodiments of a typical decoder as well as typical read and write drivers and read and write current sources are disclosed in the aforementioned patent application Serial No. 91,123.

During the read time interval, the selected word in the array 114 whose thirteen cores receive full select read current, or I, is sensed by means of thirteen sense lines provided in the array 114 coupled to respective ones of thirteen sense amplifiers S*am*1–13, which are in turn coupled to respective ones of thirteen M register flip-flops M1–13 to permit the selected word "read out" of the array 114 to be set up in corresponding ones of the M register flip-flops M1–12. The thirteen sense lines are not shown in FIG. 6*a* in order not to confuse the figure, but are constructed and arranged in the array 114 so that each sense line passes through all the cores corresponding to a particular bit of each word. For example, the first sense line passes through the 10,000 cores corresponding to the first bit of each of the 10,000 words in the array 114, the second sense line passes through the 10,000 cores corresponding to the second bit of each of the 10,000 words in the array 114, and so on. Since only the bits of one of the 10,000 words in the array are "read out" or "written" into the array at any one time, a pulse induced in a particular sense line during "read out" and the bit thereby set up in a respective M register flip-flop will correspond only to the particular bit of the selected word, since the similarly positioned bits of other words in the array are essentially undisturbed with only a current of $I/3$ or $-I/3$ being applied thereto as described previously.

A strobe pulse $Q_m$ is provided to permit sense amplifiers S*am*1–13 to become operable only during the portion of the read time interval when the pulses induced in the sense lines are expected, thereby preventing unwanted pulses from interfering with the operation of the sense amplifiers S*am*1–13 or the M register flip-flops M1–13 coupled thereto.

A clear pulse R*m* is fed to the M register at the beginning of a memory cycle to permit the M register flip-flops to be cleared in preparation for the setting up therein of the selected word to be "read out" of the array 114. At the logical clock $C_L$, either the settings of the M register flip-flops are retained in order to permit the same word to be "written back" into the array 114, or else, the M register flip-flops M1–13 are changed by signals *s*M1–13 to correspond to any new word and parity check bit which may be desired to be "written" into the selected row in the array 114. M register flip-flop 13 corresponds to the parity check bit and its setting is controlled by well-known parity bit generator circuitry in a conventional manner.

The current of $I/3$ or $-I/3$ applied to each of the fifty-two enable lines in the array 114 (such as enable lines 136–139 in FIG. 6*a*) is derived from fifty-two enable drivers divided into four groups of thirteen enable drivers each, as shown in FIG. 6, each group of thirteen enable drivers feeding respective ones of the thirteen enable lines of a respective section of the array 114. As pointed out previously each section includes similarly positioned words of the rows in the array 114. Each of the fifty-two enable drivers is constructed and arranged to provide a current of either $I/3$ or $-I/3$ to its respective enable line, depending upon a control signal applied to each enable driver from an enable logic decoder 110, which is in turn controlled by outputs $L_5$ and $L_9$ from the L register, outputs $M_{1-13}$ from the M register, and the enable current timing signals $R_3$ and $W_2$. As described previously, it is the direction of flow of enable current, either $I/3$ or $-I/3$, supplied by each enable driver to its respective enable line during "reading" and "writing" which determines which cores are to be "read out" and "written" into during respective read and write time intervals.

The operation of the enable logic decoder 110, in controlling the direction of ⅓ select current supplied by each enable driver to its respective enable line is such that the address register outputs $L_5$ and $L_9$ determine which of the four words on the selected row is to be accessed during both read and write time intervals, the enable current timing signals $R_3$ and $W_2$ provide information as to whether the read or write time interval is taking place, and the M register outputs $M_{1-13}$ determine whether a "1" or "0" is to be "written" into each digit of the selected one of four words on the selected row during the write time interval. It will be appreciated that various constructions and arrangements of the enable logic decoder 110 and the enable drivers controlled thereby may be provided to achieve the operation just described, one such construction and arrangement being disclosed in the aforementioned patent application Serial No. 91,123. It will also be appreciated that the enable circuitry required for such operation is inherently very much less than would be required for row selection of the additional 7500 rows which would be necessary if only one word were provided on each row, as in the auxiliary memory 13 of FIGS. 5 and 5*a*. Obviously, in the mode of operation for main memory unit #0 just described, a different plurality of words could be provided on each row besides the four words typically illustrated in this description. It will be noted in FIG. 6 that register outputs $L_5$ and $L_9$ are fed to enable logic decoder 110 by means of storage flip-flops LL5 and LL9, which are provided to store these settings so that all L register flip-flops may be changed to a new address at the logical clock pulse.

PROGRAM CONTROL SYSTEM

Referring now to FIGS. 7*a* and 7*b*, the program control system of the computer is shown which functions during each operating cycle to energize a predetermined program control transformer whose sense lines in turn render operative those logical diode circuits required to accomplish the particular operations to be performed during the operating cycle. For convenience and clarity, the operations to be performed during a sequence of operating cycles may be represented by respective operation blocks, such as illustrated in FIGS. 17–20 which will be described in detail, infra. The particular program control transformer 150 selected during an operation cycle is determined by the states of flip-flops N7–11 of the instruction register 155 (FIG. 7*b*) and flip-flops N1–4 and N5–6 of the program counters 157 (FIG. 7*a*) and 159 (FIG. 7*b*) whose states during each operating cycle are determined in accordance with the particular commands in the routines of the computer system. The manner in which the program control system provides for the control of logical circuits in accordance with the instruction and program counter flip-flops will be set forth later in a detailed description of the program control circuits, following the description of the general arrangement, which follows.

The instruction register 155 (FIG. 7*b*) includes flip-flops N7–11 for the storage of an instruction designated as the command code which specifies the command to be performed in the subsequent operating cycles. After the instruction register 155 has been set at the beginning of the execution of a command, the register remains unchanged until the required operation blocks in the command are performed or until a decision is made to the contrary. The states of the flip-flops N7–11 for the typical commands are indicated in the table shown in FIG. 11. The states of flip-flops N7–11 for the divide command 13–, for example are 01011 wherein flip-flop N7 designates the least significant bit and the order of significance of the flip-flops increases with the flip-flop number. The outputs $N_{7-11}$ of flip-flops N7–11 acting through instruction decoder 166 (FIG. 7*b*) and instruction drivers 173 selects the drive lines 154 of one or a group of columns of octally numbered transformers 150 in the program control transformer array 152. For example, when flip-flops N7–11 have the octal configuration 13–, driver transistor **173*a* will become conductive to effectively ground the emitters of the transistors within block 177 to thereby select the first group of columns –0 and –1. A block of transistors, such as 177, is provided for each group of columns selected by instruction decoder 166 in order to permit selection of a particular column within each selected group in response to flip-flops N5 and N6** (FIG. 7*a*) operating through counter decoder 168, as will be described, infra.

In many of the commands, twelve or a lesser number of operation blocks are required for the performance of the operations individual to the command, in which case only a single column of transformers 150 in array 152 (each column in array 152 having twelve or a lesser number of transformers) is required for the execution of the command. For such commands, the instruction decoder 166 selects directly, according to the command, the proper column of transformers 150 in the array 152. On the other hand, in certain instances, computer commands are such that more than twelve operation blocks may be required for completion or execution of the operations individual to the command. In such instances, a single column of twelve transformers is insufficient and a group of columns of transformers are provided to accommodate the execution of the long command, one transformer corresponding to each operation block. The maximum number of columns which are used in a group is four to provide a maximum number of forty-eight transformers corresponding to the forty-eight operation blocks available for a long command; but as in the case of other commands, not all of the operation blocks need be used. Command 13–, for example, uses two columns of transformers 150 providing a maximum of twenty-four operation blocks which are individual to the command. The use of additional columns of transformers to continue the count for commands which require more than twelve operation blocks has an advantage in that it simplifies and reduces the number of components in the program counter 157, counter drivers 178, and the number of row drive lines 156. In longer commands requiring more than twelve operation blocks, including in some instances various modes, i.e., alternate operation blocks to be performed, flip-flops N7–11 acting through the instruction decoder 166 and drivers 173 select a group of columns of transformers 150 in the array 152 (such as the selection of columns 0 and 1 by conduction of driver transistor 173*a* when flip-flops N7–11 have the binary configuration 13–) which correspond to the command to be performed. The program counter flip-flops N5 and N6 acting through the counter decoder 168 (FIG. 7*a*) and the transistors within a respective block 177 (FIG. 7*b*) then select the particular column of transformers 150 in the array 152 from the group selected by flip-flops N7–11.

The various combinations of the states of flip-flops N5 and N6 for typical commands are shown in the table illustrated in FIG. 11 alongside the states of the instruction register flip-flops N7–11. Where the command includes a group of columns in the array 152, various combinations of the states of flip-flops N5 and N6 are indicated corresponding to the selection of particular colums in the group.

It should be noted that the instruction register flip-flops N7–11 do not enter into the selection of transformers in the program control array 153 shown in FIG. 7*a*. The program counter flip-flops N5 and N6 themselves acting through counter decoder 168 and drivers 176 select a single column of transformers 150 in the array 153, and the insrtuction register 155 (FIG. 7*b*) is not involved in the selection.

The order in which the transformers in a selected column are energized during execution of a command (and thus the order in which the operation blocks are performed during successive operating intervals) is controlled by program counter flip-flops N1–4 which during each operating interval select the drive line 156 of one of the twelve octally numbered rows making up arrays 153 and 152 in FIGS. 7*a* and 7*b*, respectively. Specifically, during each operating cycle, flip-flops N1–4 acting through counter decoder 170 and drivers 178 selects either one of the four rows –00– to –03– in array 153 if one of the transistors in array 153 is to be energized, or one of the eight octally numbered rows –04 to 17– in array 152 if a tranformer in array 152 is to be energized. If one of the four rows –00– to –03– of array 153 is selected, the selection of the transformer in array 153 to be energized is then completed by flip-flops N5 and N6 acting through counter decoder 168 and driver transistors 176 to select one of the four columns in array 153. However, if one of the eight rows 04–17 in array 152 is selected, the selection of the transformer in array 152 to be energized is then completed by flip-flops N7–11 acting through instruction decoder 166 to select a group of columns, and in addition, by flip-flops N5 and N6 acting through counter decoder 168 and transistors 177 to select a particular one of the columns from the group; of course, if flip-flops N7–11 selects only one column, the use of flip-flops N5 and N6 and transistors 177 are not necessary. As will be evident, infra, the transformers of array 153 correspond to command level operation blocks, while the transformers of array 152 correspond to operation blocks for individual commands.

Both the columns and the rows of transformers 150 have been octally numbered so that each transformer corresponds to the particular configurations of flip-flops N7–11, N1–4, and N5–6, respectively, which are required for its selection; the numbering of each transformer also corresponds to a like numbered operation block. For example, the transformer in array 152 (FIG. 7*b*) designated as 13–04–0 corresponds to operation block 13–04–0 and is selected by N7–11 having the configuration 13–, N1–4 having the configuration 04–, and N5–6 having the configuration –0. As another example, the transformer in array 153 (FIG. 7*a*) designated as XX–00–0 corresponds to operation block XX–00–0 and is selected by N1–4 having the configuration 00– and N5–6 having the configuration 0. The "XX" at the beginning of the number is provided to indicate that flip-flops N7–11 play no part in the selection of transformers in array 153, the selection of a transformer in array 153 depending only on the configurations of flip-flops N1–4 and N5 and N6.

In FIG. 12, the states of the flip-flops N1–4 have been indicated in the table for each of the rows –00– to –17–, inclusive, wherein the numbering used employs octal digits only, i.e., 0 to 7, inclusive. The table in FIG. 12 has been divided into two sections, the upper section including rows –00– to –03– of array 153, and the lower section including rows –04– to –17– of array 152. The various possible configurations of the states of program counter flip-flops N5 and N6 for each row are also indicated in FIG. 12 alongside the individual states of flip-flops N1–4 for respective rows. As explained in the previous paragraph, when flip-flops N1–4 select one of the rows –00– to –03– of array 153, only flip-flops N5 and N6 are required to select the transformer in array 153 to be energized; on the other hand, when flip-flops N1–4 select one of the rows –04– to –17– of array 152, the transformer in array 152 to be energized is selected by flip-flops N7–11 acting alone if only one column is selected, but if flip-flops N7–11 select a group of columns (which may be as many as four), then flip-flops N5 and N6 are required to choose a particular column from the selected group.

Additional tables illustrated in FIGS. 13 and 14 show the states of instruction register flip-flops N7–11 and program counter flip-flops N1–4 for the energization during successive operating cycles of those transformers (each transformer corresponding to a predetermined operation block of the same number as pointed out previously) which are required for the performance of a single stage exemplary command "load" (FIG. 13) and the performance of a double stage exemplary command "move" (FIG. 14). As noted alongside the tables in FIGS. 13 and 14, the upper sections of the tables are common to all single and double stage commands, respectively. As mentioned previously, the operation blocks having a first portion designation of XX correspond to transformers in array 153 (FIG. 7*a*) and the instruction register 166 does not control their selection. It should be noted that the XX–00–0 and XX–00–1 operation blocks are common to both single and double stage commands.

Now considering the program control apparatus in detail with reference to FIGS. 7*a* and 7*b* along with FIG. 8, it will be seen that the transformers 150 of arrays 152 and 153 are arranged in columns and rows by means of column lines 154 and row lines 156. The drive windings 158 (FIG. 8) of transformers common to a single row are connected to the same row drive line 156, while the drive windings common to a single column are connected to the same column drive line 154. As shown in FIG. 8, which is an exemplary embodiment of the transformer 13–04–0 of FIG. 7*b*, the transformer has a core 160 which is normally biased to a predetermined one of its two bistable states by a bias current $I_B$ (FIG. 9(*h*)) passed through a main bias line 162. The bias line 162 has been omitted in FIGS. 7*a* and 7*b* for clarity, but is coupled to each of the transformer cores 160 in arrays 152 and 153 in a manner similar to that shown in FIG. 8. Thus, in the absence of a drive current pulse 164 (FIG. 9*d*) applied to the drive winding 158 of any transformer, all transformers remain biased in the same predetermined state.

The selection of any one of the transformers 150 in the arrays 152 and 153, for example, transformer 13–04–0 in FIG. 8, is accomplished during each operating cycle by the proper choice of column and row drive lines 154 and 156 in accordance with the configurations of flip-flops N1–4, N5–6, and N7–11 as described previously. The timing of the selection is initiated during an operating cycle by timing signal $G_1$ (FIG. 9(*c*)) supplied from flip-flop G1 (FIG. 2), and fed to counter decoder 170 (FIG. 7*b*), whereupon a drive pulse 164 (FIG. 9(*d*)) is applied to the drive winding 158 of the selected transformer. The drive pulse 164 thus applied to the drive winding 158 of the selected transformer partially switches the core to induce program control pulses 189 on each of the secondary windings or sense lines 180 passing through the core 160. A typical program control pulse induced in the sense line XS3 of transformer 13–04–0 in FIG. 8 is illustrated in FIG. 9(*g*).

It should be understood that a particular one of the sense lines 180 is, in the usual case, inductively coupled to more than one of the transformer cores 160 in the respective array whereby a program control signal is produced on that sense line whenever drive pulses 164 are coupled to any one of the transformer cores 160 to which the particular sense line is coupled. It should be clearly understood that the transformers are selected one at a time by the setting of the column and row flip-flops and that one of the transformers 150 corresponds to each operation block. Resetting the program counter flip-flops N1–4 at the logical clock pulse $C_L$ is effective to change the coordinate selection of transformers 150 to proceed to the next operation block in the same column.

The description of a typical operation of the program control system will now follow with primary reference to the detailed circuit diagram of FIG. 8, which for the purposes of this description has been drawn to include typical associated program control circuits along with the transformer 13–04–0 shown in detail therein. For the purposes of this typical description, it will be assumed that operation block 13–04–0 is to be executed, the timing diagram for which is illustrated in the right half of FIG. 9. To select transformer 13–04–0 corresponding to operation block 13–04–0, it will be necessary that flip-flops N7–11, N5–6, and N1–4 be set to their required configurations at the logical clock $C_L$ of the previous operating cycle (which may be operation block XX–03–0 as indicated in FIG. 9). From previous discussions it will be understood that the configurations required to select transformer 13–04–0 are: flip-flops N7–11 be set to configuration 13– corresponding to the group in array 152 containing columns –0 and –1, flips-flops N5 and N6 be set to the configuration corresponding to column 0, and flip-flops N1–4 be set to a configuration such that $N_1'$, $N_2'$, $N_3$, and $N_4'$ are all true corresponding to row –04–.

Considered electronically, it will be understood that the outputs of flip-flops N7–11 will then act to cause the instruction decoder 166 to produce a low output signal 174 (FIG. 9(*e*)) on a decoder output line 167 which is coupled to the base of a PNP switching transistor **173*a*, as shown in FIG. 8. The signal 174 turns on the switching transistor 173*a* to complete a circuit from the ground 184 through the transistor 173*a* to the emitters of driver transistors 177 which drive columns –0 and –1 of array 152, which columns correspond to the divide comand 13–. The selection of column –0 from the two columns selected by divide command 13– is then accomplished by a low output signal 175** (FIG. 9(*f*)) on decoder output line **183*a* provided by counter decoder 168** (FIG. 7*a*) in response to the –0 column configuration of flip-flops N5 and N6. As shown in FIG. 8, the decoder output line **183*a* is coupled to the base of the PNP switching transistor 177*a* which drives column –0, and in response to the signal 175 is turned on to complete a circuit from the ground 184 through transistors 173*a* and 177*a* to the column drive line 154, thereby effectively grounding the end of driver winding 158 of the transformer which is connected to column line 154**.

The final selection of transformer 13–04–0 occurs at the leading edge of the control timing signal $G_1$ (FIG. 9(*c*) and FIG. 3(*g*), at which time $G_1$ becomes true along with flip-flop outputs $N_1'$, $N_2'$, $N_3$, and $N_4'$ corresponding to row –04–. As a result, a low output signal 185 is applied to amplifier and inverter 186 from a typical decoder network 182 shown in FIG. 8, producing an amplified and inverted signal on base line **171*a* to turn on transistor 172*a* and cause a −15 volt drive pulse 164** (FIG. 9(*d*)) to be applied to the row end of drive winding 158 of transformer 13–04–0 by way of row drive line 156 and diode 190. Since the column end of drive winding 158 has previously been grounded through transistors **177*a* and 173*a*, a complete circuit now exists through drive winding 158 of transformer 13–04–0 to cause drive pulse 164 to partially switch the core 160** and induce program control pulses (e.g. FIG. 9(*g*)) in each of the sense lines 180. The purpose of diodes 190 in series with drive windings 158 is to prevent "sneak" currents. The diodes 190 also serve to reduce transients generated by voltages induced in the drive winding 158 upon return of core 160 to its biased state when the drive pulse 164 falls to zero at the appearance of the logical clock $C_L$.

It will now be evident that energization of transformer 13–04–0, corresponding to the operation block of the same number, produces program control signals XS3, XS4 – – – XKM1 on each of the sense lines 180 coupled to the energized transformer as illustrated for a typical program control signal XS3 in FIG. 9(*g*). Each sense line 180 is connected to a respective program control signal X– – input of one or more logical circuits (as illustrated in FIGS. 22–30) in an "and" relationship so that the logical circuit remains inactive during an operating cycle unless a program control signal X– – is applied thereto. Thus, when program control pulses XS3, XS4 – – – XKM1 are generated in response to transformer 13–04–0 being energized, those logical circuits to which these signals are fed become operative during the operating cycle. The energization of the program control transformer 13–04–0 is thereby able to activate the predetermined combination of logical circuits which are required to be operative during the operating cycle in order to perform the operations corresponding to operation block 13–04–0. In a like manner, the energization of a different transformer during an operating cycle would induce program control signals X– – on the sense lines coupled to that transformer, whereby the predetermined combination of logical circuits fed by these sense lines would become operative during the operating cycle to perform the operations required for the operation block corresponding to the energized transformer. Thus, by proper choice of the program control transformer energized during an operating cycle, any of a considerable number of possible combinations of logical circuits may conveniently be made operative in order to perform the wide variety of operations which may be required for the different operation blocks provided by the computer.

Each program control pulse, such as illustrated by program control pulse 189 in FIG. 9(*g*) on the respective sense line 180, is chosen to be low for approximately two and one-half microseconds prior to the leading edge of the logical clock pulse $C_L$ in order to provide an adequate time period for propagation of logical signals through the logical circuits which have been made operative during an operative cycle in response to a program control pulse induced in a respective sense line 180 fed thereto. Also, each program control pulse 189 is caused to overlap in time the logical clock $C_L$ by approximately 0.2 microsecond so that the logical circuits will remain operative to trigger their respective flip-flops during the 0.2 microsecond duration of the logical clock $C_L$.

Considering now the details of construction of a program control transformer 150, such as transformer13–04–0 of FIG. 8, it will be understood that the transformer core material is preferably of a type characterized by a relatively narrow width rectangular hysteresis loop, high permeability, low coercivity, and low eddy current loss. Such a core material may be permalloy, a nickel-iron alloy having a high percentage of nickel, for example, a core of 78% nickel and 22% iron. A transformer 150 using a toroidal core having the aforementioned desirable characteristics provides a minimum of distortion of the drive pulse 164 to produce program control pulses (such as 189 in FIG. 9(*g*)) which are substantial replicas of the drive pulses 164.

The primary consideration in determining the magnitude of the bias current $I_B$ (FIG. 8) for a program control transformer is to make sure that sufficient bias is provided to drive the partially switched transformer core 160 back to its biased state in the time interval between drive pulses 164 of successive operating cycles in the event an operation block is repeated, referred to herein as "sticking." Another important consideration in determining the bias current $I_B$ is that a bias current $I_B$ of sufficient magnitude be provided to reduce the spurious signal outputs on sense lines 180 which are not coupled to an energized transformer 150 during a given operating cycle.

The foregoing describes the operation of the program control system during a complete operating cycle indicated as operation block 13–04–0 in FIG. 9 in which program control signals XS3, XS4 – – – XKM1 are supplied on sense lines 180 to predetermined logical circuits of the computer during an operating cycle in order to make these predetermined logical circuits operative to perform the operations desired in accordance with the operation block to which the transformer 13–04–0 corresponds. If the following operating cycle is to perform operations of operation block 13–05–0, program control transformer 150 for operation block 13–05–0 will then be energized to produce program control signals X – – on sense lines 180 coupled thereto in a manner similar to that just described for transformer 13–04–0. Alternatively, as a result of the logicl performed in the operating cycle for operation block 13–04–0, the same operation block may be repeated in the immediately following operation cycle, or operation blocks in a command may be skipped, depending on the operation of the program counter flip-flops N1–4 and N5–6 controlled by the outputs of decision drivers **K*s*1, K*s*2, and K*s*3. In the immediately following operating cycle, therefore, the same transformer may be energized again or a selection may be made of another transformer which corresponds to an operation block selected in accordance with decisions during the performance of the logical operations in the operation block 13–04–0**.

For future reference, FIG. 10 is provided showing the specific sense lines coupled to each of transformers XX–00–0, XX–01–0, XX–02–0, and XX–03–0 of array 153 in FIG. 7*a*. The bias line 162 has been omitted in FIG. 10 in order to more clearly indicate the sense lines 180.

Now referring also to FIG. 17, an exemplary portion of a sequential "flow diagram" or operation block diagram is depicted illustrating typical sequential steps or block operations within different commands which may be executed by suitable selection of predetermined program control transformers 150 of arrays 152 and 153 during successive operating cycles. As pointed out previously each of the operation blocks shown in FIG. 17 has an operation block number by which it is identified and which number corresponds to the numerical designation of a transformer in either array 152 or 153 which controls the activation of a predetermined group of logical circuits represented by that block. For example, transformer 01–04–0 (FIG. 7*b*) controls the activation of the predetermined group of logical circuits whose operation is represented by operation block 01–04–0 of FIG. 17. As will hereinafter be made clearly evident in greater detail, each operation block represents, in the operation sense, a set of logical equations which define the logical relationship of the predetermined logical circuits which are made effective during an operating cycle by the program control pulses 189 induced in sense lines coupled to the program control transformer corresponding to that operation block, as pointed out previously. It will thus become evident from the foregoing description that it is possible to make the computer self-sequencing so that, as a result of carrying out the operations represented by a given operation block during an operating cycle, the logical circuits controlling the N flip-flops may be controlled by other computer logical circuits (such as decision circuits **11*b***) to permit the N flip-flops to be set to the configurations required to select the next program control transformer corresponding to the operation block to be performed during the next operating cycle. Consequently, the order in which the operation blocks are performed by the computer are thus conveniently and advantageously made automatically self-sequencing, without requiring additional clock pulse periods or other time consuming operations.

As hereinbefore indicated, the specific operations which are represented by a particular operation block which are carried out in predetermined order during an operating cycle, may be repeated in each of one or more operating cycles, depending on a binary decision formed in the decision logic of decision circuits **11*b* and brought into effect by the output of the decision drivers K*s*1–3. An exemple of this choice in response to logical operations is indicated at operation block 02–05–0 in FIG. 17, wherein, as indicated, the computer may, in normal action, encounter the next operation block, or skip (for example, to block XX–00–0, or "stick," i.e., repeat the operations of a block 02–05–0, as determined by the results of operations within the decision circuits 11*b* and placed in effect through decision drivers K*s*1 and K*s*2). Another choice which may be provided within a given command is that at certain operation blocks, a choice between two alternate subsequent operation blocks may be made by the true-false status of one of the program counter flip-flops N5 and N6. This choice may, for example, cause the sequence of operations during that step to be controlled by a program control transformer 150 in an adjacent column of array 152** (FIG. 7*b*) rather than by the next transformer following in the present column. Thus, it is evident that besides being self-sequencing, logical decisions made by the computer while performing the operations defined by the operation blocks of the command may determine the actual flow path of block operations followed during the computer operation.

COMMAND STRUCTURE

The present computer system is a modified single address system wherein only one main memory field and only one operand stored in the main memory field is normally accessed in a single command. Those commands which access only a single operand are referred to herein as single stage commands and are graphically illustrated in FIG. 15. Some commands, however, are capable of accessing two operands in order, for example, to transfer information from one location in the memory to another. These latter commands are referred to as double stage commands and are illustrated diagrammatically in FIG. 16.

In the present computer system an actual operand is sometimes stored in the second word (word #2) of a command (in lieu of an address for that operand) where the operand consists in a single word. This is a special case termed implicit addressing and in these instances, since the operand is the second word (word #2) (A) of the command in FIG. 15, the operand may be made available immediately by accessing the main memory cells of the command corresponding thereto. This special case of implicit addressing is represented in a command by the last four bits (R) of word #1 thereof which four bits are 1111, i.e. (R=(—)) to indicate that the second word (A) of the command is the operand.

execution of a command. For this example, it will be assumed that the first word (word #1 of FIG. 15) of the command to be accessed is a number (351) and is stored in a first cell of main memory unit #0 (FIG. 1) at address (40); it will also be assumed that the second word (A) of the command to be accessed is a number (150) and is stored in a second cell of main memory unit #0 at address (41). To access these first and second words of the command stored in main memory unit #0, it is first necessary that their address of the word #1 (40) be looked up in the Control N° Register (one of the index registers 15) where it is stored; the address is then "read out" of the Control N° Register, stored in the S register, and then transfered to the L register to permit the words (351) and (150) at addresses (40) and (41) in the main memory unit #0 to be sequentially "read out" into the M register. The state of the L register for the address (40) obtained from the Control N° Register and the state for the address (41) of the word #2 are illustrated below along with the first and second words (351, 150) sequentially "read out" of main memory unit #0 into the M register in response to addresses 40 and 41 being set up in the L register during consecutive operating cycles.

| L Register | L18 | L17 | L16–L9 | | L8 | L7 | L6 | L5 | L4 | L3 | L2 | L1 |
|---|---|---|---|---|---|---|---|---|---|---|---|---|
| Address (40) of word #1 (351) | 0 | 0 | ------ | ------ | 0 | 1 | 0 | 0 | 0 | 0 | 0 | 0 |
| Address (41) of word #2 (150) | 0 | 0 | ------ | ------ | 0 | 1 | 0 | 0 | 0 | 0 | 0 | 1 |
| M Register | M12 | M11 | M10 | M9 | M8 | M7 | M6 | M5 | M4 | M3 | M2 | M1 |
| | | (R=3) | | | X | | (F=5) | | | (C=1) | | |
| Word #1 (351) | 0 | 0 | 1 | 1 | 0 | 1 | 0 | 1 | 0 | 0 | 0 | 1 |
| | | | | | (A=150) | | | | | | | |
| Word #2 (150) | 0 | 0 | 0 | 1 | 0 | 1 | 0 | 1 | 0 | 0 | 0 | 0 |

Another mode of addressing which may be employed is referred to as relative addressing wherein the second word (A) of the command does not contain the operand as in implicit addressing described above but instead, the second word of the command contains a twelve bit relative address which upon combination with an eighteen bit base number in one of the index registers 15 of the auxiliary memory 13 (FIG. 1) provides the eighteen bit address of the first word of the main memory field containing the operand or as more simply stated, the first word of the operand. Thus, in relative addressing the operand is found by means of the second word (A) of the command which serves as a relative address, and upon being combined with a particular base number in a specified index register provides the address of the first word of the operand in the main memory 13. The modification of the relative address (A) in this manner thereby permits different data to be operated upon with the same sequence of commands, and makes possible increased operating speeds as well as permitting greater versatility with a minimum of circuit complexity.

The particular base number in the index register with which the second word (A) of the command is to be combined to provide the address of the first word of the operand is specified by the (RX) portion of the first word of the command which, instead of the (R) portion being set to 1111 as in implicit addressing previously described, the (R) portion combines with the (X) portion to provide an (RX) portion which is the address of the index register where the base number can be found.

The twelve bit relative address (A), which is the second word of the command, is combined with the eighteen bit base number accessed from the addressed index register by addition of the two in the adder 11*a*, the sum being put into the L register. The sum stored in the L register is the address of the first word of the operand.

The following is an example illustrating how a single stage command may be accessed from the main memory 9 (FIG. 1) in which it is stored in order to initiate the So far, a typical single stage command, such as illustrated in FIG. 15, has been analyzed to the extent that the function of the second word (A) of the command has been illustrated as well as the functions of the portion (R) and the combined portions (RX) for implicit and relative addressing, respectively. It has been shown that the second word (A) of the command may itself be the operand, in which case portion (R) of the first word of the command is 1111 to permit those memory cells in the main memory corresponding to the second word (A) of the command (which is the operand) to be accessed. Alternatively, the second word (A) of the command may merely be a relatively address which is added to a base number found in one of the index registers 15 to provide the eighteen bit address required to access the first word of the operand in the main memory, the address of the register containing the base number in the index registers 15 being provided by the (RX) portion of the first word of the command.

Thus, the remaining portions of the single stage command to be considered are the portions (F) and (C) of the first word. The portion (F) is a three bit binary number representing the number of words in a main memory field (which may have up to eight words as explained previously). The portion (F), therefore, is able to provide information as to when the last word in the field has been accessed. Finally, the purpose of the (C) portion of the first word of the single stage command may be considered. This (C) portion is a four bit binary number representing the command code; that is, remembering the previous discussion of the program control system shown in FIG. 7*a* and 7*b*, the configuration of instruction register 155 (FIG. 7*b*) containing flip-flops N7–11 is determined by the command code (C), and these flip-flops N7–11 in turn determine those columns of program control transformers 150 (and their corresponding operating blocks) which are capable of becoming energized during the execution of a command.

Turning now to a consideration of a double stage command, the basic structure of a typical command is illustrated diagrammatically in FIG. 16. It will be seen that, in general, the first and second words (word #1 and word #2) are the same as the first and second words of a single stage command (FIG. 15), and may likewise provide the information for a first operand. In a double stage command the (F) portion and the (C) portion together provide the information for setting the instruction register flip-flops N7–11. However, in addition to the first and second words, a double stage command requires two more words (word #3 and word #4), which are able to provide the information for a second operand. Since the command code already has been provided by the (C) portion and the (F) portion of the first word of the command, the (G) portion of the third word is available to provide the field of the first operand; or if no field length information is necessary, the (G) portion is available for various alternatives which may be involved in executing the double stage command. The other portions of the third word (Q), (Y), and (J) may have similar functions to those described for portions (F), (X), and (R), respectively of the first word of a single stage command. Also, in the same manner in which the second word (A) of the command may represent the relative address of the first word of the field containing the first operand, the fourth word (B) of the command may represent the relative address of the first word of the field containing the second operand.

It will be appreciated that the arrangement and functions of the various portions of the command structure described above and illustrated in FIGS. 15 and 16 are not limited to the specific examples presented, and may be given different representations and functions depending on the particular computer operation to be performed.

FILP-FLOP AND ASSOCIATED CIRCUITRY

The logical flip-flops employed in the computer system are all of the same basic construction and operate in a similar manner in response to a logical input and the logical clock pulse $C_L$. A preferred form of flip-flop, as applied to flip-flop S1 of the S register, is illustrated in FIG. 22*a* along with the drive and gating circuitry required therefor. It will be understood that the other S register flip-flops, as well as the other flip-flops in the computer system, may be similarly constructed.

Referring to FIG. 22*a*, flip-flop S1 is of the diode-coupled type described and shown in the book by Abraham I. Pressman, entitled "Design of Transistorized Circuits for Digital Computers," chapter 11, FIG. 11—11, published by John F. Rider, March, 1959. Flip-flop S1 is provided with a true output $S_1$, a false output $S_1'$, a set input $_1s_1$, and a reset input $_0s_1$. In accordance with well-known flip-flop operation, a set pulse applied to set input $_1s_1$ sets flip-flop S1 to the true state such that output $S_1$ is at a low level logical potential (−2 v.) while output $S_1'$ is at a high level logical potential (0 v.), and a reset pulse applied to reset input $_0s_1$ sets flip-flop S1 to the false state such that output $S_1'$ is at a low level logical potential while output $S_1$ is at a high level logical potential. If flip-flop S1 is initially in the desired state to which it is to be set or reset, as the case may be, the applied set or reset signals will leave the flip-flop unchanged, since it is already in the desired state.

In addition to set and reset inputs $_1s_1$ and $_0s_1$, flip-flop S1 also has inputs 345 and 355 for triggering the flip-flop into the true or false state, respectively, in accordance with a logical input signal *s*S1, when the logical clock $C_L$ appears. This is accomplished by applying the true or false logical input signal *s*S1 to transistor double driver 330, which by means of output lines 331 and 333, respectively, applies a true signal to a transistor gate 350 and a false signal to a transistor gate 340, if logical input *s*S1 is true, and vice versa is *s*S1 is false. Then, upon the appearance of the logical clock pulse $C_L$ applied to both gates 340 and 350, as shown in FIG. 22*a*, gates 340 and 350 are enabled to pass the true or false signals on output lines 331 and 333 of transistor double driver 330 to input 45 and 55 of flip-flop S1 so as to set the flip-flop S1 to the same state as the logical input *s*S1.

For example, if *s*S1 is true, transistor double driver 330 provides a true signal on line 331 and a false signal on line 333. Then, when the logical clock $C_L$ enables gates 340 and 350, the true signal on line 331 passes through gate 340 to input 345 of flip-flop S1, while the false signal on line 333 passes through gate 345 to input 355, whereupon flip-flop S1 is set to the true state in accordance with *s*S1.

It may be noted that transistor gates 340 and 350 employ delay networks 347 and 357, respectively, which act to avoid retriggering as well as to provide a temporary memory for the flip-flop. Such delay networks are important in view of the fact that the logical input *s*S1 may change simultaneously with the appearance of the logical clock $C_L$. The delay networks provide a sufficient time to permit flip-flop S1 to end up in a state in accordance with the original value of *s*S1, even though the logical input *s*S1 changes either just before or during the logical clock $C_L$.

*Operation*

A detailed description of the operation of the computer system during four successive operating cycles will now be provided in order to illustrate the mechanization and operation of a specific computer in accordance with the invention. It is to be understood that the following description is intended merely to be representative of a relatively small portion of computer activity during successive operating cycles, and for the sake of brevity and clarity, does not include all the possible considerations or the complete operating details which may be involved in the operation of a specific computer. However, from the previous discussions, and from the following operational description and the logical equations and mechanization to be presented, one skilled in the art should have no difficulty in providing the mechanization and operation necessary for the design of a computer system in accordance with the invention for a wide variety of computer applications.

The command flow diagram illustrated in FIG. 17 describes block operations of exemplary commands and, as such, represents an overall picture of computer operation. It may be noted that the operation blocks are generally arranged in FIG. 17 to correspond to the location of their respective transformers 150 in arrays 152 and 153 of the program control system shown in FIGS. 7*a* and 7*b*, one program control transformer (and thus one operation block) being energized for each operating cycle. As pointed out in connection with the description of the program control system of FIGS. 7*a* and 7*b*, the energization of a program control transformer during an operating cycle causes a predetermined combination of logical circuits to become operative during that operating cycle in response to program control signals induced in sense lines coupled to the energized transformer. Thus, by energizing the program control transformers in a predetermined manner during successive operating cycles, any desired command may be performed; also, the selection of each program control transformer to be energized during each operating cycle is advantageously determined by the logical operations performed during the previous operating cycle and various decision circuits 11*b* (FIG. 1) in a manner so that automatic self-sequencing operation is obtained.

Referring again to the operation blocks of FIG. 17, it will be seen that the first two operation blocks, namely XX–00–0 and XX–01–0 are particularly significant in that all commands are set up for execution by first passing through these two operation blocks; that is, operation blocks XX–00–0 and XX–01–0 are common to all commands. Single stage commands are then further processed in blocks XX–02–0 and XX–03–0, after which any of a number of single stage commands may then be performed by energizing, during successive operating cycles, the program control transformers whose operation blocks correspond to the particular single stage command to be executed. FIG. 17 illustrates the command flow of the typical single stage commands: load, store, and divide.

The command flow for all double stage commands is first through blocks XX–00–0 and XX–01–0 in the same manner as for single stage commands, but as shown in FIG. 17, the flow then proceeds to blocks XX–00–1, XX–01–1, and XX–03–1, in that order, with provision for exceptions as noted by the "skips" indicated. After these blocks, the command flow may then proceed to any of a number of double stage commands, one such double stage command being indicated by the "move" command in FIG. 17.

One or more "skips" such as indicated in connection with block XX–00–1 in FIG. 17, may be provided in executing a command for various purposes, for example, in order to avoid unnecessary block operations, or after the data on which the computer is operating has been processed to a predetermined point. Decision circuits, such as 11b in FIG. 1 which includes decision logic and decision drivers Ks1 and Ks2, act to control when a "skip," "jump," or some other decision operation is to take place after a particular operation block. For example, the "skip" from blocks XX–01–0 to XX–03–0 are results of decisions which depend upon whether an operand is contained in the second word of respective commands.

In FIGS. 18 to 21, rectangles representing the operation blocks are enlarged, and within each of the blocks concise statements appear which define exemplary operations or activity of the computer occurring during the operating cycle for which the program control transformer corresponding to the particular operation block is energized. Below each of the blocks, logical equations are presented which represent (by means of Boolean algebra) the logical operations provided by the predetermined combination of logical circuits made operable by the sense lines coupled to the energized transformer.

It should be noted that certain forms of the logical equations occur in more than one of the exemplary operation blocks, which indicates that the same group of logical circuits are made operable during more than one operation block. It will be understood that with the program control system employed in the present invention, it is only necessary to provide logical circuitry for generating this equation once, and then to cause the particular logical circuits corresponding to the equation to become operable for each operation block where required. Structurally, this merely means that the particular sense lines which are coupled to the logical circuits representing the equation, be also coupled to those program control transformers corresponding to operation blocks where the equation is required. This multiple use of logical circuits very considerably reduces the number of logical circuits required in the computer.

Referring to FIGS. 22 to 30 inclusive, there are shown typical logical circuits which may be associated with the adder 11a and the registers and drivers involved in the performance of the four operation blocks XX–00–0, XX–01–0, XX–02–0, and XX–03–0 illustrated in FIGS. 18 to 21, respectively. FIG. 23, for example, depicts typical flip-flops of the L register along with their associated exemplary logical circuits and the complete logical equation therefore. Since there is general similarity of circuitry for each of the flip-flops in this register, the flip-flops L1 and L18 and the input circuitry associated therewith may be considered as illustrative of the others.

Still referring to FIGS. 22 to 30, it will be noted that the logical circuits for the flip-flops and drivers shown therein are made up of conventional diode "and" and "or" logical circuits. The sum diode corresponding to the logical "or" function is shown slightly above the associated product diode or diodes in each logical circuit in order to easily distinguish it therefrom. The accompanying circuitry for the product diodes are illustrated in FIGS. 23 to 30 only for the product diodes and not for the sum diodes; however, the accompanying circuitry for the sum diodes may be considered as incorporated in a conventional manner as part of the drivers to which these sum diodes are coupled. It will be seen from FIGS. 22 to 30 that the outputs of the logical circuits are connected to the logical inputs of flip-flops or drivers to control the states thereof, as will become apparent from the operative description to be presented herein.

Referring now to FIG. 23, the L register flip-flops L1–18 and their associated logical circuits will be considered in some detail to illustrate the mechanization of a typical register. It will be noted that flip-flops L1–18 are involved in each of the operation blocks XX–00–0 to XX–03–0 inclusive in FIGS. 18 to 21, the complete logical equation for the logical circuits associated with these flip-flops L1–18 being indicated below the circuit diagram in FIG. 23. The portion of this complete logical equation which is applicable during each operation block is listed under the heading "L register" in FIGS. 18 to 21, respectively. The signals preceded by the letter "X" (such as XL2, XL1, etc.) in FIG. 23 and FIGS. 18 to 21 each represent the program control signal appearing on a respective sense line (see FIG. 10), and as such the program control signal (e.g., XL2) is true when a program control pulse is induced in the corresponding sense line during an operating cycle, and false if no pulse is induced. Thus, in accordance with conventional notation, the prime of a program control signal (such as XL4') has the opposite meaning and is true if no pulse is induced in the corresponding sense line and false if a pulse is induced therein.

From the logical circuitry associated with the flip-flops L1–18 in FIG. 23, it will be noted that the first term of the complete equation, namely logical product ($Ja_{1-18}$XL1), is common to operation block XX–00–0, as shown in FIG. 18 as well as to operation block XX–02–0, illustrated in FIG. 20. Consequently, the circuitry for implementing this equation need only be provided once. Whenever the logical equation representing this logical product ($Ja_{1-18}$XL1) occurs in an operation block, it is only necessary that the program control signal XL1 be made true, and this is accomplished by coupling the sense line corresponding to XL1 to the program control transformer corresponding to each operation block in which the equation occurs, as shown in FIG. 10.

The second term of the complete logical equation shown in FIG. 23 is the logical product, $L_{1-18}$ (count up) XL2, and is implemented by the logical circuits which include these terms as inputs. The term $L_{1-18}$ (count up) represents the outputs $L_{1-18}$ modified by a "count up" function in a manner well-known to those in the art and includes counting up one in the L register (adding one to the number stored in the flip-flops of the L register) for addressing the next word in the main memory.

The third and last product, $L_{1-18}$XL4′ in the logical equation shown in FIG. 23 represents the logic required for recirculation of the information stored in the flip-flops L1–18, such as is required in operation block XX–03–0. Flip-flop L1, for example, has a logical circuit having inputs $L_1$ and XL4', the input XL4' being obtained by feeding the sense line corresponding to XL4 to the product diode in this logical circuit through an inverter I. Thus, the term XL4' is true in each operation block in which the transformer 150 corresponding to the operation block does not include sense line XL4, e.g., operation block XX–03–0. The prime of a program control signal is used instead of the program control signal itself (such as XL4' above) for those program control signals where the logical circuit controlled by the program control signal is to be made operative for a majority of the operation blocks. By such a choice, the sense line need be coupled only to those program control transformers corresponding to the smaller number of operation blocks where the logical circuit does not occur.

Finally, it will be understood from FIG. 23 and the preceding discussion of a typical flip-flop in connection with FIG. 22*a*, that each of the flip-flops L1–18, like each of the other logical flip-flops in the computer, is triggered at the logical clock pulse $C_L$ in accordance with the logical potential level present at its logical input.

Referring now to FIGS. 18 to 21 and FIGS. 21*a* to 21*d*, operations within the four operation blocks XX–00–0, XX–01–0, XX–02–0, and XX–03–0 of FIG. 17 through which all single stage commands must be processed will now be described in detail in order to demonstrate the mechanization and operation of a typical portion of the computer system in accordance with the invention. The particular combinations of logical circuits which are made operable by energization of the program control transformer for each operation block are represented by the logical equations accompanying each of FIGS. 18 to 21.

Referring now to FIG. 18 and FIGS. 21*a* and 21*b* along with FIG. 10, a detailed description of the first operation block XX–00–0, which is the first of the two operation blocks common to all commands, will now be presented. The function of operation block XX–00–0 is to permit the Control N̲° (which is the address of the first word in the command in the main memory which is to be accessed) to be looked up in the Control N̲° Register (one of the index registers 15) and set up in the L register via the adder. To initiate operation in operation block XX–00–0, the program counter and instruction register flip-flops (N1–11 in FIGS. 7*a* and 7*b*) are set to select program control transformer 150*a* (FIG. 10) corresponding to operation block XX–00–0, whereby a drive pulse 164 is applied to its drive winding 158, causing control signals XG*a*1, XG*a*4, XL4, XL1, XS2, XS6, XS7, and XN1 (as shown in FIG. 10) to render operable the corresponding logical circuits associated with the adder, L register, A register, S register, N registers, and T registers in accordance with the logical equations shown in FIG. 18. This operation block provides a "read transfer" auxiliary memory cycle and no main memory cycle.

It will be assumed that the Control N̲° which is to be looked up, is Control N̲° (40) corresponding to the first word of the command to be executed, which will be assumed to be the load command shown in FIG. 21*a*, having a first word (351) and a second word (150) as shown which have been stored at addresses (40) and (41), respectively, in the main memory. It will further be assumed that Control N̲° (40) has been stored in the Control N̲° Register by suitable means, such as a keyboard, and that the A register is set to access the Control N̲° (40). As indicated in the operation block XX–00–0 in FIG. 18 and the schematic representation thereof in FIG. 21*b*, the first operation in that block is a "read transfer" auxiliary memory cycle which provides for "reading out" Control N̲° (40) from the Control N̲° Register in the auxiliary memory into the S register during the read time interval of the operating cycle for operation block XX–00–0. For the details of operations such as "reading out" in a "read transfer" auxiliary memory cycle, reference is made to the detailed description of FIG. 2. Briefly, "reading out" of a memory register in the auxiliary memory 13 (FIG. 1) includes a "read transfer" auxiliary memory cycle; therefore, flip-flops E1 and E2 have been set in the preceding operating cycle to their false states to provide low potential level outputs $E_1'$ and $E_2'$, respectively, to the clear pulse circuit 50 to produce clear pulses R*s*1 and R*s*2 for clearing of the flip-flops S1–19 in the S register prior to transfer of the Control N̲° to the S register. Also, strobe pulses Q*a*1 and Q*a*2 are produced by strobe pulse circuits 60 which are applied to the sense amplifiers S*a*1–19 to gate and amplify the signals corresponding to the Control N̲° "read out" of the Control N̲° Register. The output of the sense amplifiers is coupled to the set inputs $_1s_{1-19}$ of the respective flip-flops S1–19 of the S register. Since only binary ones provide outputs from the Control N̲° Register to the set inputs of the respective flip-flops, the combination of clear pulses R*s*1 and R*s*2 clear all of the flip-flops S1–19 prior to transfer to the S register whereby the states of flip-flops S1–19 will be set to the binary configuration of Control N̲° (40), which is address (40) of the first word of the command as shown in FIG. 21*b*. The logical equations listed below the operation block in FIG. 18 will be considered in the same order as the operations listed in operation block XX–00–0.

During the auxiliary memory cycle in operation block XX–00–0, Control N̲° (40) is set up in the S register and is "written back" into the Control N̲° Register at the same address during the write time interval of the operating cycle under consideration. In order to write back into the Control N̲° Register, the Control N̲° must be circulated in the S register at the logical clock pulse $C_L$ to make it available during the subsequent write time interval of the operating cycle. Recirculation of the information in the S register at the logical clock pulse $C_L$ will retain the Control N̲° in the S register for writing the Control N̲° back into the Control N̲° Register during the write time interval. The logical equations listed under the heading "S register" provide for the recirculation of Control N̲° (40) in the S register at the logical clock pulse $C_L$. The program control signals indicated in these equations, namely XS2, XS6, and XS7 are all true during operation block XX–00–0 and render operable the logical circuits for the S register, as shown in FIGS. 28*a* and 28*b* to provide recirculation of the Control N̲°.

In preparation for the next operating cycle, the address of the Control N̲° Register must be recirculated in the A register. The logical equations for recirculation of the address of the Control N̲° in the A register are indicated under the heading "A register" in FIG. 18. The logical circuits for the flip-flops A1–3 and A4–7 in FIG. 24 are rendered operable by program control signals XA3' and XA4', respectively, which are true during block XX–00–0, since sense lines XA3 and XA4 are not coupled to the program control transformer corresponding to this operation block, as can be seen from FIG. 10. The other inputs for the logical circuits of flip-flops A1–3 and A4–7 are the outputs $A_{1-3}$ and $A_{4-7}$, respectively.

The next logical equations which will be considered in FIG. 18 are those listed under the heading "Adder" and represent the logic required to copy the Control N̲° (40) from the S register into the L register by way of the adder as shown in FIG. 21*b*. The logical input circuits for drivers G*a*1–4 and G*a*5–12 (FIGS. 1 and 22) are rendered operable by program control signals XG*a*1 and XG*a*4, respectively (both of which are true as can be seen from FIG. 10), for transferring the portion of Control N̲° (40) stored in flip-flops S1–4 and S5–12, respectively, through the adder 11*a*. Simultaneously, the logical input circuits for drivers J*a*13–18 are rendered operable by the program control signal XJ*a*1' (which is true since sense line XJ*a*1 is not coupled to transformer XX–00–0) for copying the remaining portion of Control N̲° (40) from flip-flops S13–18 through the adder 11*a*. In transferring information through the adder, the other input logic to drivers F*a*1–12 must be zero. Since the components involved in the operation of the adder in operation block XX–00–0 involve the operation of drivers, not flip-flops, the output of the adder will be available prior to the logical clock pulse $C_L$. The output of the adder, therefore, will be available at the logical circuits associated with the L register (FIG. 23) prior to the logical clock pulse $C_L$ to set the flip-flops L1–18 to Control N̲° (40) when the logical clock pulse $C_L$ occurs during the operating cycle corresponding to the present operation block XX–00–0. The adder 11a can be any of the well-known circuits for adding decimal coded binary digits. A description of one of many suitable adder circuits is the adder disclosed in copending U.S. Patent Application Serial No. 100,735, filed April 4, 1961, for PARALLEL CODED DIGIT ADDER, by Robert O. Gunderson and Tom T. Tang. The logical equations for setting the L register in block XX–00–0 are indicated under the heading "L register" in FIG. 18. The logical circuits for flip-flops L1–13 are rendered operable by the program control signal XL1 (which is true as shown in FIG. 10 since the sense line passes through the core of transformer 150a) to complete the copying of the Control N° (40) from the S register to the L register through the adder. As indicated by the equation and the logical circuits shown in FIG. 23, the adder output drivers Ja1–13 provide signals $Ja_{1-13}$ to the inputs of the respective logical circuits associated with the L register to complete the copying of the Control N° into the S register, the binary configuration of Control N° (40) in the S and L registers being illustrated in FIG. 21*b*.

The next operation indicated in the operation block XX–00–0 is the setting of the program counter to go to the next operation block XX–01–0. The logical equations for this operation are indicated under the heading "N registers." The pertinent equations for this operation involve the program counter flip-flops N1–4. As indicated in the table shown in FIG. 12, the flip-flop N1 is placed in its true state to provide the binary configuration 0001 in the program counter flip-flops N1–4 by the program control signal XN1 which renders operative a logical input circuit to the flip-flops N1 having other inputs $Ks_1'$, $Ks_2'$, and $Ks_3'$ as shown in FIG. 25. The false states of decision drivers Ks1 and Ks2 indicate that the following operation block XX–01–0 will be performed in the following operating cycle. The data in the instruction register flip-flops N7–10 is recirculated as illustrated in FIG. 25 for flip-flops N7–10 by rendering the respective input logical circuits for recirculation operative by the program control signal XN34′, which is true since sense line XN34 is not coupled to transformer XX–00–0. The logical equations and logical input circuits for the flip-flop N11 have not been shown in FIGS. 18 and 25 since they are not necessary to an understanding of the exemplary operation being described herein. Also, it will be noted in the description to follow, wherever the operation of a flip-flop or driver is not necessarily involved in the exemplary operation for the selected operation blocks, the flip-flop or driver will not appear in FIGS. 22 to 30, and its equation will not appear in FIGS. 18 to 21.

The logical decisions made in the first operation block provide the final determination of the next operation block to be performed. The false state of the drivers Ks1 and Ks2 (outputs $Ks_1'$ $Ks_2'$) provide the logical inputs for the decision to proceed to the operation block XX–01–0. A driver Ks3, however, has been provided to over-ride the decisions provided by the decision drivers Ks1 and Ks2. An output $Ks_3$ therefor, will over-ride outputs $Ks_1'$ $Ks_2'$ in the event a "skip" to the "rest" block XX–00–3 is warranted. The exemplary logical input circuit for the decision driver Ks3 is indicated in FIG. 26 and is shown to include a flip-flop KR0. Flip-flop KR0 is set, for example, by the "rest" button being depressed to provide a low logical potential (−2 v.). The output $KR_0$ is coupled to the logical inputs *d*Ks3 of the decision driver Ks3 to produce a true output $Ks_3$ having a low logical potential level (−2 v.). The driver Ks3 is a double driver circuit having an output from the second stage $Ks_3$ when turned on by a low logical potential (−2 v.) (true logical signal) at its input *d*Ks3. The other decision drivers employ the same double driver circuit arrangement to provide true and false outputs in response to low and high logical potential signal inputs from second and first stages, respectively. As shown for the logical equations for flip-flops N5 and N6 in FIG. 18, the output $Ks_3$ renders the respective logical input circuits for flip-flops N5 and N6 operative to "skip" to "rest" block XX–00–3 in the next operating cycle. The compute button, shown in FIG. 26, resets flip-flop KR0 to enable the system to return to block XX–00–0 from the "rest" block XX–00–3 via operation block XX–01–3. Resetting flip-flop KR0 by depressing the compute button turns off the decision driver Ks3 for the move from the "rest" block to operation block XX–01–3 and the "skip" to operation block XX–00–0.

The logical equations listed under the heading "T registers" in FIG. 18, provide for the recirculation of the T registers, including the T register flip-flops T1–12, the TM register flip-flops TM1–3, and the T@ register flip-flops T@1–3, by rendering the respective logical input circuits operative by program control signals XT4′, XT5′, and XT6′ for the T register; XTM1′ for the TM register, and XT@1′ for the T@ register.

Special flip-flops F1 and F2 control the timing control circuits 24, 26, 28, and 30 for the main memory, and the clear pulse forming circuit 57 for the main memory, as shown in FIG. 2. The logical equations for flip-flops F1 and F2 are indicated in FIG. 18 under the heading "M register." If the flip-flop F1 is allowed to remain in its false state, a main memory cycle will be performed in the next operation block. If the flip-flop F2 also is allowed to remain in its false state, a "read transfer" memory cycle will be performed in the next operation block. Since a "read transfer" main memory cycle is indicated in operation block XX–01–0, flip-flops F1 and F2 will be triggered false by the logical clock pulse $C_L$ unless a decision is made to "skip" to the "rest" block. The equation for flip-flop F1 indicates the logical circuit, shown in FIG. 27, is rendered operable by the output $Ks_3$. In the "rest" block, therefore, no main memory cycle will be performed. If no main memory cycle is to be performed, the state of flip-flop F2 is unimportant since it depends upon the state of flip-flop F1 to be effective, as discussed in connection with the timing control of the main memory cycle in FIG. 2.

Special flip-flops E1 and E2 are controlled by logical input networks as indicated by the logical equations shown under the heading "S register" in FIG. 18. The flip-flops E1 and E2 control cycles of the auxiliary memory in a similar manner as flip-flops F1 and F2 control cycles of the main memory. The additional discussion of the operation of the special flip-flops F1 and F2 and E1 and E2 can be found in the description of FIG. 2. Since a "read transfer" auxiliary memory cycle is indicated in operation block XX–01–0, the flip-flops E1 and E2 will be allowed to remain false unless a decision is made to "skip" to the "rest" block whereupon E1 is triggered into its true state by the signal $Ks_3$ coupled to the logical input circuit having the single input $Ks_3$.

Thus, during operation block XX–00–0, Control N° (40) is accessed from the Control N° Register in the auxiliary memory, is set up in the S register, and is then copied from the S register into the L register by way of the adder as shown in FIG. 21*b*, while at the same time the program counter (flip-flops N1–4 in FIG. 7*b*) is set to go to the next operation block XX–01–0. Thus, as shown in FIG. 21*b*, at the end of the first operation block XX–00–0, the L register is set to access the contents of the memory cell at address (40) in the main memory at which address the first word (35′) of the command (FIG. 21*a*) is stored, and the program counter has been set to go to operation block XX–01–0 during the next operating cycle.

The second operation block, XX–01–0, as illustrated in FIG. 19, includes both a main memory cycle and an auxiliary memory cycle and, therefore, provides an operation block which is more representative of the block operations. In the second operation block, a different program control transfromer, namely 150*b*, is energized causing a different set of logical circuits to be rendered operable as indicated by the corresponding set of equations below operation block XX–01–0 in FIG. 19. Sense lines 180 (FIG. 10) providing program control signals XF*a*l, XL2——XL4, for the performance of operation block XX–01–0, are wound through the corresponding transformer 150*b*, whereby a drive pulse 164 (FIG. 9) coupled to drive winding 158 produces program control signals on these sense lines to render operative the appropriate logical circuits corresponding to operation block XX–01–0.

In looking up the first word (351) of the command (FIG. 21*a*) in the main memory at address (40), the "read transfer" main memory cycle, the contents of the cell at address (40), which address has been set up in the L register during the previous operation block XX–00–0, is "read out" into the M register, as shown in the functional flow block diagram of FIG. 21*c* corresponding to this operation block. The logical equations in FIG. 19 under the heading "M register" are implemented by the logical circuits shown in FIG. 27. The program control signals XM2 and XM10 render respective groups of the logical circuits operative for recirculation of the first word (351) of the command of FIG. 21*c* in the M register, whereby the first word will be retained in the M register after the logical clock pulse $C_L$ to provide for "writing back" the first word of the command into the main memory at the same address (40) during the write time interval of the present operating cycle.

In the same operation block, XX–01–0, the first word of the command is copied from the M register into the T register at the logical clock pulse $C_L$ as indicated in FIG. 21*c* in response to the logical circuits for the flip-flops T1–12 which are rendered operable by the program control signal XT7. The logical circuits for the flip-flops T1–12, implementing the equation ($sT1\text{-}12 = M_{1-12}XT7$) are shown in FIG. 29. The T register provides temporary storage for the first word of the command for later use in operations in subsequent operation blocks.

Also, in operation block XX–01–0, the command code (C) (FIG. 21*c*), which comprises the last four bits of the first word (351) of the command and which is set up in flip-flops M1–4 of the M register, is copied from the M register into the instruction register (flip-flops N7–10) as shown in FIG. 21*c*. The words of the load command illustrated in FIG 21*a* has the command code (C) of binary configuration 0001, in accordance with the table for commands in FIG. 11. The program control signal XN32 is supplied as shown in FIG. 25 to logical circuits for flip-flops N7–10. Accordingly, at the logical clock pulse $C_L$ the flip-flops N7–10 in the instruction register are set to the configuration of flip-flops M1–4 in the M register for the load command. As will be noted later in connection with the discussion of the decision logic in this operation block, the command code (C) stored in flip-flops M1–4 will be checked for a possible "skip" in the event the command code specifies the command to be a double stage command.

In preparation for the next operation block, during the present operation block XX–01–0, the address in the L register is modified by adding one by means of "count up" logic. The second word (150) of the command (FIG. 21*a*) is located in the memory cell at address (41) immediately following the memory cell at address (40) containing the first word (351) of the command. Adding one to the address in the L register, therefore, will provide the address of the second word of the command for "reading out" the second word of the command in the main memory cycle to be performed in the next operation block. As indicated by the logical equations in FIG. 19 under the heading "L register," the program control signal XL2 renders the logical input circuits of the respective flip-flops L1–18 operative to "count up" one incrementing the address stored in the L register by one.

An auxiliary memory cycle is also provided in operation block XX–01–0 for updating the Control N° for the command which will follow the load command shown in FIG. 21*a*. The commands in a routine are generally stored at addresses of the main memory so that merely by updating the Control N° by two in the adder, the address of the next command can be conveniently obtained. If a double stage command is to be executed which includes four words, the Control N° is incremented by an additional two during operation blocks for double stage commands only. As indicated in FIG. 19, adding two to the Control N° in the S register would update the Control N° for the next command which follows a single stage command. The logical equations for adding two to the Control N° in the S register are shown in FIG. 19 under the heading "Adder." The logical circuits for implementing these equations are shown in FIG. 22 wherein program control signals XF*a*l, XG*a*l, XG*a*4, and XJ*a*l′ render operable the logical circuits to which these program control signals are fed. The input to the driver F*a*2 provides for the addition of two to the Control N° provided at the inputs to drivers G*a*l–12 and J*a*13–18.

The output of the adder, which is the sum of the Control N° (40) and the number two, i.e., 40+2=42, is coupled to the logical circuits of the S register, made operative by the program control signals XS8, XS3, and XS4. The logical equations for storing the sum in the S register are shown in FIG. 19 under the heading "S register" and the logical input circuits for implementing these equations are shown in FIGS. 28*a* and 28*b* having these program control signal inputs.

The A register which is the address register for the auxiliary memory 13, is prepared for the following operation block by storing the address of one of the index registers 15 (FIG. 1) containing the base number which is used for forming the address of the operand in the main memory, in accordance with the method of relative addressing described previously. The address of the base number stored in one of the index registers 15 is the first five bits (RX portion) of the first word of the command which is presently being stored in the M register, i.e., flip-flops M8–12 as shown in FIG. 21*c*. The logical equations for copying the first five bits of the first word of the command of the M register into the A register are under the heading "A register" in FIG. 19. The logical circuits for implementing these equations are shown in FIG. 24. The program control signals XA10 and XA18 render these logical circuits operable to cause the first five bits ($RX$=00110) of the command to be set up in the flip-flops of the A register at the logical clock pulse $C_L$ as shown in FIG. 22*c*. It should be noted that although the address (RX) is stored in the A register, it does not become effective during the write time interval of the present operating cycle so as to interfere with the updating of Control N° (40) in the S register which will be written back into the Control N° Register. As will be recalled from the description of FIGS. 5 and 6, the decoders for the auxiliary memory 13 and main memory 9 are constructed and arranged to retain the address which was accessed during the reading interval throughout the entire operating cycle, thereby permitting the same address to be accessed during the write time interval without reference to their respective A register or L register. Thus, the addresses of the A register and L register may conveniently be changed at the logical clock pulse $C_L$ without interfering with the writing operation. This is a considerable advantage in that the speed of computer operation may be increased accordingly.

Referring back briefly to review the decision portion of the operations in block XX–00–0, it will be noted that the decision driver K*s*3 provided for a "skip" from operation block XX–00–0 to the "rest" block XX–00–3, whereas the outputs $Ks_1'$, $Ks_2'$ of drivers K*s*1 and K*s*2 set the program counter to energize during the next operating cycle the transformer 150*b* corresponding to the present operation block XX-01-0. In operation block XX-01-0 decisions are also required and, as shown in FIG. 19, the decision logic for block XX-01-0 is more involved in that decision logic is provided for alternate "skips" to operation on blocks XX-03-0 or XX-00-1 in addition to proceeding to the next operation block XX-03-0.

In FIG. 19, the decision logic is stated by the equations for decision drivers Ks1 and Ks2 under the heading "Decision." As set forth in operation block XX-01—0 illustrated in FIG. 19, the program counter is set to go to block XX-00-1 if both drivers $Ks_1$ and $Ks_2$ are in their true state (turned on) for the processing of a double stage command. Both drivers Ks1 and Ks2 are true to provide outputs $Ks_1$ $Ks_2$ if either product $M_1$ $M_2$ $M_3$ $M_4$ XKs1 or $M_1'$ $M_2'$ $M_3'$ $M_4'$ XKs1 is true as indicated. The flip-flops M1-4, in addition to storing the complete command code for individual single stage commands, also provide the indication for a double stage command, and XKs1 is the program control signal coupled to logical circuits of drivers Ks1 and Ks2 from transformer 150*b* in operation block XX-01-0. The particular double stage command is determined by the states of flip-flops M5-7 and M1-4 wherein the true or false states of flip-flops M1-4 determine the group of double stage commands. The logical circuits and equations are not involved in the operations for single stage commands described herein and, therefore, have not been shown. The logical circuits for drivers Ks1 and Ks2 along with the logical equations therefor, are shown in FIG. 26, and include implementation of the products in the equation whereby if a command code (C) has a configuration such that the binary bits are all zeroes or ones, provides for turning on both drivers Ks1 and Ks2 to provide a decision to "skip" to operation block XX-00-1 in the next operating cycle. The decision is available before the logical clock pulse $C_L$ in the operating cycle of operation block XX-01-0 whereby the program counter flip-flop N5 will be set to the true state to provide the binary configuration for the first operation block XX-00-1 for double stage commands as indicated in the table in FIG. 14.

The second possible skip from block XX-01-0 is to block XX-03-0 as indicated in FIG. 19 which would occur in the event that immediate addressing is involved where the second word of the command is the operand and not just the relative address. This decision is controlled by the driver Ks2 which is turned on to provide the output $Ks_2$ if the product $M_9M_{10}M_{11}M_{12}XKs4$ is satisfied in the logical input circuit for Ks2 including those terms as shown in FIG. 26. Since the first word of the command is stored in the M register in operation block XX-01-0, flip-flops M9-12 contain the first four bits (R portion) of the first word of the command as illustrated in FIG. 21*a*. No logical circuit is provided for the driver Ks1 for this latter product; therefore, the driver Ks1 will not be turned on by this product and its output will be $Ks_1'$. The decision driver outputs for the skip to operation block XX-03-0 is: $Ks_1'$ $Ks_2$. In FIG. 19, under the heading "N register," these terms are shown in the products of the logical equations for flip-flops N1 and N2. The product for flip-flop N1 includes the program control signal XN13 and at the logical clock pulse $C_L$ the flip-flop N1 will be triggered into its true state along with flip-flop N2 provided with the program control signal XN14. The state of the program counter after the logical clock pulse $C_L$, with flip-flops N1 and N2 true, corresponds to operation block XX-03-0, as indicated in the table in FIG. 13. The logical circuits for implementing the equations of the program counter, triggering the flip-flops N1 and N2, are shown in FIG. 25 connected to the logical inputs sN1 and sN2 of flip-flops N1 and N2, respectively.

From the foregoing, it is evident that the decision drivers Ks1, Ks2, and Ks3 provide logical outputs during each operating cycle which will affect the choice of the operation block to be performed during the next operating cycle. The particular column from which the next active transformer in the array 153 (FIG. 7*a*) is to be chosen is determined by the configuration of the N5 and N6 flip-flops; in a similar manner, by operationally comparable circuits and equations, the N1-4 flip-flops (FIG. 7*b*) determine the row in which the next transformer in array 153 is located. It is also evident that before the logical clock pulse $C_L$, the program counter setting depends upon the states of the decision drivers Ks1, Ks2, and Ks3.

Thus, as indicated in FIG. 19 and represented in FIG. 21*c*, it will be understood that as a result of the operations performed in operation block XX-01-0, word #1 (351) of the command (FIG. 21*a*) has been "read out" from the cell at address (40) of the main memory into the M register; then, the entire word (351) in the M register has been copied in the T register for use during subsequent operating cycles, the (RX) portion (00110) of word (351) in flip-flops M8-12 has been copied into flip-flops A1-5 of the A register (in the order 00011) for setting up the address of the base number in the index register 15, and the command code (C) portion (0001) of word (351) in flip-flops M1-4 has been copied into flip-flops N7-10 of the instruction register to set up the load command code configuration as shown by the table in FIG. 13. Also, as indicated in FIG. 19, the L register is updated by one from address (40) to address (41) so as to permit word #2 (150) of the command at address (41) in the main memory to be accessed during the next operating cycle; and the Control N° in the S register has been increased by two from (40) to (42) to provide the address of the next command which is at address (42) in the main memory, and which is to be performed after the present command (FIG. 21*a*) has been executed. In addition, since the load command shown in FIG. 21*a* is a single stage command and relative addressing is indicated by the (R) portion of the first word (351) now in flip-flops M1-4, $Ks_1$ and $Ks_2$ will both be false (i.e., the product $Ks_1'$ $Ks_2'$ is true) and the program counter will be set to go to operation block XX-02-0 during the next operating cycle.

During the next operation cycle, therefore, program control transformer 150*c* (FIG. 10) corresponding to operation block XX-02-0 will be energized rendering operative a third set of logical circuits, as indicated by the set of logical equations below block XX-02-0 in FIG. 20.

As indicated in FIG. 20 and represented in FIG. 21*d*, operation in block XX-02-0 is such that the base number (5,000) at address (RX) in the index registers 15 is "read out" of the auxiliary memory and stored into the S register, while at the same time word #2 of the command (FIG. 21*a*) at address (41) in the main memory is "read out" of the main memory unit #0 and stored in the M register; then the address (5,150) of the first word of the field in the main memory containing the operand is obtained by supplying word #2 (150) (which is the relative address) now in the M register to the adder along with the base number (5,000) now in the S register, where the two are added and the sum (5,150) put into the L register, which sum represents the address of the first word of the operand. Also, during operation block XX-02-0, the field length (F) of the command (FIG. 21*a*), which represents the number of words of the operand, i.e., the number of words in the field containing the operand, and which was "read out" of the main memory unit #0 and stored in flip-flops M5-7 of the M register and then copied into flip-flops T5-7 of the T register during the previous operation block XX-01-0, is now copied from flip-flops T5-7 into flip-flops TM1-3 of the TM register for use in subsequent operation blocks for indicating the length of the field. The actual number of words in a field is (F) plus one. While the above operations are taking place in operation block XX-02-0, the program counter is also being set to go to block XX-03-0, the last of the four operation blocks XX–00–0 to XX–03–0 which are common to all single stage commands.

In operation block XX–03–0, transformer 150*d* in FIG. 10 is energized, causing a fourth set of logical circuits to be rendered operable as indicated by the set of logical equations below operation block XX–03–0 in FIG. 21. During this operation block, XX–03–0, there is no auxiliary memory or main memory cycle. All that occurs is that the field length (F) is transferred from flip-flops TM 1–3 of the TM register into flip-flops TK1–3 of the TK register, the address (5,150) in the L register (which is the address of the first word of the field in the main memory containing the operand) is copied into the S register, and the program counter is set to go to operation block 01–04–0 corresponding to the load command as shown in FIG. 17.

The function of the load command is to put a particular operand from the main memory 9 into the accumulator 17 of the auxiliary memory 13 shown in FIG. 1. (The operand could also be obtained from the second word of the command (word #2 in FIG. 15) if implicit addressing is involved.) In accordance with the load command shown in FIG. 21*a*, the operand to be put into the accumulator 17 has its first word at address (5,150) in the main memory, which address has been set up in the L register and S register as a result of processing through the four operation blocks XX–00–0 to XX–03–0 as just described. It will be assumed that the operand has six words ((*F*)+1 where (*F*)=5), for example, 000,000,-000,003,256,154 wherein the cell at address (5,150) in the main memory contains the first word 000. The complete six words of the operand are contained in cells at addresses (5,150) to (5,155) in main memory unit #0 as shown by the following illustration:

| Addresses | Cell contents (Decimal) | Cell contents (Binary) |
|---|---|---|
| 5150 | 000 | 0000 0000 0000 |
| 5151 | 000 | 0000 0000 0000 |
| 5152 | 000 | 0000 0000 0000 |
| 5153 | 003 | 0000 0000 0011 |
| 5154 | 256 | 0010 0101 0111 |
| 5155 | 154 | 0001 0101 0100 |

In each cell a decimal digit is represented by four bits as indicated above wherein three decimal digits or twelve bits is the maximum length of a cell and constitutes one word. As noted, the least significant word of the operand (154) is located in the highest order address of the memory field (5,155). If the operand is a negative number, the minus sign is always located in the lowest order address (5,150) of the main memory field and in the most significant (left) digit position. As mentioned earlier, the binary configuration for the minus sign is 1111.

It will be remembered that in the last operation block XX–03–0 of the four operation blocks XX–00–0 to XX–03–0 which are common to all commands, the address (5,150) of the first word of the operand in the L register was copied into the S register, the field length (*F*=5) indicating a six word memory field (5+1=6) was transferred from flip-flops TM1–3 of the TM register to flip-flops TK1–3 of the TK register, and the program counter flip-flops were set to go to operation block 01–04–0 corresponding to the load command, the command code (*C*=0001) having been copied from the M register into the instruction register in block XX–01–0.

In operation block 01–04–0, the first word of the operand at address (5,150) in the main memory is "read out" of the main memory unit #0 and stored into the M register where flip-flops M9–12 are examined to determine if the operand is positive or negative. If the flip-flops M9–12 are all set (1111), the operand is negative and the accumulator sign flip-flop K@ (FIG. 1) which stores the sign of the operand instead of storing the sign in the accumulator 17. Also in block 01–04–0, the address (5,150), which was copied into the S register during the previous operation block XX–03–0, is added to the field length (*F*=5) and the sum (5,155) is stored in the S register at the logical clock pulse $C_L$ to provide the address (5,155) of the word having the least significant digits (154) of the operand. Also in operation block 01–04–0, the address in the A register is changed to the least significant address in the accumulator 17, for example (117), where the accumulator addresses range from 110 to 117. Also the number 7 corresponding to the last cell (117) in the accumulator is stored in flip-flops T1–4 of the T register for keeping a tally of the particular cell being addressed in the accumulator by the A register. And, like other operation blocks previously described, operation block 01–04–0 includes operations whereby the program counter is set to go to the next operation block, which is 01–05–0 for the load command, as shown in FIG. 17.

In block 01–05–0, each word of the operand, starting with the last word, is in turn "read out" of the main memory and stored in the M register during successive operating cycles and fed to the accumulator, word by word via the adder. In transferring words through the adder in this manner where no addition is required, zero is added to the word being transferred. Operation block 01–05–0 will thus be repeated in subsequent operating cycles until the entire six word operand (154), (256), (003), (000), (000), and (000) is exhausted. The words (154), (256), (003), (000), (000), (000) transferred into cells (117), (116), (115), (114), (113), and (112), respectively of the accumlator in six operating cycles, each operating cycle including both a main memory and an axuiliary memory cycle in order to provide for one word of the operand to be transferred to an accumulator cell for each operating cycle. However, if a binary (1111) were present in the first word of the operand, it would be ignored and (0000) inserted instead. In the exemplary operand being considered herein, no minus sign is involved. In order to transfer from and store into the proper cells in the main memory and auxiliary memory, respectively, the A and L registers will each count down one during each operating cycle. The contents of the accumulator 17 after the complete transfer are shown in the following illustration:

*Accumulator*

| Address in accumulator | Cell contents (Decimal) | Accumulator cell contents (Binary) |
|---|---|---|
| 110 | ------------ | ------------ |
| 111 | ------------ | ------------ |
| 112 | 000 | 0000 0000 0000 |
| 113 | 000 | 0000 0000 0000 |
| 114 | 000 | 0000 0000 0000 |
| 115 | 003 | 0000 0000 0011 |
| 116 | 256 | 0010 0101 0111 |
| 117 | 154 | 0001 0101 0100 |

Another operation involved in operation block 01–05–0 is to decrement by one of the flip-flops TK1–3 of the TK register, which stores the field length (5), in each operating cycle involving the transfer of a word containing a significant digit. Operation block 01–05–0 is repeated during successive operating cycles until TK is 0 at which time the entire six word operand has been transferred to the accumulator as illustrated above. When TK is equal to 0, KS1 and KS2 will be false and the program counter flip-flops N1–4 are set to go to block 01–06–0 in the next operating cycle.

Also, during each of the operating cycles in block 01–05–0, the output of the adder is checked to determine if a word contained a significant digit. If the adder output contains a significant digit, the A registers, A1–3, are copied into the T register flip-flops T1–4; if not, the address contained in flip-flops A1–3 is not copied into flip-flops T1–4. Thus, at the end of the six operating cycles for which block 01–05–0 is repeated, the T register flip-flops T1–4 will contain the address in the accumulator (115) of the most significant word of the operand, and thereby indicate the effective length in the accumulator of the significant words of the operand. The circuits and equations for implementing the foregoing logical operations are shown in FIG. 29*a*. In the above example being considered, the words of the operand containing the digits 154, 256, and 003 are the significant digits; therefore, the length of the significant digits in the accumulator is three words. The last word of the operand which would contain the minus sign, if any, is checked and if the digits in the word, other than the minus sign, are 0, the word will be considered not to contain a significant digit. This check is provided when the first word of the operand is being addressed and TK1–3 is set to 0.

In the next and last operation block 01–06–0 of the load command, which occurs after the complete operand has been placed in the accumulator, the address in the accumulator of the most significant word of the operand is stored in the T@ register for use during the next command which is readied in block 01–06–0 by setting the program counter to go to the first block XX–00–0 common to all commands.

Thus, it has been illustrated how execution of the load command shown in FIG. 21*a*, by processing in operation blocks XX–00–0 to XX–03–0 and 01–04–0 to 01–06–0 of FIG. 17, as just described, causes the six-word operand 000,000,000,003,256,154 located at addresses (5,150) to (5,155) in the main memory to be loaded into the accumulator at addresses 112 to 117, respectively; also it will be remembered that the program counter has been set to return to operation block XX–00–0 in readiness for the next command whose address is now the updated Control № 42. If for example, the operand loaded into the accumulator is to be divided by a second operand, the next command would be the "divide" command, which is also a single stage command. Processing would then take place in operation blocks XX–00–0 to XX–03–0, which are common to all single stage commands, in a similar manner as described for the single stage load command. Then, in accordance with the command code (C) of the divide command, operation would proceed from the last operation block XX–03–0 which is common to all single stage commands to those operation blocks corresponding to the divide command, namely, operation blocks 13–04–0 to 13–17–0 and 13–04–1 to 13–17–1, as shown in FIG. 17. During these divide operation blocks, the first operand is divided by the second operand by successive subtractions in the adder and the resulting quotient and remainder are suitably stored in one or more registers. In the last divide operation block 13–17–1, the program counter is again set to return to operation block XX–00–0 to begin processing the next command. Thereafter, operation continues in this self-sequencing manner until the entire operation for which the computer has been programmed is completed.

From the foregoing description of typical computer operations and the exemplary mechanization and Boolean equations applicable thereto, it should now be apparent to those skilled in the art how a computer system in accordance with the invention may advantageously be mechanized for high speed operation in a self-sequencing manner to provide a wide variety of computer operations, while at the same time requiring a minimum of circuits and complexity in view of the data handling capacity, versatility and high speed operation achieved by means of the present invention.

It will also be apparent to those skilled in the art that many modifications and variations may be made, both in the structure and operation of the exemplary embodiments presented herein, without departing from the spirit of the invention. Therefore, the present invention is not to be considered as limited to the embodiments presented herein, but is to be considered as including all possible modifications and variations thereof coming within the scope of the invention as defined in the appended claims.

What is claimed is:

1. A computer system for performing logical operations upon data on successive operating cycles comprising: logical circuit means including logical storage means for performing logical operations upon data supplied thereto; data storage means, including accessing means capable of supplying data signals from any one of a plurality of locations therein to said logical circuit means during each operating cycle; control means, including accessing means capable of supplying control signals from any one of a plurality of locations therein to said logical circuit means during each operating cycle; a source of clock pulses; timing means coupled to said source to be responsive to each of said clock pulses including means for producing timing signals for simultaneously controlling the operation of said data storage means and said control means during each operating cycle to supply signals from selected locations therein to said logical circuit means; and pulse forming means connected to respond to said timing means for supplying a logical clock pulse to the logical storage means of said logical circuit means once each operating cycle to advance the logical operation thereof.

2. A computer system for performing logical operations upon data on successive operating cycles comprising: logical circuit means including logical storage means for performing logical operations upon data supplied thereto; data storage means, including accessing means capable of supplying data signals from any one of a plurality of locations therein to said logical circuit means during each operating cycle; control means, including accessing means capable of supplying control signals from any one of a plurality of locations therein to said logical circuit means during each operating cycle; a source of clock pulses; timing means initiated by each of said clock pulses including means for providing timing signals for simultaneously controlling the operation of said data storage means and said control means during each operating cycle to supply signals from selected locations therein to said logical circuit means; and pulse forming means connected to respond to said timing means for supplying a logical clock pulse to the logical storage means of said logical circuit means once each operating cycle to advance the logical operation thereof, said logical operations including modifying of the accessing means of said data storage means and said control means to select different locations therein to supply signals to said logical circuit means during the next operating cycle of the computer.

3. A computer system for performing logical operations on digital data in successive operating cycles comprising: logical circuit means for performing logical operations upon data supplied thereto; storage means, including means for supplying data from any of a plurality of locations therein to said logical circuit means during each operating cycle; control means, including means for supplying control signals from any of a plurality of locations therein to said logical circuit means during each operating cycle, each location specifying by the control signals it supplies, the logical operations to be performed by the logical circuit means during an operating cycle; a source of clock pulses; timing means including a delay line responsive to each of said clock pulses for providing timing signals on each of a plurality of outputs thereof, said timing signals being capable of concurrently controlling the operation of said storage means and said control means during each operating cycle to simultaneously supply data and control signals from selected locations therein to said logical circuit means; and pulse forming means responsive to an output of said delay line for supplying a logical clock pulse to said logical circuit means to advance the logical operation thereof as required for the operating cycle.

4. A computer system for performing operations on digital information in successive operating cycles comprising: logical circuit means for operating on digital information supplied thereto; a plurality of storage means each including means capable of being rendered operative to supply digital information from any of a plurality of locations therein to said logical circuit means during each operating cycle; control means, including means for supplying control signals from any of a plurality of locations therein to said logical circuit means during each operating cycle; a source of clock pulses; a timing means for each said storage means, said timing means including delay lines responsive to a clock pulse for providing timing signals on each of a plurality of outputs thereof, one of said delay lines being capable of controlling the operation of said storage means during each operating cycle to supply data signals to said logical circuit means, and at least another of said delay lines providing timing signals on the outputs thereof for controlling the operation of said control means during each operating cycle to supply control signals to said logical circuit means; and pulse forming means responsive to an output of one of said delay lines for supplying a logical clock pulse to said logical circuit means to advance the logical operation thereof as required by an operating cycle.

5. A computer system for performing operations on digital information in successive operating cycles comprising: logical circuit means including logical storage means for operating on digital information supplied thereto; data storage means, including accessing means for extracting or entering digital information in any of a plurality of locations thereof; control means for supplying control information from any of a plurality of locations thereof; a source of clock pulses; timing means coupled to said source and initiated by each of said clock pulses for providing timing pulses; bistable-state means responsive to said timing signals and having an output for controlling the operation of accessing said data storage means and said control means during each operating cycle to simultaneously extract information from selected locations thereof and supply said information to said logical circuit means; means responsive to said timing means for supplying a logical clock pulse to the logical storage means of said logical circuit means once each operating cycle to advance the logical operation thereof; and further means for controlling the operation of accessing said data storage means for entering the results of said logical operations into the selected location thereof.

6. A computer system for performing operations on digital data in successive operating cycles comprising: logical circuit means for performing logical operations upon data supplied thereto; storage means, including accessing means for extracting data from any of a plurality of locations thereof; control means for supplying control signals in response to the energizing of any of a plurality of locations thereof; a source of clock pulses; a delay line coupled to said source to be initiated by each of said clock pulses for providing a plurality of spaced timing signals to said control means and said storage means during an operating cycle; bistable-state means connected to said delay line and responsive to timing signals during the first portion of an operating cycle for concurrently controlling the operations of accessing a selected location of said storage means and of energizing a selected location of said control means to simultaneously supply data signals and control signals to said logical circuit means; and pulse forming means connected to said delay line and responsive to a timing signal provided at the end of the first portion of an operating cycle for supplying a logical clock pulse to said logical circuit means to advance the logical operations thereof.

7. A computer system for performing operations on digital information in successive operating cycles comprising: logical circuit means including logical storage means for performing logical operations upon data supplied thereto; data storage means, including means for reading or writing digital information in any of a plurality of locations thereof; control means for generating a unique set of control signals from any of a plurality of locations thereof; a source of clock pulses; timing means initiated by each of said clock pulses for providing a plurality of spaced timing pulses during an operating cycle; bistable-state means connected to said timing means and responsive to timing pulses during the first portion of an operating cycle for concurrently controlling the operations of reading a selected location of said data storage means and of energizing a selected location of said control means to simultaneously supply data signals and control signals to said logical circuit means; pulse forming means connected to said timing means and responsive to a timing pulse following the first portion of an operating cycle for supplying a logical clock pulse to the logical storage means of said logical circuit means once each operating cycle to advance the logical operation thereof; and further bistable-state means connected to said timing means and responsive to timing pulses during the last portion of each operating cycle for controlling the operation of writing the results of said logical operations into said selected location of said data storage means.

8. A computer system for performing logical operations upon data in successive operating cycles comprising: a memory array having a plurality of storage cells; memory accessing means settable for accessing one of the storage cells of the memory array; a storage register for said memory; program control means having a plurality of control signal generators; program control accessing means settable for energizing a selected one of said control signal generators; a source of clock pulses; timing means including at least one delay line coupled to said source to be responsive to each of said clock pulses for providing a plurality of spaced timing signals during each operating cycle; first means connected to said timing means and responsive to timing signals provided during a first portion of an operating cycle for rendering active the memory accessing means for reading data from a selected storage cell into said storage register; second means connected to said timing means and responsive to timing signals provided by said delay line during said first portion of an operating cycle for rendering active the program control accessing means for energizing a selected one of said control signal generators; logical circuit means connected to said register and simultaneously responsive to data signals set up in said storage register and control signals from said selected control signal generator; pulse forming means responsive to a timing signal provided at the end of said first portion of an operating cycle for supplying a logical clock pulse to said logical circuit means to modify the data in said storage register; and third means connected to said timing means and responsive to timing signals provided during a last portion of an operating cycle for again controlling the memory accessing means for writing the modified data in said storage register back into said selected storage cell of the memory.

9. A computer system for performing logical operations upon data in successive operating cycles comprising: a memory array having a plurality of storage cells; memory accessing means settable for accessing one of the storage cells of the memory array, said memory accessing means including means for independently retaining the location of an accessed cell after the cell is read for writing into the same location in a respective operating cycle; a storage register for said memory; a control means having a plurality of control signal generators; control accessing means settable for energizing a selected one of said control signal generators; a source of clock pulses; timing means coupled to said source to provide in response to each clock pulse a plurality of spaced timing signals during each operating cycle; means responsive to timing signals provided during a first portion of an operating cycle for controlling the memory accessing means for reading data from a selected storage cell into said storage register; and other means responsive to timing signals provided during said first portion of an operating cycle for controlling the control accessing means for energizing a selected one of said control signal generators; logical circuit means connected to said register and simultaneously responsive to data signals set up in said register and control signals from said selected control signal generator; pulse forming means responsive to a timing signal provided at the end of said first portion of an operating cycle for supplying a logical clock pulse once each operating cycle to said logical circuit means to advance the logical operations performed thereby, said logical clock pulse also being supplied to reset said memory accessing means and control accessing means to access a different storage cell of the memory array and a different control signal generator of the control means, depending upon the results of the logical operation; and means responsive to timing signals provided during a last portion of an operating cycle for writing data from said storage register back into said selected storage cell of the memory.

10. A computer system comprising in combination: means for generating logical clock pulses at a repetition rate equal to the repetition rate of the operating cycle of said computer system, a plurality of logical circuits having inputs and outputs, a plurality of bistable storage elements each having a logical clock input to which said logical clock pulses are applied and a logic input to which the outputs of predetermined ones of said logical circuits are applied, said bistable storage elements being constructed and arranged in conjunction with said logical clock pulses so that at the appearance of each logical clock pulse a bistable element is caused to end up in one of its bistable states when the signal applied to its logic input is at one logical level and in the other bistable state when the signal applied is at the other logical level, said bistable storage elements also being constructed and arranged to have at least one output indicative of its bistable state, means for storing binary data and applying a selected portion of said data to the inputs of predetermined ones of said logical circuits in each period between successive logical clock pulses, and program control means coupled to said logical circuits for rendering operable a selected combination of said logical circuits in each period between successive logical clock pulses, said logical circuits being constructed and arranged so that the signals representing the results of the logical operations performed by the selected logical circuits rendered operative by said program control means in each period between logical clock pulses are propagated to the logic inputs of the bistable storage elements in the form of one of two logical levels prior to the occurrence of the next logical clock pulse, whereby at each logical clock pulse the bistable storage elements are caused to end up in a bistable state in accordance with the logical level applied to their respective logic inputs, said program control means including means coupled to the outputs of predetermined ones of said bistable storage elements for controlling said program control means so that the selected combination of logical circuits to be rendered operable in each period between logical clock pulses is determined in accordance therewith.

11. A computer system comprising in combination: means for generating logical clock pulses at a repetition rate equal to the repetition rate of the operating cycle of said computer system, a plurality of logical circuits having inputs and outputs, a plurality of bistable storage elements each having a logical clock input to which said logical clock pulses are applied and a logic input to which the outputs of predetermined ones of said logical circuits are applied, said bistable storage elements being constructed and arranged in conjunction with said logical clock pulses so that at the appearance of each logical clock pulse a bistable element is caused to end up in one of its bistable states when the signal applied to its logic input is at one logical level and in the other bistable state when the signal applied is at the other logical level, said bistable storage elements also being constructed and arranged to have at least one output indicative of its bistable state, means for storing binary data and applying a selected portion of said data to the inputs of predetermined ones of said logical circuits in each period between successive logical clock pulses, and program control means coupled to said logical circuits for rendering operable a selected combination of said logical circuits in each period between successive logical clock pulses, said logical circuits being constructed and arranged so that the signals representing the results of the logical operations performed by the selected logical circuits rendered operative by said program control means in each period between logical clock pulses are propagated to the logic inputs of the bistable storage elements in the form of one of two logical levels prior to the occurrence of the next logical clock pulse, whereby at each logical clock pulse the bistable storage elements are caused to end up in a bistable state in accordance with the logical level applied to their respective logic inputs, said program control means including means coupled to the outputs of first predetermined ones of said bistable storage elements for controlling said program control means so that the selected combination of logical circuits to be rendered operable in each period between logical clock pulses is determined in accordance therewith, said means for storing binary data including means coupled to the output of second predetermined ones of said bistable storage elements for determining in accordance therewith the selected portion of binary data to be applied to said logical circuits in each period between successive logical clock pulses.

12. A computer system comprising in combination: means for generating logical clock pulses at a repetition rate equal to the repetition rate of the operating cycle of said computer system, memory means for storing binary data, memory accessing means coupled to said memory means to permit access of selected binary data therefrom during each period between successive logical clock pulses, a plurality of logical circuits to which the binary data accessed from said memory means is fed, program control means capable of being coupled to said logical circuits so as to be capable of rendering operative a different plurality of said logical circuits in each period between successive logical clock pulses, flip-flop means coupled to said logical circuits and operative at the appearance of each logical clock pulse to end up in a state in accordance with one of the two logical levels applied thereto from said logical circuits, and means coupling selected outputs of said flip-flops to said memory accessing means and said program control means so that the settings of the selected flip-flop outputs determine the particular logical circuits which are to be rendered operative and the particular binary data to be accessed from said memory means in each period between successive logical clock pulses.

13. In a computer system, the combination of timing, memory, program control, decision, logical circuit, and logical flip-flop means cooperating to process binary data and perform logical operations thereon, said timing means including means for generating logical clock pulses at a repetition rate equal to the repetition rate of the operating cycle of said computer system, each of said logical clock pulses being applied to said logical flip-flop means to advance the settings thereof, said timing means also including a source of pulses and delay line means to which pulses from said source are fed for providing suitably spaced pulses capable of initiating the operation of said memory and program control means in each period between logical clock pulses, said memory and program control means being coupled to said logical flip-flops and said logical circuit means so that each is capable of being operated in a selective manner during each period between successive logical clock pulses.

14. In a computer system the combination of: means for generating logical clock pulses at a repetition rate equal to the repetition rate of the operating cycle of said computer system, logical circuit means, main memory means capable of storing binary data, main memory accessing means coupled to said main memory means and capable of applying selected portions of binary data to said logical circuit means in each period between successive logical clock pulses, said accessing means including a first predetermined number of binary bit storage elements whose settings provide for selective access of said main memory means, the selected portions of binary data accessed from said main memory means by said accessing means constituting a second predetermined number of binary bits smaller than said first predetermined number, auxiliary memory means capable of applying selected portions of binary data to said logical circuit means in each period between successive logical clock pulses, said selected portions of binary data from said auxaliary memory means constituting a predetermined number of binary bits at least equal to said first predetermined number, said logical circuit means being so constructed and arranged and coupled to said main and auxiliary memory means and said main memory accessing means so as to cooperate therewith to operate on the predetermined numbers of binary bits respectively obtained from said main memory means and said auxiliary memory means in the same period between successive logical clock pulses during which said predetermined number of bits are obtained from said main and auxiliary memory means, and means coupled between said logical circuit means and said main memory accessing means for setting the binary bits of said main memory accessing means at the next logical clock pulse in accordance with the logical operations performed on the binary bits obtained from said main memory means and said auxiliary memory means in the period between said previous logical clock pulse and said next logical clock pulse.

15. The invention in accordance with claim 14, wherein said second predetermined number of bits accessed from said main memory means is a multiple of four and six, whereby each of second predetermined number of bits may represent a first number of alpha-numeric characters as well as a second and greater number of decimal digits.

16. In a computer system for performing operations on information in sequential operating cycles at different operating rates, timing means for timing the operations in each operating cycle and controlling the operating rate comprising: a source of pulses having a predetermined repetition rate to provide clock pulses corresponding to a predetermined operating rate of the computer system; means for controlling the repetition rate of said pulses and the overall operating rate of the computer system to correspond to slower operating rates of various input equipment supplying information to the computer including means for supplying pulses at said slower operating rates and gating said pulses having a predetermined repetition rate at respective slower operating rates; means coupled to said source for initiating a series of timing signals for timing the operations each operating cycle including a delay line having a fixed period of time delay corresponding to the time period of an operating cycle whereby the time period of the operating cycle and timing of operations in the operating cycle remains fixed for different overall operating rates of the computer system.

17. A computer system for performing operations on information in sequential operating cycles at different operating rates comprising: storing means for storing said information; timing means for timing the operating cycles and operations in each operating cycle comprising, means for producing clock pulses having a repetition rate corresponding to the operating rate of the computer system, means for producing signals at predetermined lower repetition rates corresponding to operating rates of input equipment supplying information to the computer system, and means responsive to a signal produced in response to the input equipment for controlling the clock pulse means to produce clock pulses having a lower repetition rate corresponding to the operating rate of the input equipment supplying information to the computer system; control means for controlling the performance of circuit operations on said information in sequential operating cycles; at least one delay line coupled to said clock pulses for supplying timing signals to said control means for controlling the operation thereof within each operating cycle; and means responsive to said control means for performing the logical and arithmetic operations on said information.

18. A computer for operating on information including handling information and performing logical operations on said information in sequential operating cycles comprising: timing means for timing the operations within each operating cycle; control means for controlling the performance of logical operations in sequential operating cycles; means including a plurality of individually and simultaneously accessible storage means, each being capable of storing a plurality of words of information comprising a unit of information wherein each of said words is handled in parallel by the computer; means for each of said storage means for accessing any selected word in respective storage means individual means for each of said storage means for storing a word accessed from a respective storage means during an operating cycle to enable operations to be performed on all portions of each accessed word simultaneously and operations to be performed on a combination of said words in parallel; and logical circuit means responsive to said control means for performing said operations on the accessed words stored in said individual means during said operating cycle.

19. A computer for operating on information including handling information and performing arithmetic and logical operations on said information in sequential operating cycles; means for timing the operations in each operating cycle; means for controlling the performance of operations in sequential operating cycles; means including a plurality of individually and simultaneously accessible memories, each being capable of storing a plurality of words of information comprising a unit of information wherein each of said words is handled in parallel by the computer; addressing means for each of said storage means for accessing any word stored in the respective storage means; flip-flop means for each of said memories for storing a word accessed from a respective memory during an operating cycle to enable logical operations to be performed on any portion of each accessed word in parallel and arithmetic operations to be performed on accessed words in parallel; and means responsive to said control means for performing said operations on the accessed words stored in said flip-flop means during said operating cycle.

20. A computer system providing for simultaneous operations on individual portions of accessed words and parallel processing of one word from each of a plurality of fields in each operating cycle comprising: timing means for timing the operations in each operating cycle; control means for controlling the operations on accessed words including the processing of a plurality of words from respective fields in each operating cycle and the sequence of processing words from each field in successive operating cycles; a plurality of individually accessible and selectively operable storage means wherein each of said storage means provides for storing words in the respective field, said storage means being responsive to said control means to provide simultaneous access to any word in each field and successive access to words in each field in a desired sequence; and logical and arithmetic means responsive to said control means for operating on individual portions of accessed words simultaneously and processing words from respective fields in parallel.

21. A computer system providing for parallel operations on each portion of accessed words and parallel processing of a complete word from each of a plurality of fields in each operating cycle comprising: timing means for timing the operations in each operating cycle; control means for controlling the operations on accessed words, including the processing of a plurality of words from respective fields in each operating cycle and processing words from each field in a predetermined order in successive operating cycles; a plurality of individually accessible and selectively operable memories wherein each of said memories provides for storing words in the respective field, said memories being responsive to said control means to provide parallel access to any word in each field and successive access to words in each field in a predetermined order; and logical and arithmetic means responsive to said control means for operating on each portion of accessed words in parallel and processing complete words from respective fields in parallel.

22. Information processing apparatus comprising: timing means including a delay line for providing timing signals defining periods of time of a respective cycle; information processing apparatus including a plurality of logical networks; a plurality of memories; means operable in response to timing signals from said timing means during a first portion of said cycle for reading information stored in the memories; control means operable in response to a timing signal from said timing means during a second portion of said cycle including in part said first portion for forming program control signals for rendering certain of said logical networks operative, said control means comprising at least one array of transformers having windings connected to respective logical networks of said information processing apparatus, and said control means further including means for sequentially selecting and driving transformers of at least one array, one transformer for each operating cycle, to render individual logical networks operative in sequence to perform logical operations; logical storage means operable in response to a logical timing signal from said timing means at the end of said second portion of said cycle for storing the information modified by said logical operations in accordance with the logical networks rendered effective by said control means; and means operable in response to timing signals from said timing means during a third portion of said cycle for writing into said memories the information modified by the logical operations performed during said second portion of said cycle.

23. Computer apparatus including means for performing processing operations in response to application thereto of logical potentials and means for controlling operations of said apparatus according to a repetitive cyclical procedure comprising: timing signal generating means including a delay line for providing repetitive series of predetermined timing signals in response to a signal provided each cycle wherein one series of timing signals is provided for each of respective sequential steps of information processing operations in a command; control means responsive to timing signals from said delay line including an array of transformers and sense lines each inductively linked to at least one of the transformers and to respective networks of logical circuits whereby networks connected to said sense lines are provided logical potentials, and selective means responsive to and effective once during each of said series of timing signals for selecting one of said transformers and thereby selecting a set of at least one of said sense lines and providing on each sense line thereof a control signal to supply a logical potential to the respective networks of said logical circuits during a plurality of successive timing signals of said series.

24. Computer apparatus for parallel processing of information comprising: information storage means; processing circuit means for performing information processing and transferring operations in response to application of logical signals to respective parts thereof, timing means for said apparatus comprising pulse generating means including a delay line having a plurality of taps for producing a series of pulses in which the pulses in a series have predetermined spacings corresponding to the spacing of said taps on said delay line to define successive periods of time by corresponding pulses produced in repetitive series each of which series designates an operating cycle and pluralities of which cycles are assignable to any one of particular groups of related information processing operations termed commands; and control means responsive to pulses from said delay line and comprising sets of transformers including cores, each set assigned to control operations within a command and each transformer effective upon reversal of state of its core to provide control of processing operations during the respective operating cycle by logical potentials on respective sets of sense lines connected to respective logical circuits of the processing circuit means for furnishing logical potentials thereto whereby during each of said operating cycles said control means is effective to determine and carry out specific information processing operations.

25. A computer system comprising in combination: timing means for generating logical clock pulses at a repetition rate equal to the repetition rate of the operating cycle of said computer system and for generating timing pulses at predetermined times within each period between logical clock pulses, a main memory for storing binary data, main memory accessing means including main memory accessing flip-flops, main memory register means including main memory register flip-flops, said main memory accessing and register means cooperating with said main memory and said timing means to permit selected binary data to be accessed from said main memory in accordance with the settings of said main memory accessing flip-flops and set up in said main memory register in each period between successive logical clock pulses, an auxiliary memory for storing binary data, auxiliary memory accessing means including auxiliary memory accessing flip-flops, auxiliary memory register means including auxiliary memory register flip-flops, said auxiliary memory accessing and register means cooperating with said auxiliary memory and said timing means to permit selected binary data to be accessed from said auxiliary memory in accordance with the settings of said auxiliary memory accessing flip-flops and set up in said auxiliary memory register flip-flops in each period between successive logical clock pulses, a plurality of logical circuits having inputs and outputs for performing logical operations on binary data applied thereto, program control means including program control flip-flops, said program control means being coupled to said logical circuits and being capable of rendering operative in each period between successive clock pulses in response to said timing means a selected combination of said logical circuits in accordance with the settings of said program control flip-flops, and means coupling outputs of all of said flip-flops to inputs of said logical circuits and outputs of said logical circuits to inputs of all of said flip-flops so that at the appearance of each logical clock pulse each of all of said flip-flops is caused to end up in a state in accordance with the logical level applied thereto from an output of a logical circuit, said logical circuits being constructed and arranged so that the results of the logical operations performed thereby as a result of binary data applied to the inputs thereof in each period between successive clock pulses are propagated to all of said flip-flops before the appearance of the logical clock pulse ending each period.

26. In a computer system, the combination of: memory storage means for storing binary data, means for accessing binary data from said memory storage means, logical circuit means for performing logical operations, program control means for rendering operable a selected combination of said logical circuits to perform logical operations on the binary data accessed from said memory storage means, flip-flop means for storing the results of the logical operations performed, and analog timing means including a tapped delay line coupled to each of said aforementioned means for establishing an operation cycle for said computer system and for generating a logical clock pulse for each operating cycle, said timing means also generating timing pulses at predetermined times within said operating cycle, said aforementioned means being constructed and arranged in conjunction with said timing means so that each of said aforementioned means is capable of being operated during each operating cycle, said flip-flop means being coupled to said timing means so as to be made operative by each logical clock pulse to store the results of logical operations performed during each operating cycle, said flip-flop means also being coupled to said means for accessing and said program control means to cooperate therewith to permit selective accessing of binary data from said memory storage means during each operating cycle and selective choice by said program control means of the logical circuits to be rendered operative during each operating cycle.

27. The invention in accordance with claim 26, wherein said computer system additionally includes means coupled to said timing means and cooperating therewith to vary the repetition rate of said operating cycle in a manner so that the rate of occurrence of operations within each operating cycle remains constant.

28. The invention in accordance with claim 26, wherein said computer system additionally includes an auxiliary memory storage means for storing binary data, and auxiliary memory accessing means for accessing binary data therefrom, said timing means being coupled to said auxiliary memory storage means and said auxiliary memory accessing means to permit binary data to be accessed therefrom during each operating cycle, said flip-flop means also being coupled to said auxiliary memory accessing means to cooperate therewith to permit selective accessing of binary data from said auxiliary memory storage means during each operating cycle.

29. A system for operating on units of digital information in a series of successive operating cycles in which a series of successive words store a unit of information: a plurality of data storage means in which one of said storage means includes an accumulator, each of said storage means having a plurality of word locations and including individual address means providing selective access to any word location in each storage means each operating cycle, each individual address means being constructed and arranged to provide access to successive word locations in said series in successive operating cycles beginning with a first word in a series having the least significant digital information and progressing in order to a word in the series having the most significant digital information and to the remaining words in the series having no significant digital information; logical circuit means including adder circuit means for transferring said series of words in succession from successive word locations accessed from one of said data storage means to a series of successive word locations accessed in said accumulator in another of said data storage means through said adder circuit means; tally address storage means; said logical circuit means further including circuit means for transferring addresses of successively accessed word locations in the accumulator to said tally address storage means only during transfer of a word having significant digital information whereby the tally storage means stores the address of the word location in said accumulator of the word in said series having the most significant digital information.

30. A computer system operative to perform data-processing operations in a series of repetitive operating cycle comprising: means for generating pulses whose repetition rate constitutes the repetition rate of said operating cycles, logical circuits capable of logically combining logical signals applied thereto, a plurality of flip-flops cooperating with said logical circuits during each interval between successive pulses to apply logical signals thereto and to receive logical signals therefrom, each flip-flop being operable in response to each of said pulses to end up in a state in accordance with a logical signal applied thereto from said logical circuits, program control means operable in each interval between successive pulses for rendering operative predetermined portions of said logical circuits dependent upon the states of predetermined ones of said flip-flops during that interval, and memory means selectively operable in each interval between successive pulses to apply data signals chosen in accordance with predetermined ones of said flip-flops to predetermined points of said logical circuits, said logical circuits being constructed and arranged so that the logical signals representing the results of the logical operations performed on the logical signals applied thereto during each interval between successive pulses are propagated to the inputs of said flip-flops prior to the occurrence of the pulse terminating that interval.

31. A computer system operative to perform data-processing operations in a series of repetitive operating cycles comprising: means for generating logical clock pulses whose repetition rate constitutes the repetition rate of said operating cycles, logical circuits capable of logically combining logical signals applied thereto, a plurality of flip-flops cooperating with said logical circuits during each interval between logical clock pulses to apply logical signals thereto and receive logical signals therefrom, each flip-flop being operable at each logical clock pulse to end up in a state in accordance with a logical signal applied thereto from said logical circuits, program control means operable in each interval between logical clock pulses for applying program control signals to said logical circuits for rendering operative predetermined portions thereof dependent upon the states of predetermined ones of said flip-flops, and memory means selectively operable in each interval between logic clock pulses for applying data signals chosen in accordance with predetermined ones of said flip-flops to predetermined points of said logical circuits, said memory means also being capable of operating in each interval between logical clock pulses to cause data to be stored therein corresponding to the states of predetermined ones of said flip-flops in the previous interval between logical clock pulses, said logical circuits being constructed and arranged so that the logical signals representing the results of the logical operations performed on the logical signals applied thereto during each interval between logical clock pulses are propagated to the inputs of said flip-flops prior to the occurrence of the logical clock pulse terminating that interval.

32. The invention in accordance with claim 30 wherein the data signals applied by said memory means are provided by a second plurality of output flip-flops which are capable of being set in each interval between logical clock pulses to states in accordance with a portion of said memory means chosen in accordance with predetermined ones of the first plurality of flip-flops.

33. The invention in accordance with claim 30, wherein said logical circuits are constructed and arranged without including intermediate storage means so that logical signals applied to inputs of said logical circuits are propagated to the outputs thereof without any storage delay.

34. The invention in accordance with claim 31 wherein the said memory means is selected for operation in an interval between logical clock pulses depending upon the state of at least one of said flip-flops during that interval.

35. A computer system operative to perform data-processing operations in a series of repetitive operating cycles comprising: means for generating logical clock pulses whose repetition rate constitutes the repetition rate of said operating cycles, logical circuits capable of logically combining logical signals applied thereto, a first plurality of flip-flops interconnected by said logical circuits and including program control flip-flops and memory address flip-flops, each of said flip-flops being operable at each logical clock pulse to end up in a state in accordance with a logical signal applied thereto from said logical circuits, program control means coupled to the outputs of said program control flip-flops and operable in each interval between logical clock pulses to apply program control signals to said logical circuits for rendering operative predetermined portions thereof in accordance with the states of said program control flip-flops, and memory means coupled to said memory address flip-flops and selectively operable in each interval between logical clock pulses to apply selected data signals to predetermined points of said logical circuits, said selected data signals being chosen in accordance with the states of said memory address flip-flops, said memory means including a plurality of memory output flip-flops which are capable of being set in each interval between logical clock pulses to states representing said data signals, said memory output flip-flops also being coupled to said logical circuits and being operative at each logical clock pulse to end up in a state in accordance with a logical signal applied thereto, said logical circuits being constructed and arranged so that the logical signals representing the results of the logical operations performed on the logical signals applied thereto during each interval between logical clock pulses are propagated to the inputs of said flip-flops prior to the occurrence of the logical clock pulse terminating that interval.

36. The invention in accordance with claim 35, wherein said memory means is comprised of a main memory and an auxiliary memory, and wherein respective ones of said memory address flip-flops and said memory output flip-flops are assigned to each memory so that each may be selectively operable independently of the other in each interval between logical clock pulses to produce respective ones of said data signals.

37. The invention in accordance with claim 36 wherein each memory is also capable of operating in each interval between logical clock pulses to cause data to be stored therein corresponding to the states of predetermined ones of said flip-flops in the previous interval between logical clock pulses.

38. The invention in accordance with claim 37, wherein the selective operation of each memory in each interval between logical clock pulses is determined by at least a respective one of said first plurality of flip-flops.

39. The invention in accordance with claim 37, wherein said program control means and each memory of said memory means includes a matrix of bistable elements selectable in accordance with the settings of said program control flip-flops and said memory address flip-flops respectively.

40. The invention in accordance with claim 33, wherein said logical circuits include multi-level logic, and drivers are provided at predetermined levels of said multi-level logic to provide logical output signals in each interval between logical clock pulses which correspond to those provided by said aforementioned flip-flops.

41. In a computer system operative to perform data-processing operations in a series of repetitive operating cycles, a plurality of flip-flops, logical circuitry interconnecting the inputs and outputs of said flip-flops, said logical circuitry being selectively variable each operating cycle in accordance with predetermined ones of said flip-flops, means applying a logical clock pulse to said flip-flops once each operating cycle to cause each flip-flop to end up in a state in accordance with a logical input signal applied thereto from said logical circuitry, said logical circuitry being constructed and arranged so that during each operating cycle the logical circuitry logically combines the outputs of said flip-flops and applies the results thereof to the inputs of said flip-flops prior to the occurrence of the logical clock pulse for that cycle.

42. In a computer system, a plurality of flip-flops, multi-level logical circuitry to which binary output signals from said flip-flops are fed at predetermined points thereof for the performance of logical operations, said multi-level logical circuitry including at least one driver provided at each level, each driver being constructed and arranged to provide binary output signals in response to logical signals applied thereto having magnitudes substantially identical to the binary output signals provided by each of said flip-flops, whereby the binary signals at each level of said multi-level logic circuitry are the same so that outputs from any of said drivers as well as from said flip-flops are directly combinable with one another as well as with outputs from said flip-flops at any level of said multi-level logic circuitry.

43. A self-sequencing computer system for performing data-processing operations in a series of repetitive operating cycles comprising in combination: timing, program control, memory, logical circuit and logical storage means, said timing means being operative each operating cycle to produce a plurality of timing pulses including a logical clock pulse, said program control means being operative each operating cycle in response to at least one of said timing pulses to apply program control signals to said logical circuit means to render said logical circuit means in a predetermined configuration as determined by the condition of said logical storage means during that cycle, said memory means being selectively operative each operating cycle in response to at least one of said timing pulses to apply selected data signals to said logical storage means also as determined by the condition of said logical storage means during that cycle, said storage means having outputs for applying logical signals representing the conditions thereof to said logical circuit means along with said data signals and said program control signals, and having inputs for receiving the results of the logical operations performed by said logical circuit means during each cycle, said storage means being responsive to change its condition to correspond to the results of the logical operations appearing at its inputs at each logical clock pulse.

References Cited by the Examiner

UNITED STATES PATENTS

| | | | |
|---|---|---|---|
| 2,873,386 | 2/1959 | Schlei | 333—29 XR |
| 2,914,248 | 11/1959 | Ross et al. | 235—157 |

ROBERT C. BAILEY, *Primary Examiner.*

WALTER W. BURNS, Jr., *Examiner.*